US012739348B1

(12) United States Patent
Ip et al.

(10) Patent No.: US 12,739,348 B1
(45) Date of Patent: Sep. 15, 2026

(54) SYSTEMS AND METHODS FOR ANGULAR OFFSET CALIBRATION FOR COMPOSITE IMAGE GENERATION

(71) Applicant: Pano AI, Inc., San Francisco, CA (US)

(72) Inventors: Katharine Ip, Menlo Park, CA (US); Ryan McKenzie White, Menlo Park, CA (US); Aleksandar Gargenta, Walnut Creek, CA (US); John Robinson Royero, San Jose, CA (US); Sean Michael Donohue, Bellingham, WA (US)

(73) Assignee: Pano AI, Inc., San Francisco, CA (US)

( * ) Notice: Subject to any disclaimer, the term of this patent is extended or adjusted under 35 U.S.C. 154(b) by 0 days.

(21) Appl. No.: 19/401,128

(22) Filed: Nov. 25, 2025

(51) Int. Cl.
*G06T 7/80* (2017.01)
*G06T 3/16* (2024.01)
*G06V 20/52* (2022.01)
*H04N 7/18* (2006.01)
*H04N 23/698* (2023.01)

(52) U.S. Cl.
CPC ............... *H04N 7/181* (2013.01); *G06T 3/16* (2024.01); *G06T 7/80* (2017.01); *G06V 20/52* (2022.01); *H04N 23/698* (2023.01); *G06T 2207/30204* (2013.01); *G06T 2207/30244* (2013.01)

(58) Field of Classification Search
CPC ......... H04N 23/698; H04N 7/181; G06T 7/80
See application file for complete search history.

(56) References Cited

U.S. PATENT DOCUMENTS 11,049,218 B2 * 6/2021 Khwaja ................. G06T 3/4038
11,205,305 B2 * 12/2021 Sadi ..................... H04N 13/183
11,508,090 B2 * 11/2022 Lin ........................ H04N 25/61
11,630,214 B2 * 4/2023 Gausebeck ............ G01S 17/89 356/5.01
11,842,510 B2 * 12/2023 Kastner ..................... G06T 7/70
12,498,488 B2 * 12/2025 Gausebeck ............ G01S 17/89
2009/0022422 A1 * 1/2009 Sorek .................. H04N 1/3876 382/284
2012/0019614 A1 * 1/2012 Murray ................ G06T 3/4038 348/E7.001

(Continued)

OTHER PUBLICATIONS

Creating Full View Panoramic Image Mosaics and Environment Maps; Szelinski; 1997 (Year: 1997).*

(Continued)

*Primary Examiner* — Luis Perez-Fuentes
(74) *Attorney, Agent, or Firm* — Foley & Lardner LLP

(57) ABSTRACT

Systems can include a processor for generating a panoramic composite image. The processor can identify a plurality of constituent images captured by an image capture device rotated about an axis of rotation of the image capture device. Each constituent image of the plurality of constituent images can correspond to a respective range of angles about the axis. The processor can identify, for each constituent image of the plurality of constituent images, an offset caused by a difference between the axis of rotation and a reference axis and align, using the respective offset for each respective constituent image corresponding to a respective range of angles, the plurality of constituent images to generate a composite image. The processor can store, in one or more data structures, the composite image.

20 Claims, 23 Drawing Sheets

(56) References Cited

U.S. PATENT DOCUMENTS

| | | | | |
|---|---|---|---|---|
| 2012/0051665 | A1* | 3/2012 | Adams | G06T 7/85<br>382/294 |
| 2016/0088287 | A1* | 3/2016 | Sadi | H04N 13/117<br>348/43 |
| 2018/0007344 | A1* | 1/2018 | Cohen | H04N 13/106 |

OTHER PUBLICATIONS

Creating Full View Panoramic Image Mosaics and Environment Maps; Shum; 1997; (Year: 1997).*
Automatic panoramic image stitching using invariant features; Brown; 2007; (Year: 2007).*

* cited by examiner 404
400
402
422
444
424
426
430
464
440
428
414
410
420
466
462

SYSTEMS AND METHODS FOR ANGULAR OFFSET CALIBRATION FOR COMPOSITE IMAGE GENERATION

BACKGROUND

Monitoring and analyzing incidents in geographical areas can be facilitated by the use of image capture devices and remote sensing technologies. Images and other sensor data can be processed to provide situational awareness and support decision-making in emergency response scenarios. However, accurately determining relevant information from such data in complex environments can present significant technical challenges.

SUMMARY

Monitoring and analyzing incidents in geographical areas can be implemented using image capture devices configured to collect visual and sensor data over an area or a range. These approaches, however, can face challenges when attempting to determine the precise location or range of an incident, such as a fire, using a single observation station or a single image capture device. While triangulation using multiple stations can be used to improve the accuracy of distance estimates, sometimes there may be only a single device available to observe a particular location, making distance determination using such a single camera particularly challenging.

The techniques described herein can address these challenges by determining a range to an incident using a single observation station or a single image capture device. The system can receive a plurality of images captured by an image capture device about an axis of rotation and identify, within at least one image of the plurality of images, a region of interest that corresponds to an incident. The system can determine, for the region of interest, a bearing angle about the axis of rotation and an elevation angle relative to a plane perpendicular to the axis of rotation. The bearing angle and the elevation angle can correspond to a direction from the image capture device to a location of the incident. The system can determine, using the direction and a digital elevation model of the geographical area, a range of distances from the image capture device to a portion of the geographical area comprising the location of the incident.

Incident monitoring systems can also face challenges when their observation cameras configured for particular imaging mode, may struggle capturing all of the relevant details of an incident. For example, a visible spectral range camera can capture an image of an incident location having a fire smoke rising towards a clear sky. However, a flame of the fire causing the smoke may often be difficult to identify in the same daytime visible spectral range image. Meanwhile, the fire flame of the same incident may be more clearly captured using an infrared camera. Therefore, it may be beneficial for a monitoring system to generate an enhanced image that combines characteristics from multiple image modes to more clearly represent the relevant features of an observed incident. For example, an enhanced multi-mode image can combine the flame captured via an infrared camera with the smoke captured by a visible spectral range camera to produce an enhanced representation the incident with the flame and the smoke marked with an enhanced clarity.

To overcome such challenges, the system can generate a multi-mode image of the incident location by causing the image capture device to acquire, within a predetermined time interval, a first image in a first imaging mode (e.g., an image of a location in a visible spectral range) and a second image in a second imaging mode (e.g., an image of the location in the infrared range). The system can process the first image and the second image to generate a multi-mode image that includes characteristics from both of the imaging mode.

In addition, a monitoring system can face technical challenges when creating composite images (e.g., panoramas) by stitching together constituent images from cameras mounted on poles that are subject to physical misalignment and environmental variabilities. These misalignments and variabilities may include variations in camera tilt, roll, or shifts in camera position, making it challenging to align overlapping image regions when generating composite images. The difficulties in constituent image alignment can be further exacerbated by low-light conditions or in environments lacking distinct visual features, introducing noise or inconsistencies in image alignment algorithms. In such configurations, the monitoring systems can produce unreliable outputs, wasting computational and energy resources, while also relying on manual physical adjustment of camera hardware or repeated recalibrations.

The techniques described herein can address such alignment based challenges by introducing angle calibrations and digital corrections to account for differences between the camera axes and the reference axis, which can be an axis that is perpendicular to, or set based on, the ground plane. These calibration offsets can be created for constituent images around a rotational loop, accounting for physical misalignments, including tilt and roll, in digital correction that can be implemented in the course of the image stitching process. For instance, the calibration files can be stored individually for each of the constituent images captured about the axis, such that consistent projection methods can be maintained for each pixel in generation of the composite image.

Furthermore, the technical solutions described herein can be directed to retrieving zoomed in images of incident locations based on received requests using angular offset calibrations for improved accuracy. When retrieving images of specific real-world locations using fixed location camera systems, it can be challenging to reliably and accurately identify or capture desired locations given variations in spatial accuracy between an axis about which the image capture devices operate and a reference axis about which these systems should ideally rotate for minimal errors. Angular offsets between the reference axis and the axis about which the image capture devices rotate while capturing images can introduce errors which can be exacerbated when zoomed in images are attempted, potentially leading to capturing of wrong regions, missing the target areas. Also, sometimes digital zoom functions can be restricted to static panoramas that may be subject to spatial offsets, while optical zoom functions can rely on manual camera control or lack precise targeting based on inaccurate latitude and longitude coordinates. In some implementations, it can be challenging to correlate user-specified coordinates with accurate angular directions of the intended incident locations, such that visual inspection of reported incidents or infrastructure at arbitrary locations can be unreliable. In other scenarios, retrieval of historical images can be limited by the absence of consistent calibration or alignment between panoramic images and real-world coordinates, such that temporal analysis of a location can be inaccurate or incomplete.

The techniques described herein can address the challenges of spatial and temporal image retrieval by introducing a GIS zoom process that can use latitude and longitude coordinates to determine angular directions from a fixed camera station. The techniques described herein can receive a request specifying a location and a time indication, can calculate the corresponding azimuth and elevation angles using a marker to angle method in reverse, and can identify a constituent image from a panoramic dataset based on the calculated angles and time. The techniques described herein can retrieve calibration data to correct for camera mounting offsets, can generate a digitally zoomed image of the specified coordinates from the panoramic image, and can provide the zoomed image in response to the request. The techniques described herein can support optical zoom by tasking the camera to acquire a current high-resolution image of the specified coordinates, such that both historical and real-time inspection of arbitrary locations can be supported using GIS-based targeting.

At least one aspect relates to a system. The system can include one or more processors. The system can receive a plurality of images captured by an image capture device about an axis of rotation of the image capture device. The system can identify, within at least an image of the plurality of images, a region of interest that corresponds to an incident within a geographical area surrounding a location of the image capture device. The system can determine, for the region of interest, a bearing angle about the axis of rotation and an elevation angle relative to a plane perpendicular to the axis of rotation, the bearing angle and the elevation angle corresponding to a direction from the image capture device toward a location of the incident. The system can determine, using the direction and a digital elevation model of the geographical area, a range of distances from the image capture device to a portion of the geographical area comprising the location of the incident. The system can provide, for presentation, an indicator indicative of the range of distances from the location of the image capture device to the portion of the geographical area.

The system can receive a request comprising information about the incident, the request indicative of the region of interest and a time interval. The system can identify, based on the time interval, the plurality of images stored in a data repository. In some implementations, the system can determine, within at least a portion of the image, the region of interest based on a relation between the location of the image capture device and the region of interest according to the bearing angle. The system can receive the request from a remote device. In some implementations, the system can provide, responsive to the request, for presentation via a graphical user interface of the remote device, the indicator.

The system can determine a range of bearing angles about the axis of rotation, the range of bearing angles comprising the bearing angle and corresponding to a width of the portion of the geographical area corresponding to the region of interest. The system can determine the region of interest based on the range of bearing angles in relation to the location of the image capture device. The system can determine the range of bearing angles using the digital elevation model. In some implementations, the system can generate the indicator indicative of the width of the region of interest. The system can provide, for presentation via a graphical user interface, the indicator indicative of the width.

The system can determine, based on the digital elevation model, a range of elevation values corresponding to a plurality of geographic coordinates within the geographical area. In some implementations, the system can select, from the range of elevation values based on a topography of the digital elevation model along the direction, a subset of the elevation values that correspond to a range of distances to the portion of the geographical area comprising the location of the incident.

The system can determine, using the digital elevation model, a ray corresponding to the direction from the location of the image capture device toward the location of the incident. In some implementations, the system can determine, based on a topography of the geographical area in the digital elevation model, an intersection of the ray with a surface corresponding to the subset of elevation values. The system can perturb at least one of the bearing angle or the elevation angle by a predetermined set of offset to determine the portion of the geographical area. In some implementations, the system can determine the range of distances from the image capture device for the portion of the geographical area using the digital elevation model.

The system can determine, using a topography of the digital elevation model, a lower boundary of the range of distances from the location of the image capture device to the portion of the geographical area comprising the location of the incident and an upper boundary of the range of distances from the location of the image capture device to the portion of the geographical area comprising the location of the incident. In some implementations, the system can generate, for presentation via a graphical user interface, an indicator indicative of the lower boundary of the range of distances and the upper boundary of the range of distances.

The system can identify, in a data repository, a calibration value for the image capture device, the calibration value corresponding to an angular offset for the image capture device. In some implementations, the system can adjust at least one of the bearing angle or elevation angle using the calibration value. In some implementations, the system can determine the range of distances using at least one of the adjusted bearing angle or the adjusted elevation angle.

The system can generate a probability region for the range of distances based on an uncertainty in at least one of: coordinate values of the digital elevation model, measurement of the bearing angle or an offset to the image capture device. In some implementations, the system can generate, for presentation via a graphical user interface, the indicator indicative of the probability region. The system can identify topography data of the geographical area for the digital elevation model, the topography data comprising a plurality of elevation values of a plurality of geographical coordinates within the geographical data. In some implementations, the system can generate, based on the topography data, the digital elevation model.

The system can generate a panoramic composite image reconstructed from the plurality of images for presentation via a graphical user interface. In some implementations, the system can overlay the indicator on the panoramic composite image. The system can generate a map corresponding to at least the portion of the geographical area for presentation via a graphical user interface. In some implementations, the system can overlay the indicator on the map.

The system can generate a data structure comprising at least one of: the indicator, the range of distances, the bearing angle, the elevation angle, and an identifier for the image capture device. In some implementations, the system can store, in a data repository, the data structure corresponding to a timestamp. The system can generate a confidence metric based on at least one of: a resolution of the digital elevation model, a resolution of the bearing angle, or a resolution of an elevation angle. In some implementations, the system can present the confidence metric together with the indicator for presentation via a graphical user interface.

At least one other aspect relates to a method. The method can be performed, for example, by one or more processors coupled to non-transitory memory. The method can include receiving a plurality of images captured by an image capture device about an axis of rotation of the image capture device. The method can include identifying, within at least an image of the plurality of images, a region of interest that corresponds to an incident within a geographical area surrounding a location of the image capture device. The method can include determining, for the region of interest, a bearing angle about the axis of rotation and an elevation angle relative to a plane perpendicular to the axis of rotation, the bearing angle and the elevation angle corresponding to a direction from the image capture device toward a location of the incident. The method can include determining, using the direction and a digital elevation model of the geographical area, a range of distances from the image capture device to a portion of the geographical area comprising the location of the incident. The method can include providing, for presentation, an indicator indicative of the range of distances from the location of the image capture device to the portion of the geographical area.

The method can include receiving a request comprising information about the incident, the request indicative of the region of interest and a time interval. In some implementations, the method can include identifying, based on the time interval, the plurality of images stored in a data repository. In some implementations, the method can include determining, within at least a portion of the image, the region of interest based on a relation between the location of the image capture device and the region of interest according to the bearing angle.

The method can include determining a range of bearing angles about the axis of rotation, the range of bearing angles comprising the bearing angle and corresponding to a width of the portion of the geographical area corresponding to the region of interest. In some implementations, the method can include determining the region of interest based on the range of bearing angles in relation to the location of the image capture device.

At least one aspect relates to a non-transitory computer readable media storing instructions, which when executed by one or more processors, cause the one or more processors to receive a plurality of images captured by an image capture device about an axis of rotation of the image capture device. The instructions can cause the one or more processors to identify, within at least an image of the plurality of images, a region of interest that corresponds to an incident within a geographical area surrounding a location of the image capture device. The instructions can cause the one or more processors to determine, for the region of interest, a bearing angle about the axis of rotation and an elevation angle relative to a plane perpendicular to the axis of rotation, the bearing angle and the elevation angle corresponding to a direction from the image capture device toward a location of the incident. The instructions can cause the one or more processors to determine, using the direction and a digital elevation model of the geographical area, a range of distances from the image capture device to a portion of the geographical area comprising the location of the incident. The instructions can cause the one or more processors to provide, for presentation, an indicator indicative of the range of distances from the location of the image capture device to the portion of the geographical area.

At least one aspect relates to a system. The system can receive an indicator of a location of an incident in a geographical area surrounding an observation station. The system can cause, responsive to the indicator, one or more image capture devices located at the observation station to rotate about an axis and capture, within a predetermined time interval, a first image of the location of the incident in accordance with a visible mode of operation and a second image of the location of the incident in accordance with an infrared mode of operation. The first image can include a visible spectral range characteristic of the incident and the second image can include an infrared spectral range characteristic of the incident. The system can generate, based on inputting the first image and the second image into an artificial intelligence model trained on incident image enhancement using images captured according to the visible mode of operation and the infrared mode of operation, a multi-mode image of the location of the incident. The multi-mode image can include the visible spectral range characteristic combined with the infrared spectral range characteristic of the incident.

The system can utilize the multi-mode image to initiate an incident response action. The incident response action can include at least one of: an alert for transmission to a remote device, a notification for presentation in a graphical user interface, or a message for an external emergency response system to provide data on the incident. The system can store the multi-mode image in association with geo-location data of the incident and a timestamp associated with the multi-mode image.

The system can transmit the multi-mode image to a remote computing device configured to perform automated incident classification. In some implementations, the predetermined time interval is an interval of up to about 1, 3, 5, 7, 10 or 15 seconds. The artificial intelligence model can include a neural network trained using paired visible mode and infrared mode images of incidents labeled with ground truth incident data from one or more geographical areas surrounding one or more observation stations. The multi-mode image can include a fused digital image combining pixel information of the visible spectral range characteristic corresponding to a smoke at the location of the incident with pixel information of the infrared spectral range characteristic of a flame at the location of the incident.

The system can generate, for each of the first image and the second image, a metadata identifying at least one of: a modality of the respective image, a timestamp, an identifier of an image capture device of the one or more image capture devices, and a field of view. The metadata further identifies one or more geo-location coordinates of one or more of: a location of the incident or a location of observation station. The system can generate a confidence score reflecting a likelihood that the multi-mode image depicts an incident, the confidence score determined based on analysis of both the visible spectral range characteristic and the infrared spectral range characteristic. The system can selectively adjust a weighting of the visible spectral range characteristic and the infrared spectral range characteristic in the multi-mode image according to ambient lighting impacting the observation station.

At least one other aspect relates to a method. The method can be performed, for example, by one or more processors coupled to non-transitory memory. The method can include receiving an indicator of a location of an incident in a geographical area surrounding an observation station. The method can include causing, responsive to the indicator, one or more image capture devices located at the observation station to rotate about an axis and capture, within a predetermined time interval, a first image of the location of the incident in accordance with a visible mode of operation and a second image of the location of the incident in accordance with an infrared mode of operation. The first image can include a visible spectral range characteristic of the incident and the second image can include an infrared spectral range characteristic of the incident. The method can include generating, based on inputting the first image and the second image into an artificial intelligence model trained on incident image enhancement using images captured according to the visible mode of operation and the infrared mode of operation, a multi-mode image of the location of the incident. The multi-mode image can include the visible spectral range characteristic combined with the infrared spectral range characteristic of the incident.

The method can include utilizing the multi-mode image to initiate an incident response action. The incident response action can include at least one of: an alert for transmission to a remote device, a notification for presentation in a graphical user interface, or a message for an external emergency response system to provide data on the incident. In some implementations, the method can include storing the multi-mode image in association with geo-location data of the incident and a timestamp associated with the multi-mode image. The method can include transmitting the multi-mode image to a remote computing device configured to perform automated incident classification. The predetermined time interval can be an interval of up to 5 or 10 seconds.

The method can include training a neural network of the artificial intelligence model using paired visible mode and infrared mode images of incidents labeled with ground truth incident data from one or more geographical areas surrounding one or more observation stations. The multi-mode image can include a fused digital image combining pixel information of the visible spectral range characteristic corresponding to a smoke at the location of the incident with pixel information of the infrared spectral range characteristic of a flame at the location of the incident. The method can include generating, for each of the first image and the second image, a metadata identifying at least one of: a modality of the respective image, a timestamp, an identifier of an image capture device of the one or more image capture devices, and a field of view.

At least one aspect relates to a system. The system can identify a plurality of constituent images captured by an image capture device rotated about an axis of rotation of the image capture device, where each constituent image corresponds to a respective range of angles about the axis. The system can identify, for each constituent image, an offset caused by a difference between the axis of rotation and a reference axis. The system can align, using the respective offset for each respective constituent image corresponding to a respective range of angles, the plurality of constituent images to generate a composite image. The system can store, in one or more data structures, the composite image.

The system can determine, for each constituent image, the offset of the constituent image based on the respective difference between the axis of rotation and the reference axis for the respective range of angles corresponding to the respective constituent image. The system can store, in a data repository, the offset for each respective range of angles corresponding to each constituent image. The system can determine that the plurality of constituent images are to be used to generate the composite image. In some implementations, the system can obtain, responsive to the determination, the offset for each constituent image of the plurality of constituent images. The offset can include at least one of an angular adjustment corresponding to an angular rotation of the respective constituent image, a lateral adjustment corresponding to a lateral shift of the respective constituent image, and a longitudinal adjustment corresponding to a longitudinal shift of the respective constituent image.

The system can align at least one constituent image of the plurality of constituent images according to at least one of the angular adjustment, the lateral adjustment, or the longitudinal adjustment for the at least one constituent image to generate the composite image. The system can align each constituent image of the plurality of constituent images according to at least one of the angular adjustment, the lateral adjustment, or the longitudinal adjustment for each constituent image to generate the composite image. In some implementations, at least one offset of a plurality of offsets for the plurality of constituent images comprises no adjustment for the respective constituent image corresponding to the at least one offset.

The system can combine each constituent image of the plurality of constituent images with at least one other constituent image of the plurality of constituent images to generate the composite image that comprises a combined range of angles covering at least a portion of each respective range of angles of each constituent image about the axis of rotation. the combined range of angles of the composite image corresponds to at least 180 degrees about the axis of rotation. Each constituent image of the plurality of constituent images can be associated with metadata comprising at least one of: an identifier of the image capture device, an angular adjustment of the offset, a lateral adjustment of the offset, a longitudinal adjustment of the offset, a timestamp of constituent image capture, and a calibration status indicator.

The system can adjust the offset of a constituent image of the plurality of constituent images based on a comparison of an alignment of one or more physical features within the respective constituent image within the generated composite image with a known landmark. The system can determine that an update to calibration for one or more offsets of the one or more constituent images is due. The system can generate, responsive to the determination, at least one offset for at least one constituent image based on the respective difference between the axis of rotation and the reference axis for the respective range of angles for the constituent image.

The system can apply, to each constituent image based on the corresponding offset for the respective constituent image, a transformation matrix to align the respective constituent image. The composite image comprises a first spectral mode image data captured in a first spectral range and a second spectral mode image data captured in a second spectral range, and alignment of the plurality of constituent images is performed independently for the first spectral mode image data and for the second spectral mode image data. In some implementations, the system can provide, for presentation in a graphical user interface, the composite image.

At least one other aspect relates to a method. The method can be performed, for example, by one or more processors coupled to non-transitory memory. The method can include identifying a plurality of constituent images captured by an image capture device rotated about an axis of rotation of the image capture device, where each constituent image corresponds to a respective range of angles about the axis. The method can include identifying, for each constituent image, an offset caused by a difference between the axis of rotation and a reference axis. The method can include aligning, using the respective offset for each respective constituent image corresponding to a respective range of angles, the plurality of constituent images to generate a composite image. The method can include storing, in one or more data structures, the composite image.

The method can include determining, for each constituent image, the offset of the constituent image based on the respective difference between the axis of rotation and the reference axis for the respective range of angles corresponding to the respective constituent image. The method can include storing, in a data repository, the offset for each respective range of angles corresponding to each constituent image. The method can include determining that the plurality of constituent images are to be used to generate the composite image. The method can include obtaining, responsive to the determination, the offset for each constituent image of the plurality of constituent images. The method can include providing, for presentation in a graphical user interface, the composite image.

At least one other aspect relates to a non-transitory computer readable medium storing instructions, which when executed by one or more processors, cause the one or more processors to perform operations. The operations can include identifying a plurality of constituent images captured by an image capture device rotated about an axis of rotation of the image capture device, where each constituent image corresponds to a respective range of angles about the axis. The operations can include identifying, for each constituent image, an offset caused by a difference between the axis of rotation and a reference axis. The operations can include aligning, using the respective offset for each respective constituent image corresponding to a respective range of angles, the plurality of constituent images to generate a composite image. The operations can include storing, in one or more data structures, the composite image.

At least one aspect relates to a system for geographically targeted image retrieval at an observation station. The system can receive a request comprising a time indication and a location within a view range of an observation station that includes one or more image capture devices configured to capture constituent images about an axis of rotation to generate composite images. The system can identify, based on the location, a constituent image of a plurality of composite images for generating a composite image corresponding to the time indication. The system can retrieve, from calibration data in a data repository, an offset for the constituent image corresponding to a bearing angle about the axis and an elevation angle indicative of a portion of the constituent image corresponding to the location. The system can generate, from the constituent image and based on the bearing angle and the elevation angle, a zoomed image of the portion of the constituent image corresponding to the location. The system can provide, for presentation via a graphical user interface, the zoomed image responsive to the request.

The system can receive the request from a remote device via a network. The system can provide the zoomed image, for presentation via a graphical user interface of the remote device, responsive to the request. The offset comprises at least one of: an angular adjustment, a longitudinal adjustment, or a latitudinal adjustment for the constituent image. The system can generate the zoomed image based on the at least one of the angular adjustment, the longitudinal adjustment, or the latitudinal adjustment for the constituent image. The offset can be generated based on an angular difference between the axis and a reference axis.

The system can identify, based on the time indication and the location, a second constituent image of the plurality of constituent images. In some implementations, the system can retrieve, from the calibration data, a second offset for the second constituent image. In some implementations, the system can generate, from the constituent image and the second constituent image, the zoomed image. The system can identify, from the request, one or more geographic coordinates of the location. In some implementations, the system can determine, based on the one or more geographic coordinates, the bearing angle and elevation angle corresponding to the location. The bearing angle can be comprised within a range of bearing angles corresponding to a region of the location corresponding to a fire incident.

The system can determine, based on geographical coordinates of the observation station and the geographical coordinates of the location, the bearing angle and the elevation angle corresponding to the location. The system can identify, based on the bearing angle and the elevation angle, a portion of one or more constituent images corresponding to the location. The system can generate the zoomed image from the portion of one or more constituent images.

At least one other aspect relates to a method. The method can be performed, for example, by one or more processors coupled to non-transitory memory. The method can include receiving a request comprising a time indication and a location within a view range of an observation station that includes one or more image capture devices configured to capture constituent images about an axis of rotation to generate composite images. The method can include identifying, based on the location, a constituent image of a plurality of composite images for generating a composite image corresponding to the time indication. The method can include retrieving, from calibration data in a data repository, an offset for the constituent image corresponding to a bearing angle about the axis and an elevation angle indicative of a portion of the constituent image corresponding to the location. The method can include generating, from the constituent image and based on the bearing angle and the elevation angle, a zoomed image of the portion of the constituent image corresponding to the location. The method can include providing, for presentation via a graphical user interface, the zoomed image responsive to the request.

The method can include receiving the request from a remote device via a network. The method can include providing the zoomed image for presentation via a graphical user interface of the remote device, responsive to the request. The offset comprises at least one of: an angular adjustment, a longitudinal adjustment, or a latitudinal adjustment for the constituent image. The method can include generating the zoomed image based on the at least one of the angular adjustment, the longitudinal adjustment, or the latitudinal adjustment for the constituent image. The offset can be generated based on an angular difference between the axis and a reference axis.

The method can include identifying, based on the time indication and the location, a second constituent image of the plurality of constituent images. The method can include retrieving, from the calibration data, a second offset for the second constituent image. The method can include generating, from the constituent image and the second constituent image, the zoomed image. The method can include identifying, from the request, one or more geographic coordinates of the location. In some implementations, the method can include determining, based on the one or more geographic coordinates, the bearing angle and elevation angle corresponding to the location.

The bearing angle can be comprised within a range of bearing angles corresponding to a region of the location corresponding to a fire incident. The method can include determining, based on geographical coordinates of the observation station and the geographical coordinates of the location, the bearing angle and the elevation angle corresponding to the location. The method can include identifying, based on the bearing angle and the elevation angle, a portion of one or more constituent images corresponding to the location. In some implementations, the method can include generating the zoomed image from the portion of one or more constituent images.

At least one other aspect relates to a non-transitory computer readable medium storing instructions, which when executed by one or more processors, cause the one or more processors to perform operations. The operations can include receiving a request comprising a time indication and a location within a view range of an observation station that includes one or more image capture devices configured to capture constituent images about an axis of rotation to generate composite images. The operations can include identifying, based on the location, a constituent image of a plurality of composite images for generating a composite image corresponding to the time indication. The operations can include retrieving, from calibration data in a data repository, an offset for the constituent image corresponding to a bearing angle about the axis and an elevation angle indicative of a portion of the constituent image corresponding to the location. The operations can include generating, from the constituent image and based on the bearing angle and the elevation angle, a zoomed image of the portion of the constituent image corresponding to the location. The operations can include providing, for presentation via a graphical user interface, the zoomed image responsive to the request.

The instructions cause the one or more processors to receive the request from a remote device via a network. The instructions cause the one or more processors to provide the zoomed image, for presentation via a graphical user interface of the remote device, responsive to the request. The offset comprises at least one of: an angular adjustment, a longitudinal adjustment, or a latitudinal adjustment for the constituent image. The one or more processors are further configured to generate the zoomed image based on the at least one of the angular adjustment, the longitudinal adjustment, or the latitudinal adjustment for the constituent image. The offset can be generated based on an angular difference between the axis and a reference axis.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations and are incorporated in and constitute a part of this specification. Aspects can be combined, and it will be readily appreciated that features described in the context of one aspect of the invention can be combined with other aspects. Aspects can be implemented in any convenient form, for example, by appropriate computer programs, which may be carried on appropriate carrier media (computer readable media), which may be tangible carrier media (e.g., disks) or intangible carrier media (e.g., communications signals). Aspects may also be implemented using any suitable apparatus, which may take the form of programmable computers running computer programs arranged to implement the aspect. As used in the specification and in the claims, the singular form of 'a,' 'an,' and 'the' include plural referents unless the context clearly dictates otherwise.

DETAILED DESCRIPTION

Figure 1A:
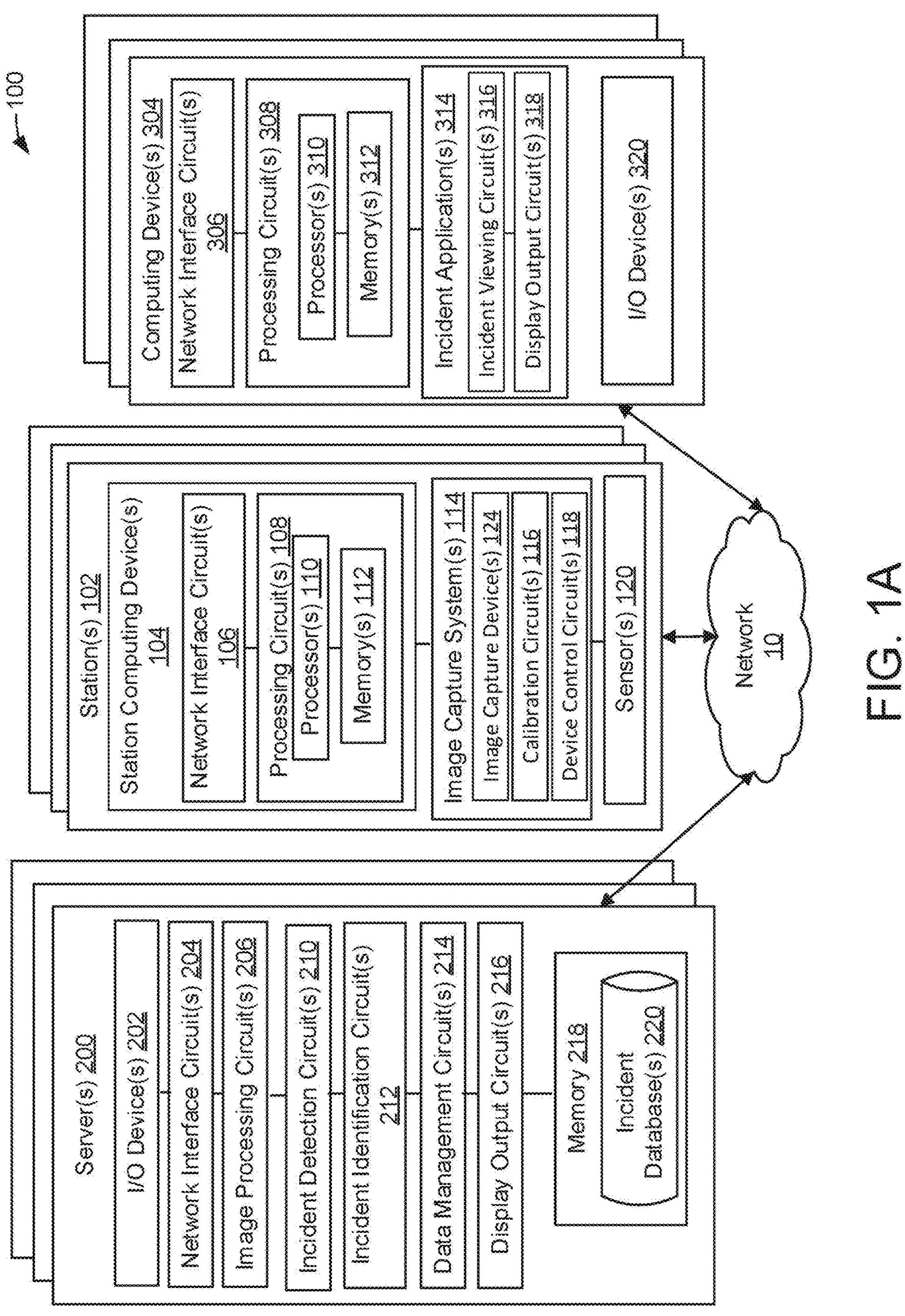
FIG. 1A is a schematic illustration of an incident detection system, according to an exemplary embodiment.

For purposes of reading the description of the various embodiments below, the following descriptions of the sections of the specification and their respective contents may be helpful:

- Section A describes an overview of an incident detection system;
- Section B describes calibration to reference direction of image capture systems of the incident detection system;
- Section C describes embodiments of image capture and time lapse panorama generation;
- Section D describes embodiments for providing a single station incident location range (SSILR) and a multi-mode image capture;
- Section E describes systems and methods for angular calibration for composite image generation and a geographic information based zoomed images; and
- Section F describes embodiments of a network environment and computing environment which may be useful for practicing embodiments described herein.

A. Overview of Incident Detection System

Referring to the figures generally, one or more systems and methods for imaging, detecting and monitoring fire incidents exhibiting smoke or flame are described herein. The system environment can include a plurality of observation or imaging stations positioned at various geolocations across a geographical area. Each station can be positioned, for example, on a hill, pole, structure or a mountain overseeing a large area within which various fire incidents could occur over time and can include an image capture system having one or more image capture devices for capturing images of the area. Each station can include, or be coupled with, one or more station computing devices configured to receive and process images captured by the image capture devices. The one or more image capture devices of each image capture system can be configured to rotate about a vertically oriented axis such that the image capture devices may capture images in 360 degrees around the observation station location, as the one or more image capture devices are orientated in a desired direction.

For instance, an observation station having one or more image capture systems may be located on an elevated ground (e.g., a hill, a mountain or an elevated structure). The one or more image capture systems may be configured to capture images of at least a portion of the horizon and the respective foreground. According to various embodiments, the image capture system may capture a group of images about an axis of the image capture system. These constituent images may be stitched together to create a composite image that shows a wider or a panoramic view, such as an 180, 270 or 360 degree view of the foreground surrounding the image capture system. According to various embodiments, the observation stations can be configured to routinely or periodically (e.g., every 20 to 30 seconds, every minute, or every 10 minutes) capture images of the surrounding area such that the surrounding area can be monitored for incidents (e.g., smoke incidents, wildfires, landslides, car accidents, severe weather, theft, property damage, etc.), as discussed further herein.

Referring now to FIG. 1, a schematic illustration of an incident detection system 100 is shown, according to an example embodiment. The incident detection system 100 (e.g., a smoke detection system, a fire detection system, landslide detection system, a car accident detection system, etc.) is configured to detect incidents via images captured from image capture systems in communication with the incident detection system. In some embodiments, the incident detection system 100 can be configured to detect smoke within one or more images and provide an alert in response to detecting the smoke according to embodiments of the present disclosure.

As shown in FIG. 1, the incident detection system 100 includes one or more servers 200 communicably and operably coupled to one or more stations 102 and/or one or more computing devices 304 via a network 10. In some embodiments, the one or more servers 200, one or more stations 102 and/or one or more computing devices 304 are directly communicably coupled. In some embodiments, the components of the incident detection system 100 may be communicably and operatively coupled to each other over a network, such as network 10, that permits the direct or indirect exchange of data, values, instructions, messages, and the like (represented by the double-headed arrows in FIG. 1). The network 10 may include one or more of a Local Area Network ("LAN"), a wide area network ("WAN"), a wireless network, a satellite communication system, acellular network, the Internet, Wi-Fi, Wi-Max, a proprietary provider network, a proprietary retail or service provider network, and/or any other kind of wireless or wired network.

Each system or device in the incident detection system 100 may include one or more processors, memories, network interfaces and user interfaces. The memory may store programming logic that, when executed by the processor, controls the operation of the corresponding computing system or device. The memory may also store data in databases or data structures. For example, memory 218 may store programming logic that when executed by one or more processors within one of the processing circuits (e.g., image processing circuit(s) 206, incident detection circuit(s) 210, incident identification circuit(s) 212, data management circuit(s) 214, display output circuit(s) 216, etc.), causes incident database(s) 220 to update information with communications received from a station(s) 102 and/or computing device(s) 304. The network interfaces (e.g., network interface circuit 204) may allow the computing systems and devices to communicate wirelessly or otherwise. The various components of devices in the incident detection system 100 may be implemented via hardware (e.g., circuitry), software (e.g., executable code), or any combination thereof. Devices and components in FIG. 1A can be added, deleted, integrated, separated, and/or rearranged in various embodiments of the disclosure.

The stations 102 are positioned at various geolocations across a geographical area and are configured to capture images of the surrounding area, associate data (e.g., image attributes, metadata, etc.) with the images, and provide the images and data to the server 200 for further processing. As shown in FIG. 1, each station 102 includes a station computing device(s) 104 communicably and operatively coupled to an image capture system(s) 114 and one or more sensor(s) 120.

As shown, the station computing device 104 includes a network interface circuit 106 that may allow the station computing device 104 to communicate wirelessly or otherwise. The network interface circuit 106 includes program logic that facilitates connection of the station computing device 104 to the network 10. For example, the network interface circuit 106 may include any combination of a wireless network transceiver (e.g., a cellular modem, a Bluetooth transceiver, a Wi-Fi transceiver, etc.) and/or a wired network transceiver (e.g., an Ethernet transceiver). In some arrangements, the network interface circuit 106 includes the hardware and machine-readable media sufficient to support communication over multiple channels of data communication. Further, in some arrangements, the network interface circuit 106 includes cryptography capabilities to establish a secure or relatively secure communication session in which data communicated over the session is encrypted.

In some embodiments, the network interface circuit 106 can include a plurality of communication channels, ports, interfaces, or modules that enable the station computing device to communicate with the server 200 or other entities. The network interface circuit 106 can be configured to maintain two or more data or internet connections with the server 200 or other entities and can be configured to monitor each of the data or internet connections to determine which connection to use for data transmission. In some embodiments, the station computing device 104 can establish, maintain, or manage two or more cellular connections simultaneously via two or more subscriber identity module (SIM) cards that are coupled to the station computing device 104. In some embodiments, the network interface circuit 106 can be configured to monitor data transmission rates, error rates, or other metrics for each of the two or more cellular connections to select a cellular connection via which to transmit data. If the selected cellular connection fails to satisfy certain performance metrics, for instance, upload speed falling below a threshold limit, or data throughput falling below a threshold limit, the network interface circuit can select another cellular connection to be the cellular connection via which to transfer subsequent data. By maintaining multiple SIM card connections, the station computing device 104 can maintain network redundancy in the event that a first SIM card connection fails. In some embodiments, the SIM cards can belong to different network carriers such that if a first network carrier fails, the second SIM card belonging to a second network carrier can be used. In some embodiments, the one or more SIM cards are configured to communicate over a satellite communication system. It should be appreciated that the connection types can be cellular or non-cellular and the station computing device 104 can switch between a cellular connection and a non-cellular connection as well based on the network conditions of each type of connection.

As shown, the station computing device 104 includes a processing circuit 108 that includes one or more processors 110 coupled to one or more memories 112. The memory 112 may be one or more devices (e.g., RAM, ROM, Flash memory, hard disk storage) for storing data and/or computer code for completing and/or facilitating the various processes described herein. The memory 112 may be or include non-transient volatile memory, non-volatile memory, and non-transitory computer storage media. Memory 112 may include database components, object code components, script components, or any other type of information structure for supporting the various activities and information structures described herein. Memory 112 may be communicably coupled to the processor 110 and include computer code or instructions for executing one or more processes described herein. The processor 110 may be implemented as one or more application specific integrated circuits (ASICs), field programmable gate arrays (FPGAs), a group of processing components, or other suitable electronic processing components. As such, the station computing device 104 is configured to run a variety of application programs and store associated data in a database of the memory 112.

According to various embodiments, the memory 112 may store data associated with the station 102 and/or one or more station computing devices 104. For example, the memory 112 may store data such that the processor 110 may associate one or more pieces of data with subsequently captured images. For example, the memory 112 may store one or more indicators. According to various embodiments, the one or more indicators are added to the image as metadata. According to various embodiments, the one or more indicators may include a station identification indicator that is unique to the image capture system 114 and/or an image capture device identification indicator that is unique to the image capture device 124 used to capture the image. The one or more indicators may include a sequence indicator that is unique to a plurality of images (e.g., a sequence of images, a set of images, etc.). For example, some or all of the images captured in a sequence may include the same sequence indicator. The one or more indicators may include a time stamp indicator that indicates the time at which an individual image was captured or the times at which a plurality (e.g., sequence) of images were captured. The one or more indicators may include an image indictor that is unique to that image. The one or more indicators may include a device indicator that identifies the type of image capture device (e.g., make, model, image resolution, number of pixels in the horizontal direction, number of pixels in the vertical direction, the field of view of the device (e.g., epoch minutes and seconds), and/or any other attributes of the device) used to capture the image. The one or more indicators may include a geolocation indicator that indicates a geolocation (e.g., a latitude and/or a longitude) of the image capture device used to capture the image. The one or more indicators may include a structure indicator that indicates the type of structure the image capture device 124 is mounted to. The one or more indicators may include an elevation indicator that indicates the altitude of the image capture device 124 at the time the image was captured.

It should be appreciated that each indicator may also, or alternatively, be stored on one or more devices in the incident detection system 100. For example, a remote memory storage, such as cloud storage, the server 200, and/or the computing device 304 may store indicators associated with a specific station 102, image capture system 114, and/or a specific image capture device 124. In this example embodiment, the memory 112 of the station 102 may store a station identification indicator and/or one or more image capture device identification indicators and provide the station identification indicator and/or one or more image capture device identification indicators to another device along with an image or a plurality of images. The other device (e.g., the server 200, the computing device 304, etc.) may then retrieve other indicators (e.g., from local storage, from cloud storage, etc.) based on the station identification indicator and/or one or more image capture device identification indicators.

According to various embodiments, the processor 110 may generate metadata in response to an image being captured by the image capture system 114. For example, the station computing device 104 may be configured to determine a device angle of image capture device relative to an axis of rotation, a time at which the image was taken, etc. As is discussed further herein, this information may be stored as metadata within the image and utilized during various processes described herein.

As shown, the stations 102 each include an image capture system 114 configured to capture an image of an area near the image capture system 114. As shown, the image capture system 114 includes one or more image capture devices configured to capture an image of an area near the image capture system 114. The one or more image capture devices may include any type of camera, video camera, and/or any other optoelectronic component (e.g., a UV sensor/camera, an IR sensor/camera, etc.).

The image capture system 114 further includes a calibration circuit 116. The calibration circuit 116 may be used to determine a reference direction for use by the processing circuit 108, as is discussed further herein. The image capture system 114 further includes a device control circuit 118 that is configured to control the one or more image capture devices 124. For example, the device control circuit 118 may cause each of the image capture devices 124 to capture an image or a video and/or cause each of the image capture devices 124 to rotate about an axis, as is discussed further herein.

It should be appreciated that, according to some embodiments, the station computing devices 104 may be located apart from the image capture system 114. For example, the image capture system 114 may be elevated above the ground while the station computing device 104 may be located proximate the ground such that the station computing device 104 may be accessed by an operator while the operator is on the ground.

As shown, the station 102 includes one or more sensors 120. The one or more sensors 120 may be configured to detect local conditions proximate the station 102. For example, the one or more sensors 120 may include light sensors, noise sensors, weather sensors, wind sensors, pressure sensors, etc. According to various embodiments, one or more conditions detected by the one or more sensors 120 may be associated with an image captured by the image capture system 114 such that the data from the one or more sensors 120 may be provided to the server 200 along with one or more images captured by the image capture system 114.

According to various embodiments, the image capture device 124 can include or can be coupled to a mounting device configured to mount the image capture device to a structure, as is discussed further below. According to various embodiments, each image capture device 124 includes a housing. For example, the housing may reduce the risk of damage to the image capture device 124 (e.g., as a result of wind, rain, fire, falling debris, animal damage, etc.). According to various embodiments, each image capture device 124 may include a wiper configured to wipe (e.g., clear obstructions off) a lens and/or a housing of the image capture device 124.

As shown, the server 200 includes one or more input/output (I/O) device(s) 202, network interface circuit(s) 204, an image processing circuit(s) 206, incident identification circuit(s) 212, data management circuit(s) 214, and display output circuit(s) 216. Each of the one or more input/output (I/O) device(s) 202, network interface circuit(s) 204, an image processing circuit(s) 206, incident identification circuit(s) 212, data management circuit(s) 214, and/or display output circuit(s) 216 may include one or more processors coupled to one or more memories. The memory may be one or more devices (e.g., RAM, ROM, Flash memory, hard disk storage) for storing data and/or computer code for completing and/or facilitating the various processes described herein. The memory may be or include non-transient volatile memory, non-volatile memory, and non-transitory computer storage media. Memory may include database components, object code components, script components, or any other type of information structure for supporting the various activities and information structures described herein. Memory may be communicably coupled to the processor and include computer code or instructions for executing one or more processes described herein. The processor may be implemented as one or more application specific integrated circuits (ASICs), field programmable gate arrays (FPGAs), a group of processing components, or other suitable electronic processing components. As such, each of the circuits included as a part of the server 200 are configured to run a variety of application programs and store associated data in a database of the memory.

In some embodiments, the input/output device 202 includes suitable input/output ports and/or uses an interconnect bus (not shown) for interconnection with a local display (e.g., a touchscreen display) and/or keyboard/mouse devices (when applicable), or the like, serving as a local user interface for programming and/or data entry, retrieval, or other user interaction purposes. As such, the input/output device 202 may provide an interface for the user to interact with various applications stored on the server 200. For example, the input/output device 202 includes a keyboard, a keypad, a mouse, joystick, a touch screen, a microphone, a camera device, a biometric device, a virtual reality headset, smart glasses, and the like. As another example, input/output device 202, may include, but is not limited to, a television monitor, a computer monitor, a printer, a facsimile, a speaker, and so on.

As shown, the server 200 includes a network interface circuit 204 that may allow the server 200 to communicate wirelessly or via wired communication. The network interface circuit 204 includes program logic that facilitates connection of the server 200 to the network 10. For example, the network interface circuit 204 may include any combination of a wireless network transceiver (e.g., a cellular modem, a Bluetooth transceiver, a Wi-Fi transceiver, etc.) and/or a wired network transceiver (e.g., an Ethernet transceiver). In some arrangements, the network interface circuit 204 includes the hardware and machine-readable media sufficient to support communication over multiple channels of data communication. Further, in some arrangements, the network interface circuit 204 includes cryptography capabilities to establish a secure or relatively secure communication session in which data communicated over the session is encrypted.

According to various embodiments, the server may receive data or other information from third parties. For example, the network interface circuit 106 may facilitate receive information from third party sources. For example, as is discussed further herein, the server 200 may interact with one or more third party websites, extract data or other information from the third party websites, and associate the data or other information with one or more images received from the station 102. For example, the server 200 may access a website that publishes locations (e.g., GPS coordinates) and/or times (e.g., date, local time, etc.) of controlled burns and associate that information with one or more images that capture the controlled burn.

As shown, the server 200 includes an image processing circuit 206. The image processing circuit 206 is configured to manipulate one or more images. For example, the image processing circuit 206 may receive a plurality of images from a first station 102 and combine the plurality of images into a single image (e.g., a composite image). For example, according to various embodiments, the first station 102 captures a plurality of images representing a panoramic view (e.g., a 360 degree field of view, a 270 degree field of view, a 180 degree field of view, etc.) surrounding the station 102 and provides the plurality of images to the image processing circuit 206 such that the image processing circuit 206 may stitch together the plurality of images to create a single composite image (e.g., a 360 degree field of view, a 270 degree field of view, a 180 degree field of view, etc.). The field of view can correspond to a range of bearing angles that the image represents.

As shown, the server 200 includes an incident detection circuit 210. As discussed further herein, the incident detection circuit 210 is configured to detect an incident (e.g., smoke, fire, etc.) within an image and/or a plurality of images. For example, the incident detection circuit 210 may include one or more machine learning models trained to detect an incident (e.g., smoke) within an image. For example, the incident detection circuit may include a first machine learning model trained to detect incidents within images using a plurality of training images and a second machine learning model trained to detect incidents within at least one of the sequence of images. As is discussed further below, discrepancies between the first model and the second model may be leveraged to train each model. It should be appreciated that the computing device 304 may include a similar incident detection circuit 210 such that the first machine learning model and/or the second machine learning model may be trained and/or executed on the computing device 304.

According to various embodiments, the incident detection circuit 210 is configured to receive one or more inputs that indicate the location of an incident in an image. For example, a user of the server 200 may review images from an image capture system 114. The user may provide an indication of the incident in one or more images that captured an incident. Additionally or alternatively, a user of the computing device 304 (e.g., via the incident application 314) may provide indications of incidents in images provided to the computing device 304. The image and/or corresponding indication of the incident may then be provided to the server 200.

As shown, the server 200 includes an incident identification circuit 212. The incident identification circuit 212 is configured to receive images from two or more stations, wherein the images capture an incident, and determine a geolocation or an approximate geolocation of the incident based on the images received and data associated with the images, as is discussed further herein.

As shown, the server 200 includes a data management circuit 214. The data management circuit 214 is configured to reduce the amount of data transmitted from the server 200 to other components of the incident detection system 100. For example, as discussed herein, the server may leverage two different machine learning models to detect an incident. The data management circuit 214 may leverage the predictions output by the models to reduce the amount of data from the server 200 to other components of the incident detection system 100.

Further, the data management circuit 214 is configured to write, store, organize, and/or control access to data stored on the server. For example, the data management circuit 214 may be configured to organize data within various folders. Further, the data management circuit may be configured to store and delete data from the server 200. For example, after a predetermined period of time has passed, an image may be deleted by the data management circuit 214. Further, the data management circuit 214 may be configured to control access to the data. For example, a first type of user account may access individual (e.g., constituent) images while a second type of user account may access composite images.

As shown, the server 200 includes a display output circuit 216. The display output circuit 216 is configured to generate a graphical user interface (GUI) that includes an image and/or a plurality of images and various information related to that image or the plurality of images. For example, as is discussed further herein, the display output circuit 216 may generate a GUI that includes an image, a bearing corresponding with the image, a compass, and/or a map overly that shows the location of an incident on a map. According to various embodiment, the display generated by the display output circuit 216 may be provided to and/or retrieved by an incident application 314 on one or more computing devices 304, as is discussed further herein. According to various embodiments, the display output circuit 216 can communicate with a remote device (e.g., the computing device 304) and cause the graphical user interface to be displayed on a display of the remote device.

As shown, the server 200 includes a memory 218 including one or more incident databases 220. The memory 218 may be one or more devices (e.g., RAM, ROM, Flash memory, hard disk storage) for storing data and/or computer code for completing and/or facilitating the various processes described herein. The memory 218 may be or include non-transient volatile memory, non-volatile memory, and non-transitory computer storage media. Memory 218 may include database components, object code components, script components, or any other type of information structure for supporting the various activities and information structures described herein. Memory 218 may be communicably coupled to the processor and include computer code or instructions for executing one or more processes described herein. The one or more incident databases 220 may store images received from the stations 102 and/or any other data associated with the images received from the stations 102. Further, the one or more incident databases 220 may store displays and/or graphical user interfaces (GUI) output by the display output circuit 216 as is discussed further herein. Furthermore, the one or more incident databases 220 may store training data for the one or more models.

The input/output device 202 is configured to receive communications from and provide communications to a user associated with the server 200. The input/output device 202 is configured to exchange data, communications, instructions, etc. with an input/output component of the server 200. In one embodiment, the input/output device 202 includes communication circuitry for facilitating the exchange of data, values, messages, and the like between the input/output device 202 and the components of the incident detection system 100. In yet another embodiment, the input/output device 202 includes machine-readable media for facilitating the exchange of information between the input/output device and the components of the incident detection system 100. In yet another embodiment, the input/output device 202 includes any combination of hardware components, communication circuitry, and machine-readable media.

As shown, the computing device(s) 304 includes a network interface circuit 306 may allow the station computing device 104 to communicate wirelessly or otherwise. The network interface circuit 306 includes program logic that facilitates connection of the computing device 304 to the network 10. For example, the network interface circuit 306 may include any combination of a wireless network transceiver (e.g., a cellular modem, a Bluetooth transceiver, a Wi-Fi transceiver, etc.) and/or a wired network transceiver (e.g., an Ethernet transceiver). In some arrangements, the network interface circuit 306 includes the hardware and machine-readable media sufficient to support communication over multiple channels of data communication. Further, in some arrangements, the network interface 306 includes cryptography capabilities to establish a secure or relatively secure communication session in which data communicated over the session is encrypted.

As shown, the computing device(s) 304 includes a processing circuit 308 that includes one or more processors 310 coupled to one or more memories 312. The memory 312 may be one or more devices (e.g., RAM, ROM, Flash memory, hard disk storage) for storing data and/or computer code for completing and/or facilitating the various processes described herein. The memory 312 may be or include non-transitory volatile memory, non-volatile memory, and non-transitory computer storage media. Memory 312 may include database components, object code components, script components, or any other type of information structure for supporting the various activities and information structures described herein. Memory 312 may be communicably coupled to the processor 310 and include computer code or instructions for executing one or more processes described herein. The processor 310 may be implemented as one or more application specific integrated circuits (ASICs), field programmable gate arrays (FPGAs), a group of processing components, or other suitable electronic processing components. As such, the station computing device 304 is configured to run a variety of application programs and store associated data in a database of the memory 312.

As shown, the computing device 304 includes an incident application 314. The incident application 314 is configured to enable a user of the computing device 304 to communicate with one or more components of the incident detection system 100. For example, the incident application 314 is shown to include an incident viewing circuit 316 configured to retrieve and/or receive displays (e.g., GUIs) generated by the display output circuit 216 for viewing and interaction on the computing device 304. For example, upon detection of an incident (e.g., smoke), the server 200 may generate an interactive time-lapse display. A user of the computing device 304 may retrieve this display from the incident database 220 and interact with the display, as is discussed further herein. Further, the incident application 314 may include a display output circuit 318, which may generate displays using images and/or data stored in the incident database 220 in a similar manner as the display output circuit 216. According to various embodiments, the incident application 314 is configured to run as a native application, a web application, a mobile application, a web application, hybrid applications, etc. According to various embodiments, the display output circuit 216 is configured to run a player configured to display images and/or videos. As is discussed further herein, the player may receive partial images and/or constituent images and create a display. According to various embodiments, the incident application 314 is configured to cause the display to be presented as a responsive web (e.g., creates dynamic changes to the appearance of a website, depending on the screen size and orientation of the device being used to view it).

According to various embodiments, the incident application 314 is configured to receive one or more inputs that indicate the location of an incident in an image. For example, a user of the incident application 314 may review images from an image capture system 114. The user may provide an indication of the incident in one or more images that captured an incident. Additionally or alternatively, a user of the incident application (e.g., via the incident application 314) may provide multiple indications of multiple incidents in an image provided to the computing device 304. The image and/or corresponding indication of the incident may then be provided to the server 200.

The input/output device 320 is configured to receive communications from and provide communications to a user associated with the computing device 304. The input/output device 320 is configured to exchange data, communications, instructions, etc. with an input/output component of the computing device 304. In one embodiment, the input/output device 320 includes communication circuitry for facilitating the exchange of data, values, messages, and the like between the input/output device 320 and the components of the incident detection system 100. In yet another embodiment, the input/output device 320 includes machine-readable media for facilitating the exchange of information between the input/output device and the components of the incident detection system 100. In yet another embodiment, the input/output device 320 includes any combination of hardware components, communication circuitry, and machine-readable media.

In some embodiments, the input/output device 320 includes suitable input/output ports and/or uses an interconnect bus (not shown) for interconnection with a local display (e.g., a touchscreen display) and/or keyboard/mouse devices (when applicable), or the like, serving as a local user interface for programming and/or data entry, retrieval, or other user interaction purposes. As such, the input/output device 320 may provide an interface for the user to interact with various applications stored on the computing device 304. For example, the input/output device 320 includes a keyboard, a keypad, a mouse, joystick, a touch screen, a microphone, a camera device, a biometric device, a virtual reality headset, smart glasses, and the like. As another example, input/output device 320, may include, but is not limited to, a television monitor, a computer monitor, a printer, a facsimile, a speaker, and so on.

Figure 1B:
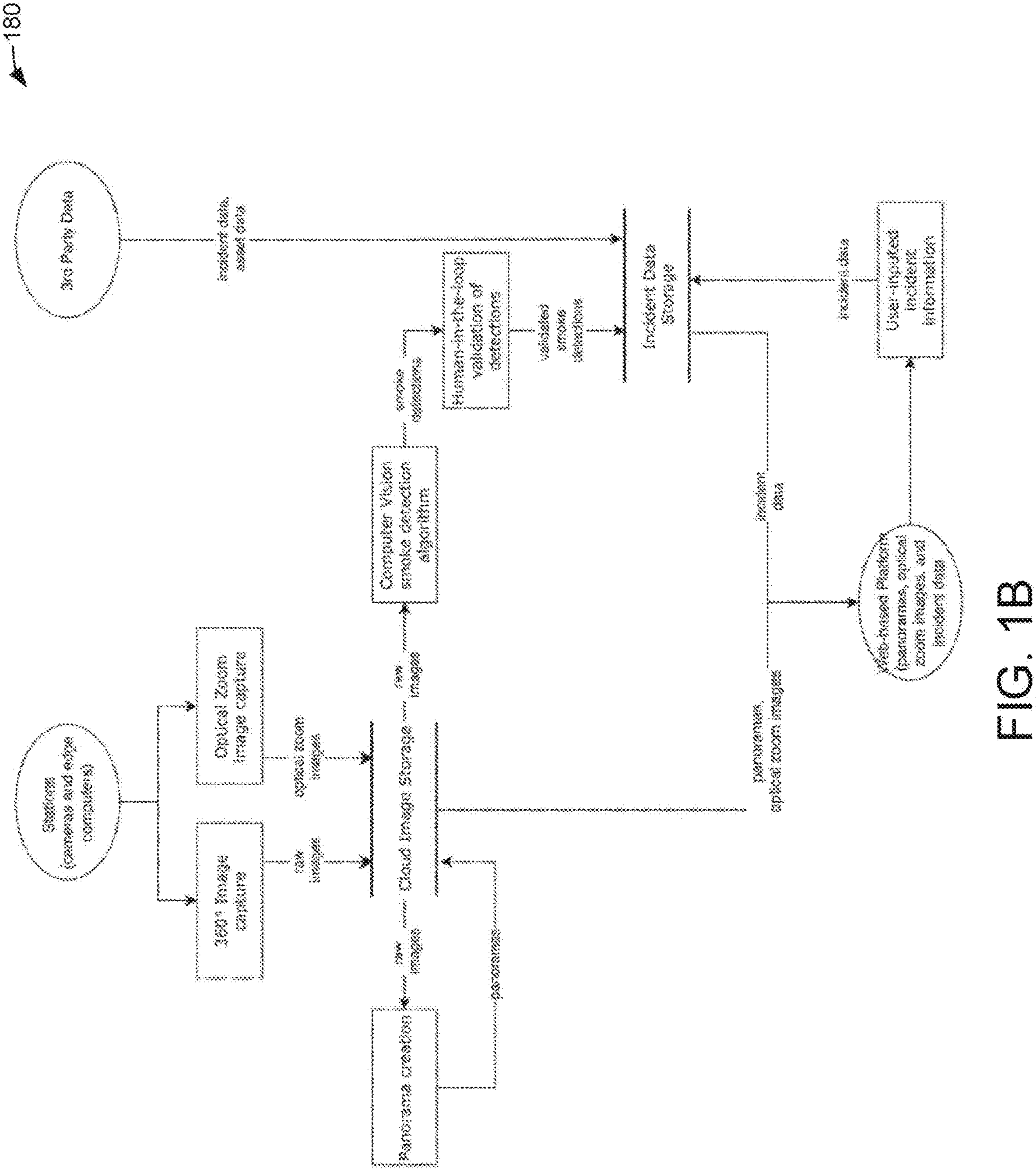
FIG. 1B is a flow chart for a method of maintaining an incident data storage database, according to an exemplary embodiment.

Referring now to FIG. 1B, a flow chart for a method of maintaining an incident data storage database 180 is shown, according to an example embodiment. The method 180 may be performed using one or more systems described herein (e.g., the incident detection system 100). Additionally, various processes described herein may involve some or all of the method 180. It should be appreciated that the method 180 need not be performed in the order shown. Further, one or more of the shown steps/processes may be omitted. Furthermore, one or more steps/processes may be added to the method 180.

The method 180 includes capturing one or more images at a station (e.g., the station 102). For example, an image capture device may capture an image of some or all of the area surrounding the station. According to various embodiments, the image capture device may rotate about an axis to capture a plurality of images which may later be stitched together to create a composite panoramic image (e.g., having a 360 degree field of view, a 180 degree field of view, etc.). Further, the image capture device may include an optical zoom feature. In this example embodiment, the image capture device may take a plurality of images at different zoom levels. For example, if an incident is able to be captured by the image capture device, zooming in and capturing the incident may result in more accurate incident detection via a model trained to detect incidents.

Images captured by the image capture devices at each station are then provided to a storage device. For example, the storage device may be included as a part the server 200. Additionally or alternatively, the storage device may include cloud storage. According to various embodiments, the cloud storage is operated by a third party.

As discussed further herein, the images stored in the storage device may be accessed by one or more devices. For example, the raw images may accessed by the server 200 and/or the computing device 304. According to various embodiments, the images are stitched together to create composite (e.g., panoramic) images. The composite images may then be provided to the image storage device such that the composite images may be accessed by one or more devices. According to various embodiments, the raw images, the optical zoom images, and/or the composite images may be accessed by the one or more devices via a web based platform. According to various embodiments, the images may be tagged with incident data by a user of the computing device. For example, a user of the computing device may indicate that an incident is shown in one or more images. The user of the computing device may further indicate the location of the incident within the image. According to various embodiments, this incident data may be provided to and stored within an incident data storage database.

As is discussed further herein, the images may be provided to one or more models trained to detect incidents in an image and/or in a plurality of images. According to various embodiments, the raw images and/or the composite images may be provided to the one or more models. The model(s) may then detect an incident (e.g., smoke, landslide, car accident, tornado, etc.) and an alert may be provided to one or more computing devices. According to various embodiments, the alert may include one or more of the image(s) that an incident was detected within. The incident may then be confirmed by a user of the computer device that received the alert. For example, the user of the computing device (e.g., the computing device 304) may manually review one or more images that an incident was detected in and confirm that there is an incident in the image or indicate that no incident is shown in the image. According to various embodiments, the user's indication of an incident being present or not being present may be converted to incident data and stored with the one or more images and stored in an incident data storage database.

According to various embodiments, the images may be provided to one or more computing devices 304 at a remote location. For example, one or more user accounts associated with a computing device 304 may be able to access constituent images from one or more image capture systems 114. A user of the computing device 304 may interact with the image and indicate a location of an incident or multiple locations or incidents within the image. The computing device 304 may then provide the image and/or the indication of the incident within the image to the server 200.

According to various embodiments, third party data may be stored in the incident data storage database. The third party data may further be associated with one or more images. The third party data may be provided to the model(s) trained to detect incidents to further train the model(s).

Figure 2:
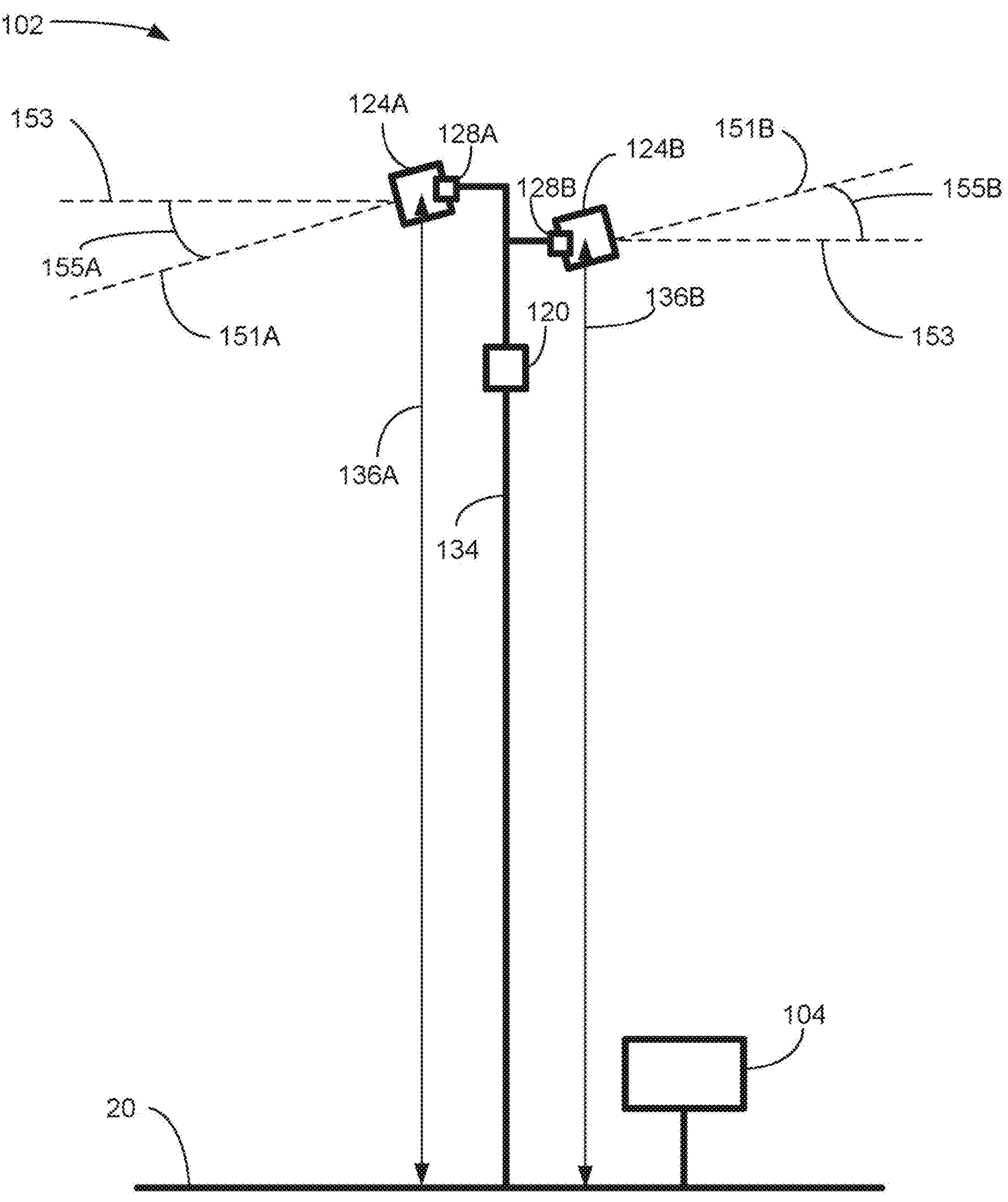
FIG. 2 is a side schematic view of a station, according to an exemplary embodiment.

B. Calibration to Reference Direction of Image Capture Systems of Incident Detection System Referring now to FIG. 2, a side schematic view of the station 102 is shown, according to an example embodiment. As shown, the station 102 includes the one or more image capture devices 124A, 124B coupled to a support 134, the station computing device 104, the one or more sensors 120, and a device adjustment mechanism 128A, 128B (e.g., a leveling adjustment mechanism) coupled to each image capture device 124A, 124B.

As shown, the station 102 includes a first image capture device 124A and a second image capture device 124B coupled to a support 134. As shown, the first image capture device 124A is a first height 136A off a ground 20 and the second image capture device 124B is a second height 136B off the ground 20. As shown, the first height 136A and the second height 136B need not necessarily be the same. Further, according to various embodiments, the first height 136A and/or the second height 136B may be individually adjustable. For example, the height of each image capture device 124 may be adjusted to increase the total field of view of the image capture device 124 (e.g., by avoiding obstructions in the field of view).

According to various embodiments, the support 134 may include an existing structure such that a new support 134 does not need to be built. For example, the support 134 may include a cell tower, a telephone pole, a tree, a lookout tower, a weather station, etc.). In this sense, the image capture devices 124 may include a mounting device (e.g., included in the adjustment mechanism 128) that allows the image capture device 124 to be coupled to a number of different types of supports 134.

As shown, the first image capture device 124A includes a first line of sight 151A. The line of sight 151A corresponds with the vertical angle the image capture device 124A is orientated (e.g., relative to a horizontal sight line 153 that is parallel to the ground 20). For example, according to various embodiments, the first line of sight 151A corresponds with a horizontal midline (e.g., the horizontal center 410 shown in FIG. 3) of an image captured by the image capture device 124A, as is discussed further herein. As shown, the first line of sight 151A defines a first vertical device angle 155A with respect to the horizontal sight line 153. Similarly, the second line of sight 151B defines a second vertical device angle 155B with respect to the horizontal sight line 153.

As shown, the station 102 includes a first device adjustment mechanism 128A coupled to the first image capture device 124A. The first device adjustment mechanism 128A is configured to adjust the first vertical device angle 155A. For example, the first device adjustment mechanism 128A may include an actuator (e.g., a servo motor) configured to adjust the first vertical device angle 155A. Alternatively or additionally, the first image capture device 124A may be configured to receive a level device such that the first device adjustment mechanism 128A may be utilized to adjust first vertical device angle 155A until the first image capture device 124A is level or approximately level (e.g., +/−0.1 degrees). For example, the device adjustment mechanism 128A may include one or more bolts or screws configured to alter the first vertical device angle 155A. Similarly, the second image capture device 124B is coupled to a second device adjustment mechanism 128B configured to adjust the second vertical device angle 155B.

The appropriate vertical camera angle 155 may vary by station 102. For example, depending on the surroundings, each image capture device 124 may have a desirable vertical device angle 155 that increases the amount of viewable foreground surrounding the station 102. For example, according to various embodiments, the vertical device angle 155 may be adjusted using the device adjustment mechanism 128A until approximately 0 degrees (e.g., +/−0.1 degrees). Similarly, the second image capture device 124B includes a second device adjustment mechanism 128B configured to adjust the second vertical device angle 155B.

According to various embodiments, each device adjustment mechanism 128 may include a horizontal angle adjustment mechanism that enables rotation of the image capture device 124 about an axis, as is discussed further herein. For example, the device control circuit 118 may cause the image capture device 124 to rotate about the axis. For example, each image capture device 124 may rotate 180 degrees or more about the axis such that the image capture system 114 is able to capture a plurality of images that represent a panoramic view (e.g., a 360 degree field of view, a 270 degree field of view, a 180 degree field of view, etc.) surrounding the station 102.

Figure 3:
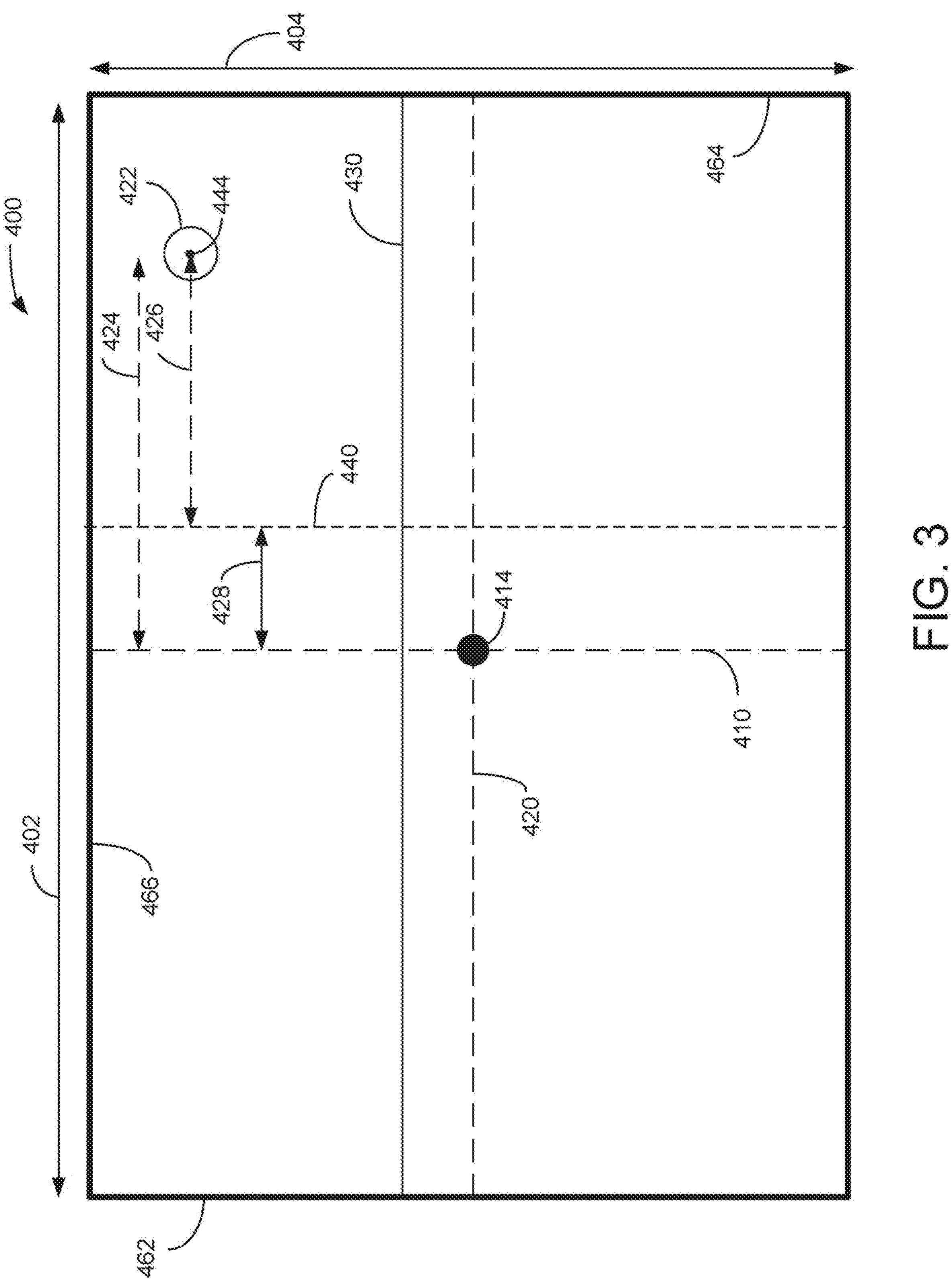
FIG. 3 is a schematic view of an image, according to an exemplary embodiment.

Referring now to FIG. 3, a schematic view of an image 400 is shown, according to an example embodiment. The image 400 may have been captured by an image capture system 114. The image 400 may be utilized for determining a reference direction 440 (e.g., via the calibration circuit 116). For example, the image 400 may be utilized during the method of determining a reference direction 500 described below with respect to FIG. 4.

As shown, the image 400 is defined by a width 402 and height 404. Collectively, the width 402 and the height 404 define the field of view of the image capture device 124 while the image capture device 124 is in a fixed orientation (e.g., the device angle is fixed). As shown, the width 402 extends from a first edge 462 to a second edge 464. According to various embodiments, the first edge 462 may be correspond with a first angle and the second edge 464 may correspond with a second angle, such that the horizontal field of view spans from the first angle to the second angle.

According to various embodiments, the image 400 is a digital image including a plurality of pixels. In this example embodiment, the width 402 and the height 404 may be represented using a number of pixels (e.g., the number of pixels spanning the image 400 in the horizontal direction and the vertical direction, respectively). Thus, a horizontal center 410 and a vertical center 420 may be determined (e.g., via the station computing device 104) based on the number of pixel spanning the image 400 horizontally and vertically. The horizontal center 410 and the vertical center 420 intersect at a center 414 of the image 400. According to various embodiments, the location of the vertical center 420 relative to the foreground may be adjusted (e.g., leveled) by adjusting the vertical device angle 155 (see FIG. 2) via the device adjust mechanism 128. According to various embodiments, the vertical center 420 may be adjusted to be below a horizon 430 to increase the amount of foreground visible within the image 400.

As is discussed further herein, the reference direction 440 may be determined (e.g., via the station computing device 104, the server 200, etc.) in part by identifying an object of interest 422 (e.g., a celestial object, a landmark, etc.). For example, an image capture device 124 may be coupled to a support 134 such that the reference direction 440 is within the field of view (e.g., between the first edge 462 and the second edge 464). For example, the reference direction 440 may be north. In this example, as the image capture device 124 is installed, the image capture device 124 may generally be aimed north when installed. For example, a compass may be referenced while installing the image capture device 124 to aim the image capture device 124 in the north direction. Further, in embodiments wherein the image capture device 124 may rotate about an axis between about a range of angles, the horizontal center 410 of the image capture device 124 is generally orientated towards the reference direction (e.g., north) while the device angle is generally centered within the range of angles.

After the image capture device 124 is installed, the image 400 may be taken while the image capture device 124 is set at a first device angle. An object of interest 422 may be identified in the image 400. For example, the object of interest 422 may be manually selected within image 400 via the station computing device 104. Alternatively, object detection software (e.g., a machine learning model trained to identify the object of interest 422) may be utilized by the station computing device 104 to identify the object of interest 422 within the image 400. As is discussed further below, a pixel coordinate 444 is assigned to the object of interest (e.g., via the station computing system 104). The pixel coordinate 444 generally includes a horizontal coordinate and a vertical coordinate that corresponds with a number of pixels between the horizontal edges 462, 464, a vertical edge 466, and the object of interest 422 (e.g., the center pixel of the object of interest 422).

As is discussed further herein, an expected bearing 426 of the object of interest 422 (e.g., with respect to the reference direction 440) may be determined based on the object of interest 422, the geolocation of the image capture device 124, and/or the time the image 400 was captured. For example, if the object of interest 422 is a celestial object (e.g., the sun, the moon, a star, etc.), the expected bearing 426 of the object of interest 422 (e.g., with respect to the reference direction 440) may be determined based on the object of interest 422, the geolocation of the image capture device 124, and the time (e.g., date, local time, etc.) the image 400 was captured. In another example embodiment, if the object of interest 422 is a landmark, the expected bearing 426 of the object of interest 422 (e.g., with respect to the reference direction 440) may be determined based on the object of interest 422 and the geolocation of the image capture device 124 without the time the image was captured. It should be appreciated that, according to various embodiments, identifying the reference direction 440) using a celestial object (e.g., the sun, the moon, a star, a consolation, etc.) or a landmark (e.g., a mountain peak, a building, a body of water, etc.) may be more accurate than determine a reference direction based on a compass.

As shown, the expected bearing 426 corresponds with the number of pixels (e.g., in the horizontal direction) between the pixel coordinate 444 and the reference direction 440. Thus, the reference direction 440 may be determined by converting (e.g., via the station computing device 104) the expected bearing 426 to a number of pixels and determining the reference direction using the number of pixels and the pixel coordinate 444.

The image capture system 114 may be calibrated such that the bearing of any object or incident identified in an image may be determined with reference to the reference direction 440. For example, a first angle 424 may be determined by counting the number of pixels between the horizontal center 410 and the pixel coordinate 444 and converting the number of pixels to the first angle. A second angle 428 (e.g., an offset angle) may be determined based on the difference between the first angle 424 and the expected bearing 426. The second angle 428 may then be used as an angular offset from the horizontal center 410 in images subsequently taken to ensure that bearings are determined with respect to the same reference direction 440. According to various embodiments, two or more image capture systems 114 located at various geolocations may all be calibrated to use the same reference direction 440 when determining the bearing of an object or incident in an image.

According to various embodiments, the first angle 424, the expected bearing 426, and/or the second bearing 428 may be determined by estimating a number of pixels rather than determining an exact number of pixels between various points in the image 400. For example, the number of pixels extending in a direction (e.g., the number of pixels corresponding with the width 402) may be determined or estimated based on the type of hardware being used to capture the image 400. For example, the image resolution may be determined or inferred from the data specification sheet associated with the image capture device 124. According to various embodiments, estimating a number of pixels, rather than determining the exact number of pixels, may accelerate one or more processes described herein and/or increase the efficiency by reducing the amount of data transferred/processed. For example, rather than downloading the entire image 400 to determine a number of pixels in the horizontal 402 direction, the total number of pixels may be estimated or determined based on the specification data sheet associated with the image capture device 124. This number may then be used to estimate the first angle 424, the expected bearing 426, and/or the second bearing 428. For example, a partial image may be downloaded to determine the number of pixels between the horizontal center 410 and the object of interest 444 to determine the first angle 424.

Figure 4:
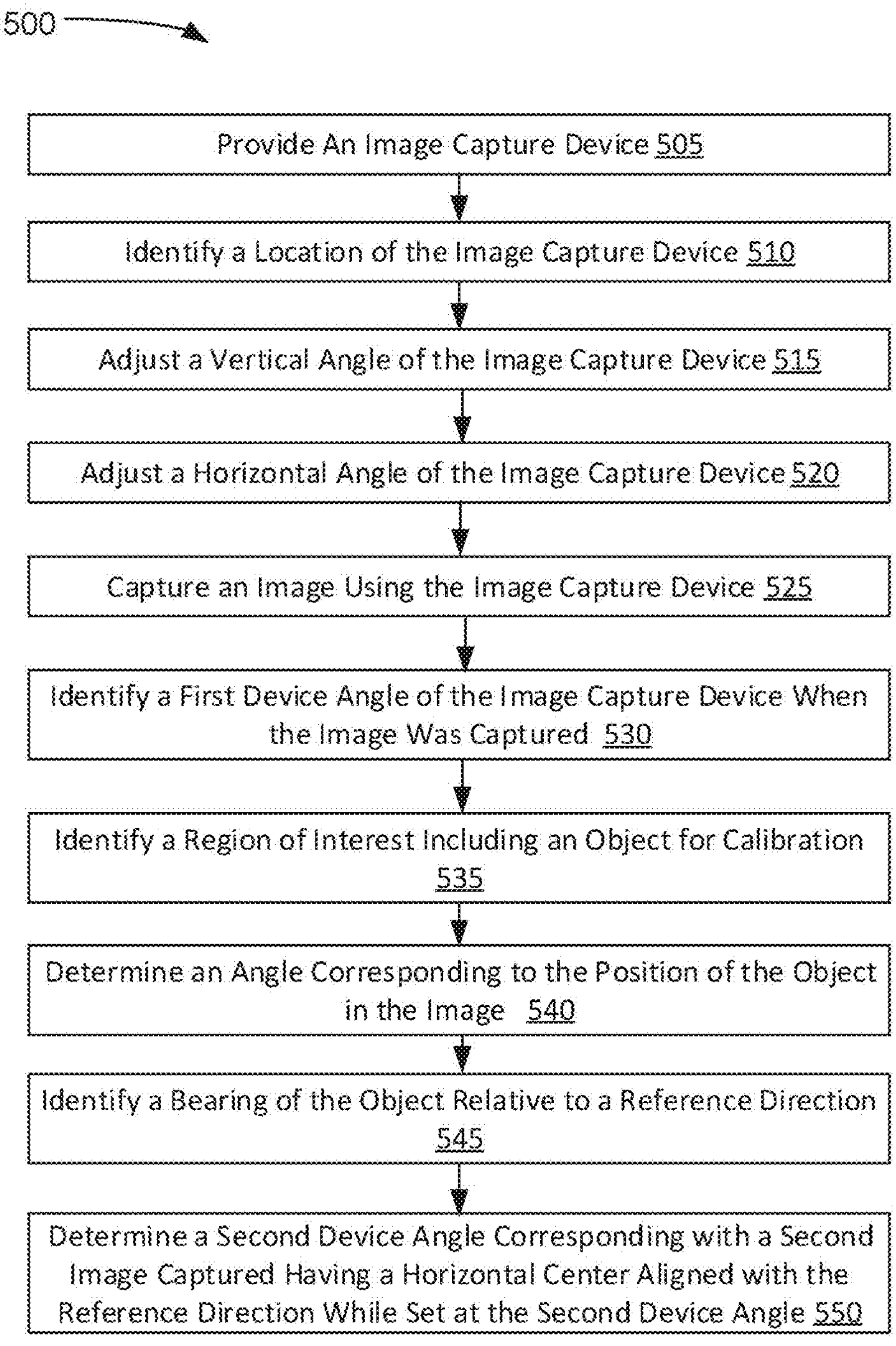
FIG. 4 is a flow chart of a method of determining a reference direction, according to an exemplary embodiment.

Referring now to FIG. 4, a flow chart of a method of determining a reference direction 500 is shown, according to an example embodiment. The method 500 may utilized to calibrate an image capture system 114. For example, the method 500 may be performed during the setup of a station 102. The method 500 may be performed by one or more components of the incident detection system 100. For example, the method 500 may be performed by one or more stations 102. For example, the method 500 may be performed by a plurality of stations 102 such that each station 102 is calibrated to determine a bearing corresponding with an object or incident captured within an image based on a reference direction. It should be appreciated that the method 500 does not need to be performed in the order shown in FIG. 4. Further, various processes shown in FIG. 4 may be omitted during the method 500. Furthermore, the method 500 may include additional processes not shown in FIG. 4.

At process 505, an image capture device is provided. For example, the process 505 may involve coupling one or more image capture devices 505 to a support (e.g., the image capture devices 124A, 124B may be coupled to support 134 shown in FIG. 2). The process 505 may involve setting an initial device angle for the image capture device. For example, process 505 may involve estimating a reference direction (e.g., using a compass to determine north) and orientating the image capture device such that the device angle is in the same general direction as a reference direction. According to various embodiments, the image capture device is configured to rotate about an axis. For example, the image capture device may be a Danhua™ outdoor turret camera.

At process 510, a location of the image capture device is identified. For example, a geolocation of the image capture device may be identified by one or more components of the incident detection system 100. The location of the image capture device may correspond with coordinates (e.g., Global Positioning System (GPS) coordinates) of the image capture device. According to various embodiments, the location of the image capture device may be identified by a station computing system. For example, the station that the image capture device is a part of may include a GPS system configured to determine coordinates of the image capture device. Alternatively or additionally, the location of the image capture device may be determined based on a satellite image that includes the image capture device. The location of the image capture device may be stored within a memory of the station computing device for later reference.

As discussed above, according to various embodiments, the memory 112 may store data associated with the station 102 and/or one or more station computing devices 104. For example, the memory 112 may store data such that the processor 110 may associate one or more pieces of data with subsequently captured images. For example, the memory 112 may store one or more indicators. According to various embodiments, the one or more indicators are added to the image as metadata. According to various embodiments, the one or more indicators may include a station identification (ID) indicator that is unique to the image capture system 114 and/or an image capture device identification (ID) indicator that is unique to the image capture device 124used to capture the image. The one or more indicators may include a sequence indicator that is unique to a plurality of images (e.g., a sequence of images, a set of images, etc.). For example, some or all of the images captured in a sequence may include the same sequence indicator. The one or more indicators may include a time stamp indicator that indicates the time at which an individual image was captured or the times at which a plurality (e.g., sequence) of images were captured. The one or more indicators may include an image indictor that is unique to that image. The one or more indicators may include a device indicator that identifies the type of image capture device (e.g., make, model, image resolution, number of pixels in the horizontal direction, number of pixels in the vertical direction, the field of view of the device, and/or any other attributes of the device) used to capture the image. The one or more indicators may include a geolocation indicator that indicates a geolocation (e.g., a latitude and/or a longitude) of the image capture device used to capture the image. The one or more indicators may include a structure indicator that indicates the type of structure the image capture device 124 is mounted to. The one or more indicators may include an elevation indicator that indicates the altitude of the image capture device 124 at the time the image was captured.

According to various embodiments, the processor 110 may generate metadata in response to an image being captured by the image capture system 114. For example, the station computing device 104 may be configured to determine a device angle of image capture device relative to an axis of rotation, a time at which the image was taken, etc. As is discussed further herein, this information may be stored as metadata within the image and utilized during various processes described herein.

According to various embodiments, the indicators and/or metadata may be stored on the memory 112 of the station 102, the memory 218 of the server 200, the memory 312 of the computing device 304, and/or a cloud memory that is accessible via the network 10. According to various embodiments, this information, along with any other information, may be stored in a lookup table or other data structure. A sample data structure, which may be stored on the memory 112 of the station 102, is shown below:

| Number | Data | Value |
|---|---|---|
| 1 | Station ID | S19 |
| 2 | First Image Capture Device ID | S19A |
| 3 | Second Image Capture Device ID | S19B |
| 4 | Sequence ID | I24315 |
| 5 | First Device Angle | A42 |
| 6 | Second Device Angle | B48 |
| 7 | Geolocation of First Image Capture Device | 15426, 26475 |
| 8 | Geolocation of Second Image Capture Device | 26325, 32678 |
| 9 | Elevation of First Image Capture Device | 6531 |
| 10 | Elevation of Second Image Capture Device | 3163 |
| 11 | Reference Direction of First Image Capture Device | R1 |
| 12 | Reference Direction of Second Image Capture Device | R2 |
| 13 | Second Angle Associated with First Image Capture Device | A242642 |
| 14 | Second Angle Associated with Second Image Capture Device | A23625 |
| 15 | Mounting Structure Identifier | M3 |
| 16 | Make of First Image Capture Device | C462 |
| 17 | Make of Second Image Capture Device | C462 |
| 18 | Model of First Image Capture Device | CM6427 |
| 19 | Model of Second Image Capture Device | CM6427 |
| 20 | First Time Stamp | 12, 52 |
| 21 | Second Time Stamp | 12, 57 |

At process 515, a vertical angle of the image capture device is adjusted. For example, a device adjustment mechanism (e.g., a leveling adjustment mechanism) may be coupled to the image capture device. For example, the device adjustment mechanism may include an actuator (e.g., a servo motor) configured to adjust the first vertical device angle. Alternatively or additionally, the image capture device may be configured to receive a level device such that the first device adjustment mechanism may be utilized to manually adjust first vertical device angle until the leveling device indicates that the first image capture device is level or approximately level (e.g., +/−0.1 degrees). For example, the device adjustment mechanism may include one or more bolts or screws configured to alter the first vertical device angle.

At process 520, a horizontal angle of the image capture device is adjusted. For example, when coupling the image capture device to the support, the horizontal device angle may be adjusted by a user installing the image capture device. For example, an image capture device may be coupled to a support such that a desired reference direction is within the field of view (e.g., between a first horizontal edge of an image captured by the image capture device and a second horizontal edge). For example, the reference direction may be north. In this example, as the image capture device is installed, the image capture device may generally be aimed north when installed. For example, a compass may be referenced while installing the image capture device to aim the image capture device in the north direction. Further, in embodiments wherein the image capture device may rotate about an axis between about a range of angles, the horizontal center of the image capture device is generally orientated towards the reference direction (e.g., north) while the device angle is generally centered within the range of angles.

At process 525, an image is captured by the image capture device. The image may be utilized for determining a reference direction (e.g., via the calibration circuit 116). For example, the image may be the image 400 show in FIG. 3. According to various embodiments, one or more pieces of data are associated with the image. For example, the station computing system may associate a time the image was captured, a location of the image capture device, a device angle associated with the image capture device at the time the image was captured, weather attributes present at the time the image was captured, and/or any other piece of information discussed herein.

At process 530, a first device angle of the image capture device at the time the image was captured is identified. The device angle may correspond with the direction of the horizontal middle of the image. For example, the image capture device and/or image capture system may provide a relative device angle to the station computing device at the time the image is captured. The station computing device may then identify the device angle by identifying the data associated with the image as a part of process 520.

At process 535, a region of interest including an object for calibration is identified within the region for calibration of the image capture device. For example, a region of interest that includes an object of interest may be identified in the image. For example, the region of interest may be manually selected within image via the station computing device. Alternatively, object detection software (e.g., a machine learning model trained to identify the object of interest) may be utilized by the station computing device to identify a region of interest within the image. As a part of process 535, pixel coordinates within the region of interest may be identified for the object of interest. The pixel coordinate includes a vertical pixel coordinate and/or a horizontal pixel coordinate. The vertical pixel coordinate may be determined based on the number of pixels between the region of interest and a vertical edge of the image. The horizontal pixel coordinate may be determined based on the number of pixels between the region of interest and a horizontal edge of the image.

At process 540, an angle corresponding to the position of the object in the image is determined. For example, the angle may be determined with reference to the device angle identified as a part of process 520. According to various embodiments, the horizontal device angle corresponds with the vertical middle of the image (e.g., the vertical center 420 shown in the image 400 of FIG. 3). Using the pixel coordinates of the region of interest, the station computing system may determine a number of pixels between the vertical middle and the region of interest. The number of pixels may then be converted to a corresponding angle (e.g., angle 424 shown in FIG. 3), which corresponds with the position of the region of interest, including the object of interest, within the image.

At process 545, a bearing of the object relative to a reference direction is identified. For example, an expected bearing (e.g., the expected bearing 426 shown in FIG. 3) of the object relative to the reference direction may be determined. The expected bearing of the region of interest, and object of interest, (e.g., with respect to the reference direction) may be determined based on the image coordinates of the region of interest, the geolocation of the image capture device, and/or the time the image was captured. For example, if the object of interest is a celestial object, the expected bearing of the object of interest (e.g., with respect to the reference direction) may be determined based on the object of interest, the geolocation of the image capture device, and the time (e.g., date, local time, etc.) the image was captured. According to various embodiments, the location of a celestial object in the sky may be predicted based on a geolocation of the observer and the time the celestial object is observed. For example, on Apr. 26, 2022, at 7:00

AM PST, an observer in San Francisco, California may expect to see the sun at a bearing (e.g., corresponding with an azimuth of the sun) of 78.05 degrees relative to the north direction. Thus, in this example embodiment, the expected bearing would be 78.05 degrees.

In another example embodiment, the object of interest is a landmark. The expected bearing of the object of interest (e.g., with respect to the reference direction) may be determined based on the object of interest and the geolocation of the image capture device without relying on the time the image was captured. For example, by identifying the geolocation of the object of interest and the geolocation of the image capture device, an expected bearing (e.g., with respect to a reference direction) may be determined based on the geolocations.

At process 550, a second angle device angle is determined. For example, the second device angle (e.g., the angle 428 shown in FIG. 3) may correspond with a second image captured having a horizontal center aligned with the reference direction while set at the second device angle. In other words, when the image capture device is set to the second angle, the image capture device is orientated in the reference direction.

The second angle (e.g., an offset angle, the second angle 428 shown in FIG. 3, etc.) may be determined based on the difference between the first device angle (e.g., the horizontal center 410 shown in FIG. 3) identified at process 520 and the reference direction (e.g., the reference direction 440) determined using the expected bearing (e.g., the expected bearing 426) identified at process 545. The second angle may be used as an angular offset from the horizontal center in images subsequently taken to ensure that any bearing determined is determined with respect to the reference direction. For example, the station commuting system may associate the second angle with some or all images captured by the respective image capture device. According to various embodiments, two or more image capture systems located at various geolocations may all be calibrated to use the same reference direction when determining the bearing of an object or incident in an image.

According to various embodiments, the method 500 may be performed two or more times by a given image capture device and/or image capture system. For example, the reference direction and second angle may be determined using the same object of interest at different times. The reference directions determined during each iteration of the method 500 may then be used (e.g., by averaging, taking a weighted average, taking a median value, etc.) to determine a second angle to be associated with the image capture system. Additionally or alternatively, the reference direction and the second angle may be determined using a variety of objects of interest. The reference directions determined during each iteration of the method 500 may then be used (e.g., by averaging, taking a weighted average, taking a median value, etc.) to determine a second angle to be associated with the image capture system.

Figure 5:
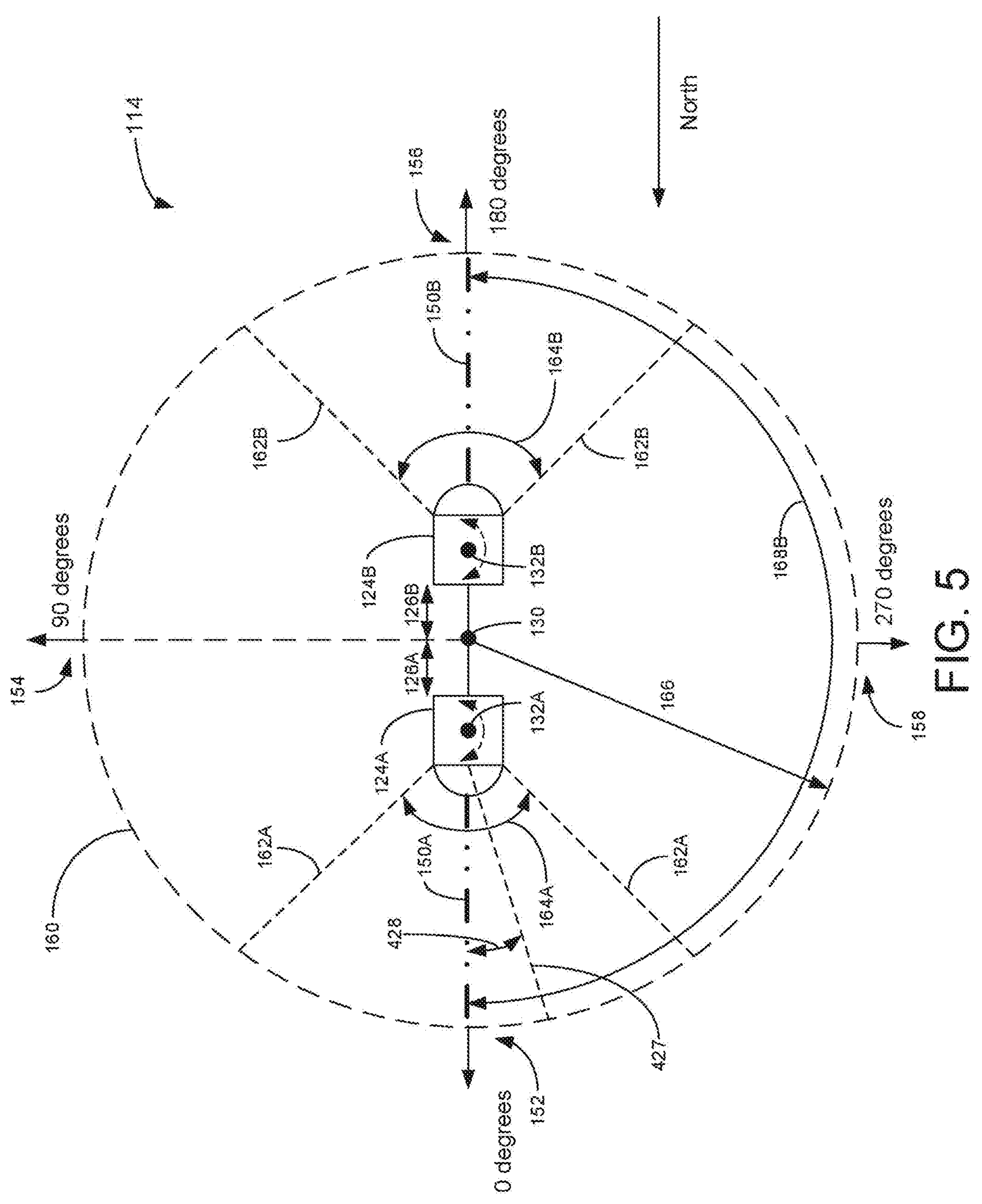
FIG. 5 is top view of a schematic illustration of an image capture system included in an incident detection system, according to an exemplary embodiment.
Figure 6:
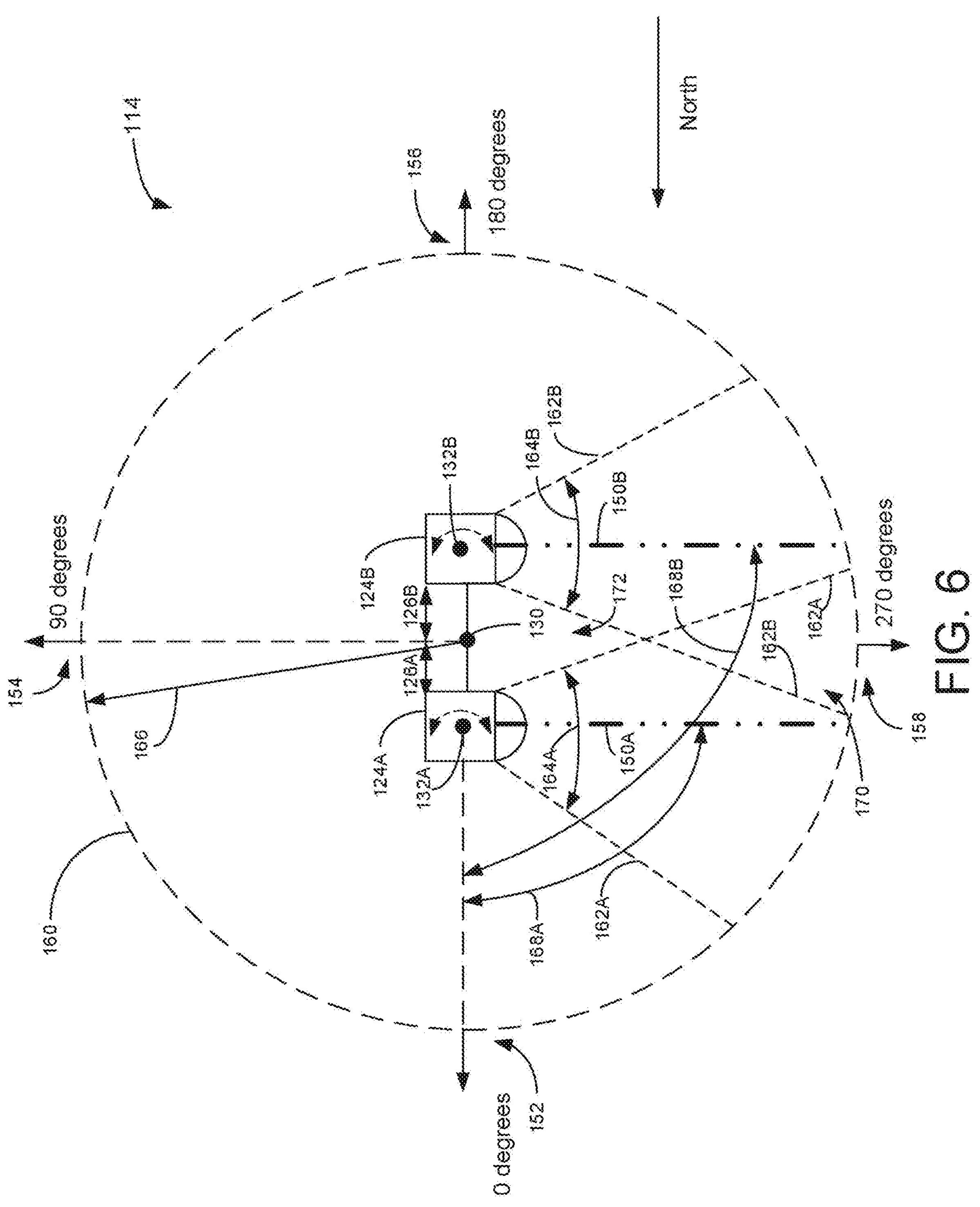
FIG. 6 is another top view of the image capture system schematic illustration of FIG. 5.

Referring now to FIGS. 5 and 6, schematic illustrations of a top view of an image capture system 114 included in an incident detection system 100 are shown, according to an example embodiment. As shown, the image capture system 114 defines a center 130 between the first image capture device 124A and the second image capture device 124B. As shown, the first image capture device 124A is located a first distance 126A from the center 130 and the second image capture device 124B is located a second distance 126B from the center. Further, as shown, the first image capture device 124A may rotate about a first axis of rotation 132A and the second image capture device 124B may rotate about a second axis of rotation. According to various embodiments, the image capture devices 124 are configured rotate (e.g., 90 degrees, 180 degrees, 270 degrees, 360 degrees, etc.) about the respective axis 132. According to other embodiments, the image capture devices 124 are configured to rotate less than 360 degrees (e.g., 190 degrees, 180 degrees, etc.) about the respective axis 132.

As shown, each image capture device 124 has a field of view 162 associated with the image capture device 124. The field of view 164 corresponds to the horizontal limits (e.g., the first horizontal edge 462 and the second horizontal edge 464 shown in FIG. 3) of an image captured by the image capture device 124 while set at a given device angle (e.g., the device angle 150). According to various embodiments, the field of view 164 for each image capture device 124 may be between 25 degrees and 75 degrees. For example, the field of view 164 may be 30 degrees, 45 degrees, 60 degrees, etc.

According to various embodiments, the image capture system 114 enables a panoramic view of the area 160 surrounding the image capture system 114. According to example embodiments, each image capture device 124 may be configured to capture objects and incidents in images up to a maximum distance 166 away from the center 130 of the image capture system.

According to example embodiments, each image capture device 124 may be calibrated (e.g., via the method 500). For example, when the first image capture device 124A is being calibrated, the device angle may align with a first angle 427 such that when an image is captured, the horizontal center (e.g., the horizontal center 410 shown in FIG. 3) aligns with the first angle 427. The method 500 may be utilized to determine a reference direction (e.g., a first reference direction 152, a second reference direction 154, a third reference direction 156, a fourth reference direction 158, etc.) and the second angle 428. As shown in FIG. 5, the first device angle 150A is aligned with the first reference direction 152 (e.g., north) and the second device angle 150B is aligned a second reference direction 156 (e.g., south). According to various embodiments, the device angle 150 of each image capture device 124 may be represented by an angular offset from a reference direction. For example, as shown in FIG. 6, the first device angle 150A defines a first angular offset angle 168A with respect to the first reference direction 152 and the second device angle 150B defines a second angular offset angle 168B with respect to the first reference direction. According to various embodiments, some or all images captured by the image capture devices 124 may be associated with an angular offset angle 168 such that the device angle 150 of the image capture device 124 at the time the image was captured may be identified.

As shown in FIG. 6, the first image capture device 124A and the second image capture device 124B may be orientated such that the first field of view 162A and the second field of view 162B define an overlap region 170 such that both the first image capture device 124A and the second image capture device 124B may capture an image that shows the overlap region 170. As is discussed further herein, the overlap region 170 may be utilized while generating a composite image.

As shown in FIG. 6, the first image capture device 124A and the second image capture device 124B are orientated such that an omitted area 172 exists between the first field of view 162A and the second field of view 162B. As shown, the omitted area 172 is largest proximate the center 130 and decreases in size as the distance from the center 130 increases. According to various embodiments, the omitted area 172 may be reduced by reducing the distance 126 between each image capture device 124 and the center 130. Further, as is discussed further herein, the image capture devices 124 may capture some or all of the omitted area 172 when orientated at a different device angle. These other images that do capture some or all of the omitted area 172 may be used to fill in the omitted area 172 when creating a composite image.

The reference axis can be any reference direction, ray or axis. In some instances, the reference axis can be a vertical axis that is perpendicular to the ground plane. The ground plane can be, for example, any plane parallel to a base or a ground that is level (e.g., having no slope), which can be measured by a level in any direction substantially parallel to the ground. In some implementations, the reference axis may be any predefined physical, virtual, or computational axis selected for purposes of calibration, alignment, or image projection. This can include, for example, an axis perpendicular or oblique to the ground plane, an axis aligned with a particular mounting orientation, a celestial direction (such as true north), a direction toward a particular star or object at a particular moment, a particular angle with respect to a compass reading or a level reading, a user-defined axis based on site-specific constraints, or any other suitable directional reference determined by operational or installation preference. The reference axis can be established based on physical measurement, computation, environmental cues, user settings or other system preferences.

Figure 7:
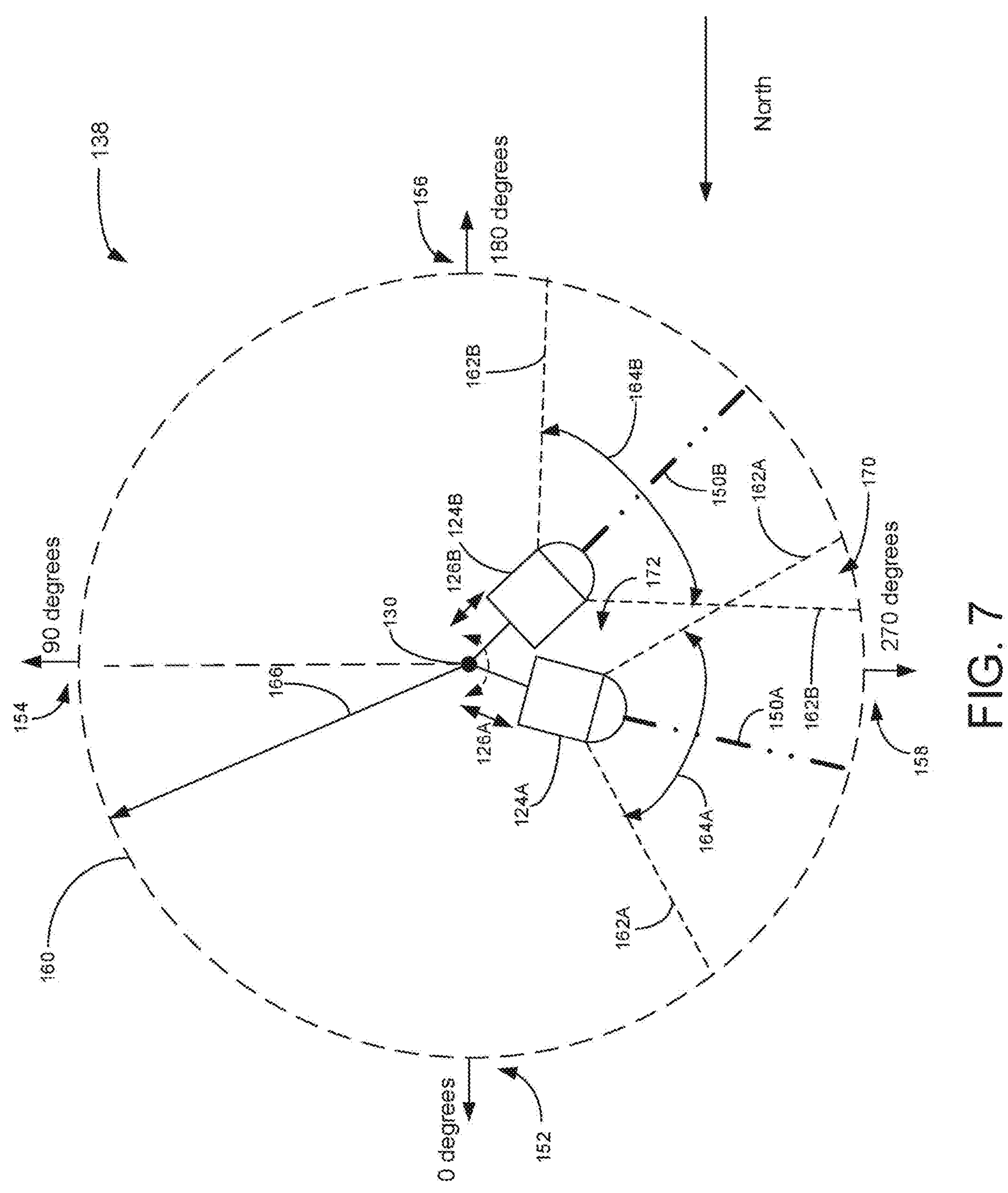
FIG. 7 is a schematic illustration of another station included in an incident detection system, according to an exemplary embodiment.

Referring now to FIG. 7, an alternate image capture system 138 is shown, according to an example embodiment. The image capture system 138 may share one or more features with the image capture system 114 discussed herein. However, as shown, the first image capture device 124A and the second image capture device 124B rotate about the center 130 (e.g., about an axis at the center 130) rather than about the first axis of rotation 132A and the second axis of rotation 132B.

C. Image Capture and Time Lapse Panorama Generation

As high-resolution, panoramic composite images can be useful to identify and track wildfires, creating such large composite images from multiple smaller constituent images can be compute intensive and more suitable for processing on a set of servers or a cloud service with many resources. Once generated, the large composite images can be transmitted from the remote servers, or the cloud, over the network and to the client devices on which the users can display the images on their local displays. However, transmitting large images across a network can be challenging. For example, when a large high-resolution, panoramic composite image encounters an error in transmission resulting in the corrupted image file being received at the receiving device, the entire image may have to be retransmitted over the network once again. Thereby, the error and the subsequent retransmission of the file can delays, which as smaller in the event of smaller images and larger in the event of larger images. In the instances in which an application utilizing large image files relies on many transmissions of such large images, as can be the case with the panoramic, composite images herein, network transmission errors can accumulate delays that can adversely affect the user experience. These delays can be exacerbated in the situations in which the network connection is spotty, such as in the mountains or remote areas in which the network communication is provided by remote cellphone towers.

The present solution can address these and other obstacles by transmitting over the network only either individual constituent images to be combined into larger composite images at the server or the cloud, or partitioned parts of the generated composite image to be transmitted over the network to the user device for display. Using this approach, the present solution in both instances sends smaller images instead of the larger one, thereby minimizing the duration of delays associated with any transmission errors, improving the user experience.

Figure 8:
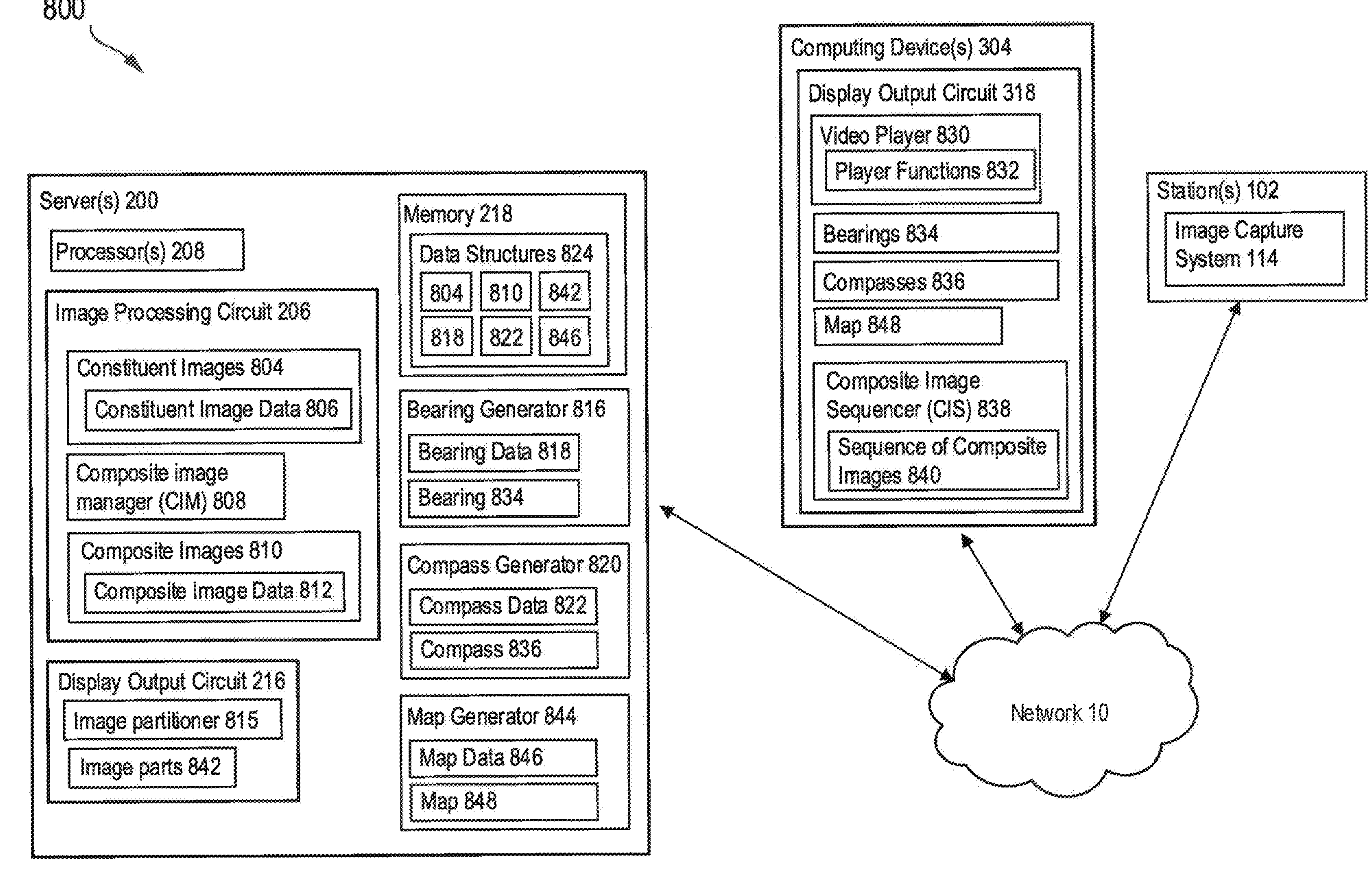
FIG. 8 illustrates an example of a system for implementing image capture and time lapse panorama composite image generation.

FIG. 8 illustrates an example system 800 in which one or more servers 200 communicate with one or more stations 102 and computing devices 304 via a network 10. One or more stations 102 can include one or more image capture systems 114. One or more computing devices 304 can include one or more display circuits 318 that can include one or more bearings 834, one or more compasses 836, one or more maps 848, one or more composite video sequencers (CIS) 838 having one or more sequences of composite images 840 and one or more video players 830 having one or more player functions 832. Along with processors 208, one or more servers 200 can include an image processing circuit 206 that can include one or more constituent images 804 that can include one or more constituent image data 806, one or more composite image managers (CIM) 808 and one or more composite images 810 that can include composite image data 812. One or more servers 200 can include one or more display output circuits 216, that can include one or more image partitioners 814 having one or more image parts 842 and one or more bearing generators 816 that can include one or more bearing data 818 and one or more bearings 834. One or more servers 200 can also include one or more compass generators 820 that can include one or more compass data 822 and one or more compasses 836 as well as one or more map generators 844 that can include one or more map data 846 and maps 848. Memory 218 can include one or more data structures 824 that can store one or more constituent images 804, one or more composite images 810, one or more bearing data 818, one or more maps data 846 and one or more compass data 822.

Constituent images 804 can include any images captured by an image capture system 114, including any raw images that can be captured by any image capture device 124. Constituent images 804 can be digital images and have any resolution in terms of megapixels, such as for example 10, 20, 30, 40, 50, 60, 70, 80, 90, 100, 200, 300, 400, 500 or more than 500 megapixels. Constituent images 804 can include any formats, including JPEG or JPG, PNG, TIFF, PSD, PDF, EPS or any other image formats. Constituent images 804 can include any aspect ratio of width to height, such as for example width to height ratios of 1:1, 4:3, 3:2 or 16:9. The aspect ratios can be defined by the field of view associated with an image capture device 124. Constituent images 804 can include width and height that can be defined by pixels. For example, constituent images 804 can be wide 2048 pixels and wide 1536 pixels, or any other pixel size, such as 4096 pixels by 3072, or 8192 pixels by 6144, or any other pixel size.

Constituent images 804 can include images along any range of electromagnetic spectrum or wavelength range. Constituent images 804 can include human visible range images, such as images whose captured light generally corresponds to wavelengths of about 400 nm to about 800 nm. Constituent images 804 can include infrared images, such as images whose captured light generally corresponds to wavelengths greater than 800 nm, such as for example any range between 800 nm and 50 micrometers. For example, constituent images 804 can include images whose captured light generally corresponds to wavelengths in the near-infrared images of about 0.8 to 5 micrometers in wavelength, mid-infrared wavelengths of about 5-25 micrometers or far-infrared wavelengths of about 25-40 micrometers. Constituent images 804 can include images whose captured light generally corresponds to any combination of visible and any infrared wavelength range.

Constituent images 804 can cover a specific angular range within the field of view 162 associated with an image capture device 124. Therefore, multiple constituent images 804 can be used to piece together a composite image 810 of 180° or more degrees about the axis. For the purposes of producing a composite image 810, constituent images 804 can include portions, such as a central portion 840 and the overlap portion 842, such as for example, illustrated in FIG. 10. The central portion of the constituent image 804 can include the portion of the constituent image 804 that can be used for creating the composite image 810, while the overlap portions 842 can include portions of a constituent image 804 that overlaps with another neighboring constituent image 804 that can be used for creating the composite image 810.

Constituent image data 806 can include any data for a constituent image 804. Constituent image data 806 can any data or information about an image, including any angle, direction or location discussed herein in connection with FIGS. 2-3 and 5-7. Constituent image data 806 can include information identifying an angle of a constituent image 804, such as a device viewing angle 164, or a device angle 168 that is relative to a reference direction, such as a reference direction 440, or any other angle, direction or other information corresponding to the constituent image 804 or a status of the image capture system 114 that captured the constituent image 804. Constituent image data 806 can include a time stamp indicating the time when the constituent image 804 was taken. Constituent image data 806 can include information on location where the constituent image 804 was taken. Constituent image data 806 can include information about neighboring constituent images 804 to be combined to either side of the constituent image 804 in order to create a composite image 810. Constituent image data 806 can include information about a reference direction 2140, width 2102, height 2104, device angles 150, device viewing angle 164, device angle relative to a reference direction 168, bearing to incident relative to reference direction 2170, reference direction 2140 or any other data, including directional and angular data or information discussed herein.

Composite images 810 can include any images generated by combining two or more constituent images 804. Composite images 810 can include a panoramic image spanning any range of angles. The range of angles can include any range of angles between 1 and 360, such as more than 20 degrees, 30 degrees 45 degrees, 60 degrees, 75 degrees, 90 degrees, 120 degrees, 140 degrees, 160 degrees, 180 degrees, 200 degrees, 220 degrees, 240 degrees, 270 degrees, 300 degrees, 330 degrees or up to full 360 degrees around a location, such as an axis. The axis can be an axis 132 of an image capture device 124, depending on the design.

The axis about which degree angles about the composite image 810 are defined can include the center 130 of the image capture system 114. For instance, a composite image 810 can cover a range of angles defined about axis corresponding to the center 130 of the image capture system 114. The center 130 can serve as the axis of the image capture system 114 when the image capture system 114 includes one or more image capture devices 124. In the instances in which an image capture system 114 utilizes two or more image capture devices 124 centered away from the center 130 by some distance, the distance between the center 130 and the axes 132 of image capture devices 124 can be very small in comparison to the distance between the image capture system 114 (including devices 124) and the areas or features being images in the far field. For example, the distance between the center 130 and axes 132 can be hundreds or thousands of times smaller than the distance between the image capture system 114 (e.g., devices 124) and the locations or terrains at the distance that are being imaged by the constituent images 804. In such instances, given the large difference between these two distances, the center 130 can be used as an axis about which composite image 810 is formed despite the fact that it may not correspond exactly to the mathematical axis for each of the plurality of image capture devices 124 from which constituent images 804 may be gathered for the composite image 810.

Composite images 810 can be generated such that each portion of a composite image 810 corresponds to an angle, or a range of angles, defined about an axis of the image capture system 114. In some implementations, a composite image 810 can be generated from multiple constituent images 804 so that each portion of a composite image 810 corresponds to an angle, or a range of angles, defined about an axis of the image capture device 124. Composite images 810 can be generated by combining, merging or stitching constituent images 804 along vertical axes of the constituent images 804 (e.g., along the height). Composite images 810 can be generated by combining, merging or stitching multiple constituent images 804 end to end along their respective vertical heights. Composite images 810 can be generated by combining, merging or stitching multiple constituent images 804 end to end along their respective vertical heights.

Composite images 810 can be generated such that when constituent images 804 are combined, merged or stitched long their respective widths, they are combined, merged or stitched so that their respective ends overlap. The overlap can be defined based on device field of view overlap 170 as it applies to each constituent image. For example, the overlap between two concatenated neighboring constituent images 804 in a composite image 810 can correspond to about 59, 109, 159 or 209 of the two neighboring constituent images 804. The two overlapping parts of each neighboring constituent image 804 can correspond to the same one or more items, features or locations imaged and can be identical to each other.

Composite image data 812 can include any data of a composite image 810. Composite image data 812 can include any constituent image data 806 for each portion of the composite image 810 corresponding to each constituent image 804 included in the composite image 810. Composite image data 812 can include a timestamp or a time data for the composite image 810. The timestamp or time data can correspond to a time period of time to which the composite image 810 corresponds. For example, the timestamp or time data can correspond to a time range spanning the time period when each of the constituent images 804 were taken. Timestamp or time data can correspond to series of timestamps, each timestamp corresponding to the time of capture of each individual constituent image 804 of the composite image 810.

Composite image data 812 can include data corresponding to the resolution of the composite image 810. The resolution can be defined based on pixels, such as discussed earlier with respect to constituent images 804. Composite image data 812 can include or identify the width and height of the composite image 810 such as discussed earlier with respect to constituent images 804. Composite image data

812 can identify the locations along the width of the composite image 810 where constituent images 804 are combined, stitched or merged. Composite image data 812 can include information about a reference direction 2140, width 2102, height 2104, device angles 150, device viewing angle 164, device angle relative to a reference direction 168, bearing to incident relative to reference direction 2170, reference direction 2140 or any other data, including directional and angular data or information discussed herein.

Composite image manager 808 can include hardware, software or any combination of hardware and software for creating composite images 810. Composite image manager 808 can include computer code, instructions or functions stored in memory (e.g., 218) to implement its functionality via processors 208. Composite image manager 808 can include the functionality to generate composite images 810 by combining constituent images 804. Composite image manager 808 can include the functionality to utilize constituent images 804 and their corresponding constituent image data 806 to form composite image 810. Composite image manager 808 can include the functionality to generate composite image data 812, including by utilizing constituent image data 806. Composite image manager 808 can include the functionality to determine overlap between constituent images 804.

Image partitioner 814 can include hardware, software or any combination of hardware and software for partitioning composite images 810 into various parts or portions. Image partitioner 814 can include computer code, instructions or functions stored in memory (e.g., 218) to implement its functionality via processors 208. Image partitioner 814 can include the functionality to separate a composite image 810 into any number of parts, such as for example into up to 2, 3, 4, 5, 6, 7, 8, 9, 10, 11, 12, 14, 16, 18, 20, 22, 24, 26, 28, 30 or more parts. The parts partitioned can be equal in size or different in size, can be equal in shape or be differently shaped. Image partitioner 814 can include the functionality to separate a composite image 810 into parts, such that each part corresponds to an individual constituent image 804. Each part can also include the constituent image data 806 for each corresponding part corresponding to a constituent image 804. Image partitioner 814 can include the functionality to separate images along the height, along the width, or along any combination of height and width.

Image parts 842 can include any one or more parts of a composite image 810 partitioned by an image partitioner 814. Image parts 842 can include composite image 810 split into any number of parts, such as up to 4, 6, 8, 10, 12, 16, 18, 20, 24, 30 or more parts. Image parts 842 can correspond to the constituent images 804 used to generate the composite image 810. Image parts 842 can for example include 10 parts for a composite image 810 that is generated based on ten constituent images 804 stitched together. Image parts 842 can include likewise any other number of parts. Image parts 842 can include information included in the composite image data 812 which can be sent to the computing devices 304 in order to recombine the image parts 842 into the composite image 810.

Bearing 834, which can also be referred to as the bearing indicator 834, can include an indication of one or more angles corresponding to an image, such as a constituent image 804 or a composite image 810. The angles corresponding to an image can include a series of angles about an axis of an image capture system 114 or an image capture device 124. Bearing 834 can include a strip that can be combined with or displayed with a composite image 810 or a constituent image 804. The strip can be rectangular and include a series of angles identifying angles respective to a constituent image 804 or a composite image 810. The series of angles can include anywhere between 0 and 360 degrees around the reference axis about which, or with respect to which, the composite image 810 was created. Between any two degrees, bearing 834 can identify minutes of angle, such as anywhere between 0 and 60 minutes. Between any two minutes of angle, bearing 834 can identify seconds of angle, such as anywhere between 0 and 60 seconds.

Bearing data 818 can correspond to any data or information concerning angles or directions of a constituent image 804 or a composite image 810. Bearing data 818 can include information about a reference direction 2140, width 2102, height 2104, device angles 150, device viewing angle 164, device angle relative to a reference direction 168, bearing to incident relative to reference direction 2170, reference direction 2140 or any other data, including directional and angular data or information discussed herein. Bearing data 818 can include the information about the range of angles corresponding to each portion of an image (e.g., 804 or 810). Bearing data 818 can include the information about the location within each image to which each individual angle, minute or angle or second or angle applies.

Bearing generator 816, which can also be referred to as the bearing circuit 816, can include hardware, software or any combination of hardware and software for creating a bearing 834, sometimes also referred to as the bearing indicator 834. Bearing generator 816 can include computer code, instructions or functions stored in memory (e.g., 218) to implement its functionality via processors 208. Bearing circuit 816 can include the functionality to generate a bearing 834 (e.g., a bearing indicator) for display within or with a composite image 810. Bearing generator 816 can include the functionality to determine an angle or a range of angles for each portion of a composite image 810, or each portion of a constituent image 804. Bearing circuit 816 can include the functionality to assign or associate an angle or a range of angles for each portion of a composite image 810, or each portion of a constituent image 804. Bearing circuit 816 can include the functionality to utilize constituent image data 806 or composite image data 812 to generate bearing 834.

Compass generator 820, which can also be referred to as the compass circuit 820, can include hardware, software or any combination of hardware and software for partitioning composite images 810 into various parts or portions. Compass generator 820 can include computer code, instructions or functions stored in memory (e.g., 218) to implement its functionality via processors 208. Compass generator 820 can include the functionality to generate a compass 836. Compass circuit 820 can include the functionality to generate a marker or an indicator denoting the range of angles or directions corresponding to the portion of the image (e.g., 804 of 810) being displayed on a display. Compass circuit 820 can include the functionality to generate markers or indicators for denoting or identifying cardinal directions with respect to the portion of the image being displayed.

Compass 836 can include any digital representation of an instrument showing direction, or a range of directions, or an angle, or a range of angles, of a displayed portion of composite image 810 or a constituent image 804. Compass 836 can provide a range of directions or a range of angles corresponding to a portion of the image displayed by a player, such as a video player 830. Compass 836 can include an image or an illustration of a physical magnetic compass instrument to be displayed within or together with a composite image 810 or a constituent image 804. Compass 836 can identify four cardinal directions: east, west, north and south. Compass 836 can identify the direction, range of directions, an angle, or a range of angles to which the image displayed corresponds with respect to an axis about which the displayed image is captured. Compass 836 can display angles defined based on the axis, which can include a center 130 of an image capture system 114 or axes 132 of image capture devices 124. Compass 836 can highlight, display or identify the range of directions corresponding to the width of the displayed portion of the image with respect to the cardinal directions. The range of directions highlighted, displayed or identified by the compass 836 can include the range of angles corresponding to a reference direction 2140.

Compass data 822 can include any data corresponding to a direction of a portion of a composite image 810 or a constituent image 804 being displayed. Compass data 822 can include any bearing data 834, constituent image data 806 and composite image data 812. Compass data 822 can include any on the range of angles or directions corresponding to a portion of an image being displayed by a video player 830. Compass data 822 can include information about a reference direction 2140, width 2102, height 2104, device angles 150, device viewing angle 164, device angle relative to a reference direction 168, bearing to incident relative to reference direction 2170, reference direction 2140 or any other data, including directional and angular data or information discussed herein.

Maps 848, which can also be referred to as map indicators, can include an indication of regions towards which an image, such as a displayed image 804 or 810, is turned or focused. Maps 848 can include indicators identifying areas covered by an image 804 or 810, or by a portion of the image 804 or 810 displayed in the image. The angles of the indicators on the map 848 can correspond to a series of angles about an axis of an image capture system 114 or an image capture device 124. Maps 848 can identify locations, geographical areas, mountains, rivers, roads and towns, which can be displayed along with an indicator showing a portion of the map 848 to which the image being displayed corresponds.

Map data 846 can correspond to any data or information concerning a geographical representation of an area, along with the angles or directions of a constituent image 804 or a composite image 810. Map data 846 can include data on the geographical area being imaged. Map data 846 can include, be based on, or correspond to the bearing data 818 or compass data 836. Map data 846 can include geographic locations, towns, roads, mountains, rivers and other landmarks, that can be associated with angles about an axis (e.g., 130, 132) defined in terms of a reference direction 2140, width 2102, height 2104, device angles 150, device viewing angle 164, device angle relative to a reference direction 168, bearing to incident relative to reference direction 2170, reference direction 2140 or any other data, including directional and angular data or information discussed herein.

Map generator 844 can include hardware, software or any combination of hardware and software for creating a map 848, sometimes also referred to as the map indicator 848. Map generator 844 can include computer code, instructions or functions stored in memory (e.g., 218) to implement its functionality via processors 208. Map generator 844 can include the functionality to generate a map 848 for display within or with a composite image 810. Map generator 844 can include the functionality to determine an angle or a range of angles for each portion of a composite image 810, or each portion of a constituent image 804 and display geographic data in the map in relation to such angle or range of angles.

Data structures 824 can include any type and form of a data organization, management and storage format allowing for data access and modification. Data structures 824 can include a collection of data, including values or entries, such as images 804 and 810, including their corresponding data 806 and 812. Data structure 824 can include image parts 842. Data structures 824 can include relationships or associations between different data. Data structures 824 can include functions or operations that can be applied to various data, such as for example algebraic structures. Data structures 824 can be stored in memory 218 and can organize stored data using arrays, linked structures or lists, unions, tagged unions, objects, hashes, graphs and binary trees. Data structures 824 can be stored in the memory of servers 200 or other devices, such as computing devices 304.

Video player 830 can include hardware, software or any combination of hardware and software for displaying composite images 810 and constituent images 804. Video player 830 can include computer code, instructions or functions stored in memory (e.g., 218) to implement its functionality via processors 208. Video player 830 can include the functionality to play or display any media content, such as for example, images, including constituent images 804 and composite images 810, videos, illustrations, maps and presentations. Video player 830 can include the functionality to reconstruct the composite images 810 received using received image parts 842. Video player 830 can utilize composite image data 812, which can be transmitted together with image parts 842 to the computing devices 304, to reconstruct the composite image 810 from the image parts 842. Video player 830 can include the functionality to manipulate via player functions 832 the displayed media content and display sequenced images. Video player 830 can include the functionality to zoom into, or out of media content displayed, as well as to pan the content left or right or scroll the content up or down. Video player 830 can include the functionality to display bearing 834 and compass 836. Video player 830 can include the functionality to display any maps, such as maps of locations of stations at which constituent images 804 are captured.

Player functions 832 can include hardware, software or any combination of hardware and software for partitioning composite images 810 into various parts or portions. Player functions 832 can include computer code, instructions or functions stored in memory (e.g., 218) to implement its functionality via processors 208. Player functions 832 can include the functionality to manipulate an image, whether 804 or 810, including to zoom into, or out of the image being displayed by video player 830, pan sideways across the image being displayed by video player 830 and scroll up or down the image being displayed by video player 830. Player functions 832 can include the functionality to play sequence of composite images 840. Player functions 832 can include buttons for running a sequence of composite images 840 as a video, including a play button, a pause button, a scroll bar to scroll across the sequence of composite images 840, a fast forward button, a rewind button and a replay button.

Sequence of composite images 840 can include any sequence or chain of composite images 810. Sequence of composite images 840 can include two or more composite images 810 arranged chronologically. The two or more composite images 810 of the sequence of composite images 840 can be ordered based on their bearing 834. For example, a first composite image 810 of the sequence can be oriented and displayed based on the angles on the bearing 834 in accordance with a reference direction 440, and a second composite image 810 of the sequence to be displayed after the first image can also be oriented and displayed based on the same angles of the bearing 834 in accordance with the same reference direction 440. Therefore, as multiple images of the sequence of composite images 840 are being displayed on a display, they can be oriented so that they point to the same angle range, and therefore the same features being imaged, as the sequence of composite images 840 is being displayed.

Composite image sequencer (CIS) 838 can include hardware, software or any combination of hardware and software for creating a sequence of composite images 810. Composite image sequencer 838 can include computer code, instructions or functions stored in memory (e.g., 218) to implement its functionality via processors 208. Composite image sequencer 838 can include the functionality to generate a sequence of composite images 840. CIS 838 can include the functionality to arrange the composite images 810 in the sequence and assign them their order. CIS 838 can include the functionality for synchronizing composite images 810 in the sequence of composite images 840 according to their bearing 834 or angle data assigned according to a specified reference direction 440.

Image processing circuit 206 can include functionality implemented in computer code or instructions stored in memory 218 and implemented via processors 208 to process constituent images 804 and composite images 810. Image processing circuit 206 can receive, store, process and transmit images, utilizing any functionality of constituent images 804, constituent image data 806, composite image manager 808, composite images 810 and composite image data 812. Image processing circuit 206 can utilize display output circuit 216, along with the image partitioner 815 to separate composite images 810 into parts to be transmitted over network 10.

It is understood that while FIG. 8 illustrates the system components in the illustrated stated arrangement, computing devices 304 can include any system components or functionality of one or more servers 200, and vice versa, any one or more servers 200 can include any system components or functionality of one or more computing devices 304. For example, computing devices 8304 can include bearing generator 816 and compass generator 820 and server 200 can include the display output circuit 318. Display output circuits 216 and 318 can each include the functionality and system components of the other and can process images for display, such as a computer screen display. Display output circuits 215 and 318 can display constituent images 804 and composite images 810, as well as sequences of composite images 840 along with any bearings 834 and compasses 836.

Figure 9:
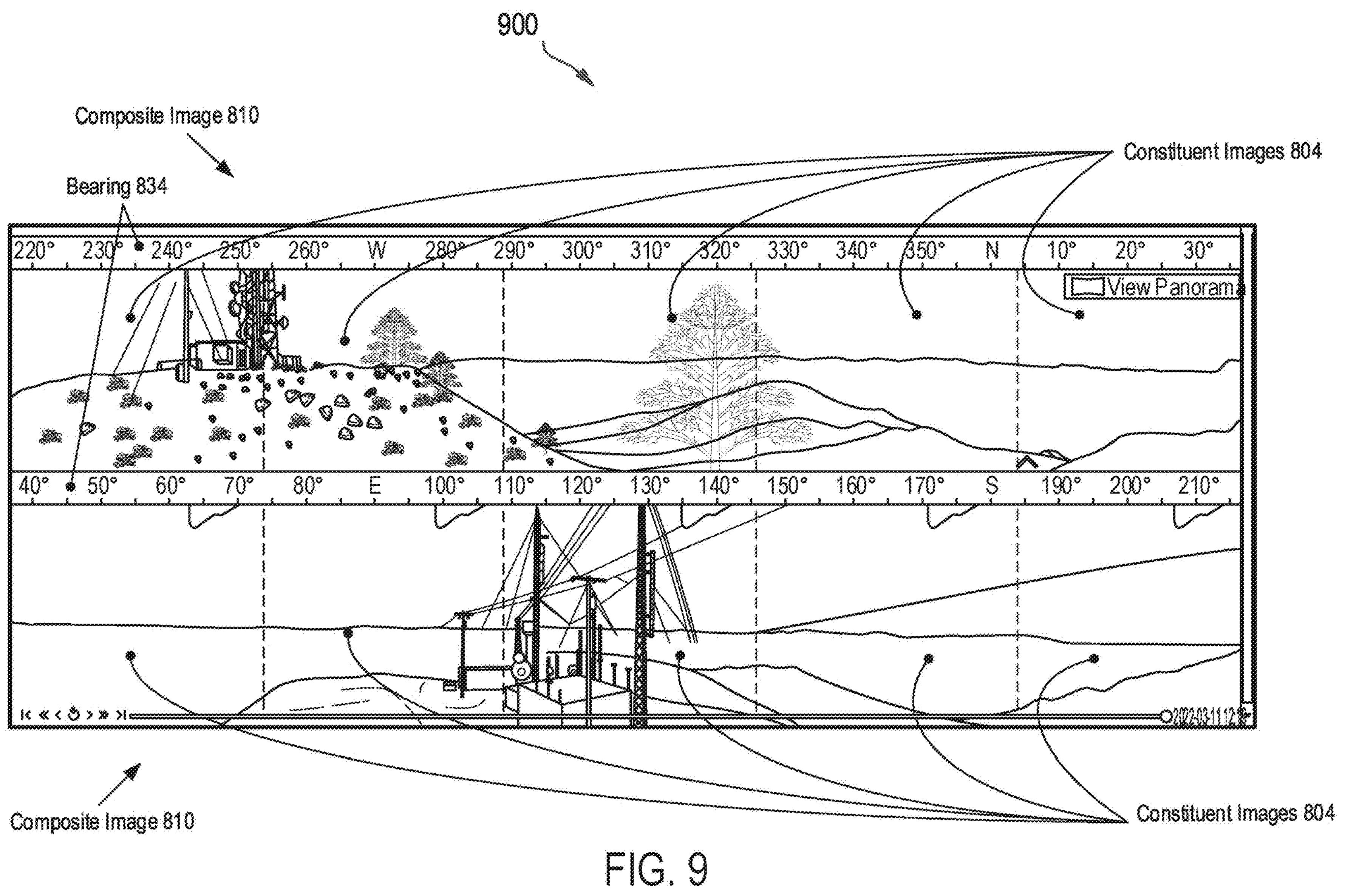
FIG. 9 is an example of a display view of an example composite image displayed with a bearing indicator.

FIG. 9 illustrates an example of a display view 900 that could be displayed on a client device's display. Display view 800 illustrates two example composite images 810, one above the other, and each one comprising its own bearing of about 180 degrees across the top portion of the respective image. The upper composite image 810 includes five constituent images 804 stitched together to form the upper composite image 810. The upper composite image 810 also includes a bearing indicator 834 across the top of the image, marking an angle range of about 180 degrees, more specifically spanning the range of below 220 degrees to about more than 35 degrees.

Similarly, the lower composite image 810 of the example display view 800 also includes five constituent images 804 and a bearing 834 across the top of the image, also covering the range of about 180 degrees, from about less than 40 degrees to about more than 215 degrees. It is evident by observing both the bearings 834 for the upper composite image 810 and the lower composite image 810 that the sum of the two bearings 834 amounts to a full 360 degrees around the axis of the image capture system 114. The illustrated example therefore covers a full 360 degree circle around the axis, utilizing two composite images 810 composed of five individual constituent images 804, where each of the two composite images 810 cover about a half of the circle around the axis.

At the bottom side of the lower constituent image 810 there are player functions 832 for running through the sequence of composite images 840, including a replay button, forward and backward buttons, fast forward and fast rewind buttons and buttons for going back to the beginning or the end of the sequence. Using these player functions 832, a user can run through a sequence of composite images 840 several different ways, seeing all of 360 degrees around the axis of the image capture system 114 at the same time.

Figure 10:
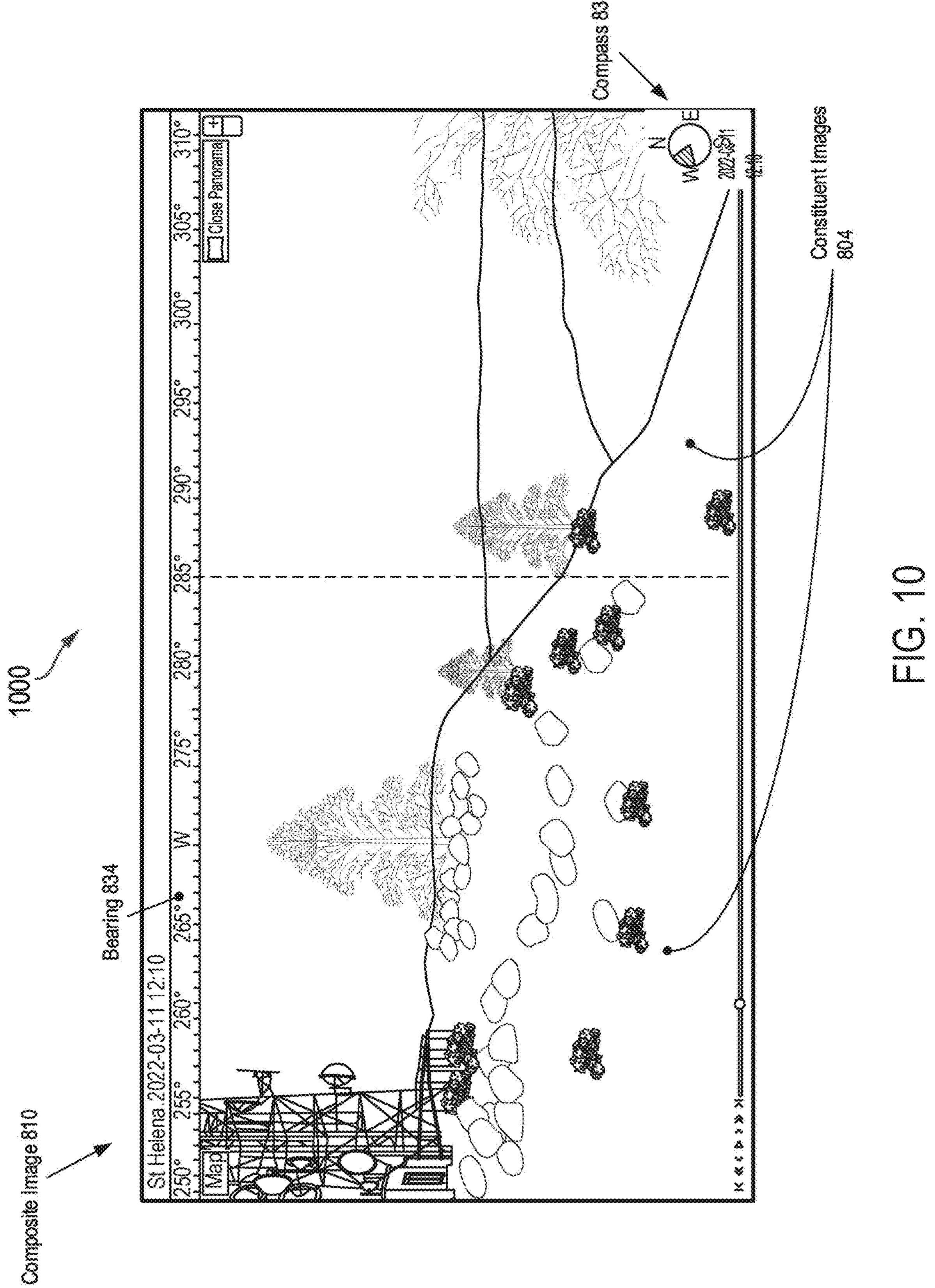
FIG. 10 is another example of a display view of an example composite image displayed with a bearing indicator and a compass.

FIG. 10 illustrates an example of a display view 1000 that could be displayed on a client device's display. In display view 1000, a composite image 810 is displayed. The displayed composite image 810 includes two constituent images 804 and a bearing across the top of the composite image 810 covering a range of angles of about 250 degrees to more than 310 degrees, thereby spanning more than about 60 degrees around the axis of an image capture system 114. At the bottom of the composite image 810 player functions 832 are displayed, including a play button, a forward and backward buttons, a fast forward and a fast rewind buttons and buttons for going back to the beginning or the end of the sequence of composite images 840 being displayed.

The present solution can relate to system in which one or more processors (e.g., 208) of one or more servers (e.g., 200) coupled to memory (e.g., 218) are configured to implement a plurality of tasks. For example, the one or more processors (e.g., 208) can identify a first plurality of constituent images (e.g., 804) captured by an image capture system (e.g., 114) rotating about an axis (e.g., 130, 132) over a first time period. Each constituent image (e.g., 804) of the first plurality of constituent images can correspond to a respective angle about the axis, such as angles of constituent image data 806 and a respective time within the first time period, such as time of the image of the constituent image data 806. The one or more processors can generate a first composite image (e.g., 810) based on the first plurality of constituent images (e.g., 804) arranged according to the respective angles of each of the first plurality of constituent images. The one or more processors can partition the first composite image (e.g., 810) into a first plurality of partial images (e.g., 842), where each partial image of the first plurality of partial images can be associated with a respective angle relative to a reference direction. For example, each partial image 842 of the first composite image can be split into any number of partial images 842, each of which corresponds to an angle about the axis, or a range of angles about the axis of the image capture system 114. The one or more processors (e.g., 208) can be configured to identify a second plurality of constituent images (e.g., 804) captured by the image capture system (e.g., 114) rotating about the axis over a second time period. Each image of the second plurality of constituent images can correspond to a respective angle about the axis and a respective time within the second time period. The one or more processors (e.g., 208) can generate a second composite image (e.g., 810) based on the second plurality of constituent images (e.g., 804) arranged according to the respective angles of the second plurality of constituent images. The respective angles can correspond, for example, to angles about the axis included in the constituent image data 806. The one or more processors can partition the second composite image (e.g., 810) into a second plurality of partial images (e.g., 842). Each partial image of the second plurality of partial images can be associated with a respective angle relative to the reference direction (e.g., 440). The one or more processors can transmit, to a client device, for presentation via a player (e.g., 830), each of the first plurality of partial images and the second plurality of partial images and the corresponding respective angle relative to the reference direction. The player can be configured to reconstruct the first composite image from the first plurality of partial images and the second composite image from the second plurality of partial images. The player can be configured to sequentially present the first composite image and the second composite image in accordance with the first time period and the second time period.

The one or more processors can select, from the first plurality of constituent images (e.g., 804), a first group of constituent images, each constituent image of the first group can be selected based on the respective angle about the axis (e.g., 130, 132) corresponding to the constituent image. The one or more processors can select, from the second plurality of constituent images (e.g., 804), a second group of constituent images, each image of the second group selected based on the respective angle about the axis (e.g., 130, 132) corresponding to the constituent image. The first group of constituent images can include a subset of the first plurality of constituent images. Each respective constituent image of the subset of the first plurality can include a first portion overlapping with a second portion of at least one of a preceding or a subsequent respective constituent image of the subset of the first plurality. The second group of constituent images can include a subset of the second plurality of constituent images. Each respective constituent image of the subset of the second plurality can include a third portion overlapping with a fourth portion of at least one of a preceding or a subsequent respective constituent image of the subset of the second plurality.

The image capture system (e.g., 114) can include a first image capture device (e.g., 124) capturing a first group of the first plurality of constituent images over at least a first 180 degrees about the axis and a first group of the second plurality of constituent images over at least the first 180 degrees about the axis. The image capture system (e.g., 114) can include a second image capture device capturing a second group of the first plurality of constituent images over at least a second 180 degrees about the axis and a second group of the second plurality of constituent images over at least the second 180 degrees about the axis.

The player (e.g., 830) can be configured to include a zoom function, and wherein a zoom level of the player adjusted during the presentation of the first composite image remains unchanged during the presentation of the second composite image. Each of the first plurality of constituent images can be captured by the image capture system at a different point in time within the first time period and each of the second plurality of constituent images is captured by the image capture system at a different point in time within the second time period. For example, the first plurality of constituent images can be captured within a first minute time period and a second plurality of constituent images can be captured within a second minute time period following the first minute time period. The time difference between the first minute time period can be any period, such as zero seconds, at least 1 minute, at least 5 minutes, at least 10 minutes, at least 12 minutes, at least 15 minutes, at least 30 minutes, at least an hour, at least 2 hours, at least 3 hours, at least 4 hours, at least 6 hours, at least 12 hours or at least 24 hours.

The one or more processors can be configured to identify each constituent image of the first plurality of constituent images based on the respective angle of the constituent image, wherein the respective angle is determined based on a reference direction (e.g., 440). The angle can include a degree angle about the axis with respect to the reference direction 440. The one or more processors can be configured to generate the first composite image (e.g., 810) by connecting a second end of a central portion of a first constituent image of the first plurality of constituent images with a first end of a central portion of a second constituent image of the second plurality of constituent images. A part of the first constituent image (e.g., 804) can overlap with a part of the second constituent image (e.g., 804).

The one or more processors can be configured to store for each partial image of the first composite image, in one or more data structures, (e.g., 824) a respective first association between the partial image (e.g., 824) and a respective first bearing indicator (e.g., 834) indicating at least one respective angle relative to the reference direction. The one or more processors can be configured to store for each partial image (e.g., 824) of the second composite image (e.g., 810), in the one or more data structures (e.g., 824), a respective second association between the partial image (e.g., 842) and a respective second bearing indicator (e.g., 834) indicating at least one respective angle relative to the reference direction. The one or more processors can be configured to transmit, to the client device, each partial image of the first composite image (e.g., 810) and the respective first bearing indicator (e.g., 834) and each partial image of the second composite image (e.g., 810) and the respective second bearing indicator (e.g., 834).

The player (e.g., 830) can include an actionable object (e.g., 832), which when interacted with, causes the player to navigate between the first composite image (e.g., 810) derived from the first plurality of constituent images captured over the first time period and the second composite image (e.g., 810) derived from the second plurality of constituent images captured over the second time period. The player can be configured to include a zoom function (e.g., 832), and wherein adjusting the zoom of the first composite image causes the player to adjust a resolution of the first composite image. The player (e.g., 830) can be configured to include a pan function (e.g., 832), and wherein panning the first composite image of the player to display a first portion of the first composite image (e.g., 810) corresponding to a first set of angles causes the player to display a portion of the second composite image (e.g., 810) corresponding to the first set of angles.

The present solution can include a system that can include a video player 830, that can include a panoramic canvas player having a file player.js to display images from cameras deployed on mountains and hills to identify and monitor wildfires. Each monitoring spot can be referred to as a station and each station could include one or more cameras (e.g., image capture devices 124). The cameras take images periodically and continuously and the station can send the images (e.g., constituent images 804) to a cloud service, which can be referred to as a Pano cloud. The cloud service, which can be provided by one or more servers, such as servers 200, can include one or more services or processes that process, compress, store and serve the images, including composite panoramic images, for the front-end users.

When a front end user or device calls an end point end station camera, such as "/ec" or "/ecs" to acquire the station meta data for images as well as the image, the front end user or device can send API calls to fetch panorama images (e.g., composite images 810). Meanwhile, every time period, such as for example every minute, backend servers (e.g., 200) can receive a group of constituent images 804 from the station, such as 8 or 10 images, to form a composite image 810. Therefore, a new composite image 810 can be generated periodically, such as every minute, and include constituent images 804 generated during that minute.

Backend servers 200 can provide, the composite image 810 as well as the constituent images 804 via one or more web interfaces, such as a website. For example, backend servers 200 can provide individual constituent images 804 using an internet address, such as: https://companywebsite.ai/station_number/scale_number/sequence_number. The group of constituent images 804 can comprise the parts of the full composite image, by being concatenated horizontally in incremental order in order to produce the full panorama composite image 810.

Front-end device, such as the client or user device, can fetch and receive parts (e.g., 842) of the panoramic composite image 810 and concatenate them or put them together to regenerate or reform a whole seamless composite image 810. This can be implemented by the player 830, whose other features or functions (e.g., 832) can include buffering, playback controls, panning, zoom in/out, play the images like a video, mark a fire, etc.

The player 830 can utilize HTML5 canvas to plot the images dynamically. The size of the canvas can vary in sizes. In some implementations, the canvas may be not large enough to hold all the concatenated constituent images 804 forming the composite image 810, and so scroll, panning and zoom player functions 832 can be used. The player 830 can include a float number option, such as "this.state.zoom" which can be set to a number, such as 0.5. In some instances, panoramic composite images 810 with dimension 975*879 can be plotted as 487.5*439.5 images. The player 830 can include a built-in canvas API, such as "drawImage" API which can draw an image enlarged or shrunken. The API can be used via an instruction or a command, such as: ctx.drawImage(image, sx, sy, sWidth, sHeight, dx, dy, dWidth, dHeight)

The player 830 can include multiple variables, inputs or instructions. For example, a variable or input "dois" can identify the number of parts 842 which the panorama composite image 810 has been cut or partitioned into. Therefore "dois—10" can refer to the composite image 810 cut into 10 image parts 842. For example, a variable or input "panoWidth/panoHeight" can be used to identify unzoomed, unscaled, full size of the original panoramic composite image. For example "panoWidth/panoHeight—19500/1758" can identify an image as having 19500 pixels width and 1758 pixels in height. −9 Full Panorama Image" above.

Variables or inputs for a canvas can include for example "ctx:" to identify the canvas context in two dimension. They can include "canvasOffsetX:" to identify the distance between canvas left-boundary and the window left-boundary. They can also include "canvasOffsetY:" to identify the distance between canvas top-boundary and the window top-boundary. Variables or inputs for a meta data can include, for example, "scale" such as "scale−1:" which can identify or define camera images, such as constituent images 804, to be images with size be up to 1 MB/file. The size can also be set to any other size in terms of megabytes. In some instances, to save bandwidth, the backend servers can keep or store, in the data structures 824, three different sizes of every image, such as the full size, half size and a quarter size, and can serve each one of them upon request. For example, an original composite image 804 with dimension 1950*1758 can have a version that is scaled to a half size (e.g., scale/2) having a dimension 975*879. For example, the scale size for service to client mobile devices can be set to a half of the value to be served on a client laptop or a desktop computer. Variables or inputs can include "canvasWidth/canvasHeight—1200/219" can define the width and height of the canvas, where the images displayed can be plotted. Variables or inputs can include "width/height—975/879:" that can define or identify the width and height of every received image, scaled.

Variables or inputs can include values for a station 102. For example, "zoom" can be set to a scale or zoom level of the player 830. A "scaledWidth/scaledHeight" can be set to equal "meta.width*state.zoom" and can include or correspond to zoomedWidth/zoomedHeight, which can indicate the actual plotted image dimension considering zoom level. For example, "panoWidth" can be set to "state.scaledWidth*camera.dois", which can correspond to the expected panorama full width of concatenated images, considering zoom level. For example, "xm/ym: x/y" can be used to coordinate of the mouse, which can be updated based on any one or more of "onmousewheel", "onmouseenter", "onmousemove", "onmousedown", "onmouseout", "onmouseup." For example, "xd/yd: x/y" can coordinate the mouse when mousedown. It can be used to calculate how far the mouse moves when dragging. For example, "xmd:" can be used to state.xm value when mouse down. For example, "xi/yi:" can treat top-left point of the canvas as (0, 0). The point of image top-left can be (xi, yi). For example, "xo/yo:" can be used to offset the mouse down position relative to the top-left point of the panorama image.

A sequence of the images (e.g., 804) from each camera (e.g., 124) rotation can be used to generate a single panorama composite image 810. The sequence of images can be numbered sequentially. One sequence can be produced every period. A period within which constituent images 804 can be 15 seconds, 30 seconds, 1 minute, 2 minutes, 3 minutes, 4 minutes, 5 minutes, 6 minutes, 10 minutes, 15 minutes, 20 minutes, 30 minutes, 40 minutes, 50 minutes, 60 minutes or any other period above 60 minutes.

A sequence can be used instead of an epoch minute so that cameras (e.g., 124) of edge computers (e.g., 104) can rotate at different periods and still be a part of the same sequence. This can allow the cameras (e.g., 104) to rotate at different speeds, within the period for forming a single composite image 810, and still allow the images from different cameras to be used for the composite image 810.

Constituent images 804 can be stored with metadata (e.g., 806) that include angles defined in terms of epoch. For example, a constituent image 804 can be stored in terms of an angle to which the image is termed, defined in terms of epoch minutes and/or epoch seconds. The images can include an epoch start and epoch end, which can correspond to the beginning of the image on the start of the image 804, such as a start of the width of the image on one end and the end of the width of the image on the other, thus defining a range of angles which the constituent image 804 covers. The angles can be defined in terms of epoch minutes/seconds or angles about the axis, or can be converted between the two, as needed. The angles for each image 804 can be defined in terms of the reference direction 2140.

Image capture devices 124 can rotate around the axis in a stop and go fashion. For example, an image capture device 124 can start from an initial position and take a first constituent image 804. Then, the image capture device 124 can rotate a set number of degrees, such as 36 degrees, and stop to stabilize, zoom and adjust and take a second constituent image 804. Then, the image capture device 124 can rotate another set number of degrees, such as 36 degrees, stop to stabilize, zoom and adjust and take a third constituent image 804. The image capture device 124 can continue in such a stop and go fashion for about one minute to take about 5 images, thus averaging about 10-12 seconds per image. The image capture device 124 can, after taking the last (e.g., fifth) image, continue rotating in the same direction back to the initial position to take the first constituent image 804 for the next composite image 810.

Figure 11:
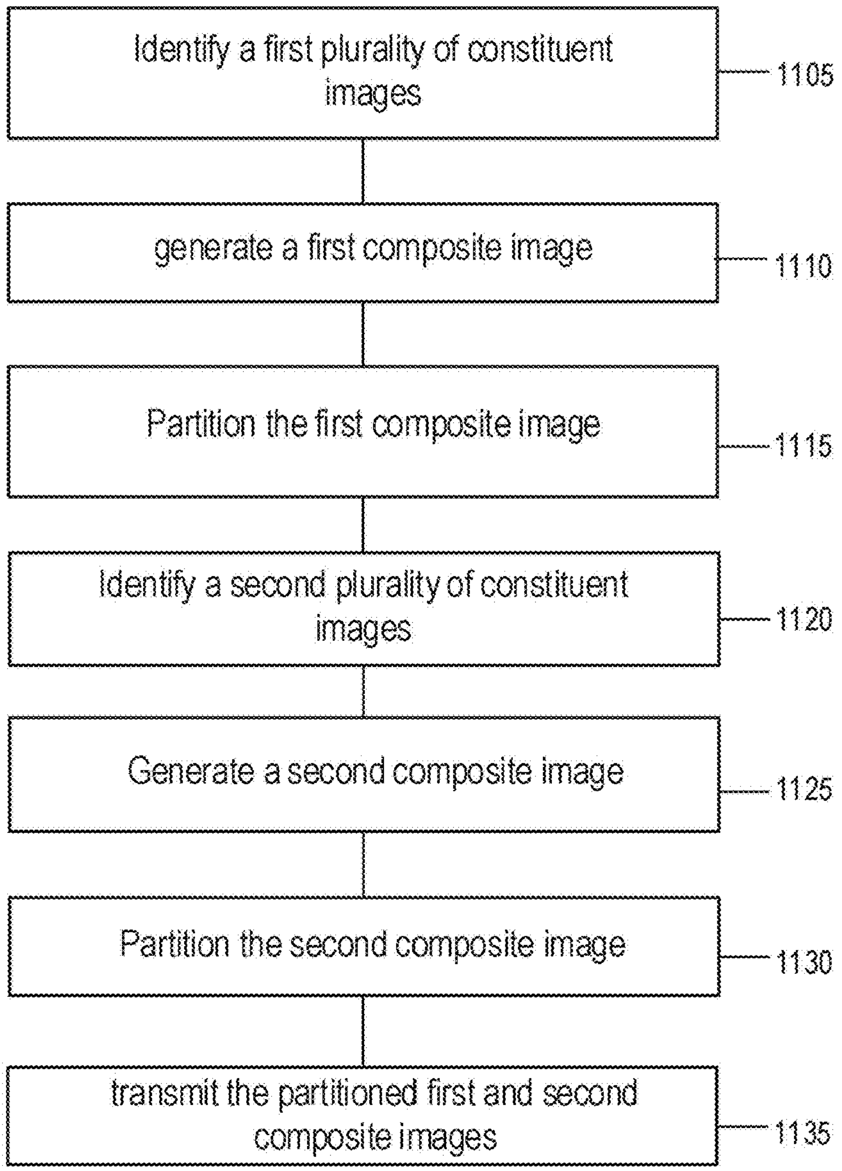
FIG. 11 is an example of a flow diagram illustrating an example method for generating and displaying composite images in accordance with the system features of the present disclosure

FIG. 11 illustrates a method 1100 for utilizing a system 800 to generate and display composite images generated by constituent images generated about an image capture system. Method 1100 can include acts 1105 to 1135. At act 1105, a first plurality of constituent images is identified. At act 1110, a first composite image is generated. At act 1115, the first composite image is partitioned. At act 1120 a second plurality of constituent images is identified. At act 1125, a second composite image is generated. At act 1130, the second composite image is partitioned. At act 1135 the partitioned first and second composite images are transmitted.

At act 1105, a first plurality of constituent images is identified. One or more processors can identify a first plurality of constituent images captured by an image capture system rotating about an axis over a first time period. Each constituent image of the first plurality of constituent images can correspond to a respective angle about the axis and a respective time within the first time period. In an implementation, an image processing system can identify the plurality of constituent images to use to form a composite image based on their constituent image data. For example, each of the first plurality of constituent images can be captured by the image capture system at a different point in time within the first time period. Each of the second plurality of constituent images can be captured by the image capture system at a different point in time within the second time period. Image processing system can identify the first plurality of constituent images for the first composite image based on the time data of the first plurality of constituent images. For example, image processing system can identify all constituent images from a first time period as constituent images to use to generate a first composite image and images of a second time period as constituent images to use to generate a second composite image.

At act 1110, a first composite image is generated. One or more processors can generate a first composite image based on the first plurality of constituent images arranged according to the respective angles of each of the first plurality of constituent images. A device, such as a server or a computing device, can store, in one or more data structures, a first association between the first composite image and a first bearing indicator indicating a first range of angles about the axis and along a width of the first composite image. The first range of angles can comprise the respective angles of each of the first group of constituent images.

Generating the first composite image can include connecting a second end of a central portion of a first constituent image of the first plurality of constituent images with a first end of a central portion of a second constituent image of the second plurality of constituent images. A part of the first constituent image can overlap with a part of the second constituent image.

At act 1115, the first composite image is partitioned. The one or more processors can partition first composite image into a first plurality of partial images. Each partial image of the first plurality of partial images can be associated with a respective angle relative to a reference direction. For each partial image of the first composite image, the one or more processors can store in one or more data structures, a respective first association between the partial image and a respective first bearing indicator indicating at least one respective angle relative to the reference direction.

At act 1120 a second plurality of constituent images is identified. The one or more processors can identify a second plurality of constituent images captured by the image capture system rotating about the axis over a second time period. Each image of the second plurality of constituent images can correspond to a respective angle about the axis and a respective time within the second time period.

At act 1125, a second composite image is generated. The one or more processors can generate a second composite image based on the second plurality of constituent images arranged according to the respective angles of the second plurality of constituent images. A device, such as a server or a computing device can store in the one or more data structures, a second association between the second composite image and a second bearing indicator indicating a second range of angles about the axis and along a width of the second composite image. The second range of angles can comprise the respective angles of each of the second group of constituent images.

At act 1130, the second composite image is partitioned. The one or more processors can partition the second composite image into a second plurality of partial images. Each partial image of the second plurality of partial images can be associated with a respective angle relative to the reference direction. For each partial image of the second composite image the one or more processors can store, in the one or more data structures, a respective second association between the partial image and a respective second bearing indicator indicating at least one respective angle relative to the reference direction.

At act 1135 the partitioned first and second composite images are transmitted. The one or more processors can transmit to a client device, for presentation via a player, each of the first plurality of partial images and the second plurality of partial images and the corresponding respective angle relative to the reference direction. The player can be configured to reconstruct the first composite image from the first plurality of partial images and the second composite image from the second plurality of partial images and sequentially present the first composite image and the second composite image in accordance with the first time period and the second time period. The device can combine for presentation via the player the first composite image with the first bearing indicator and the second composite image with the second bearing indicator.

Figure 12:
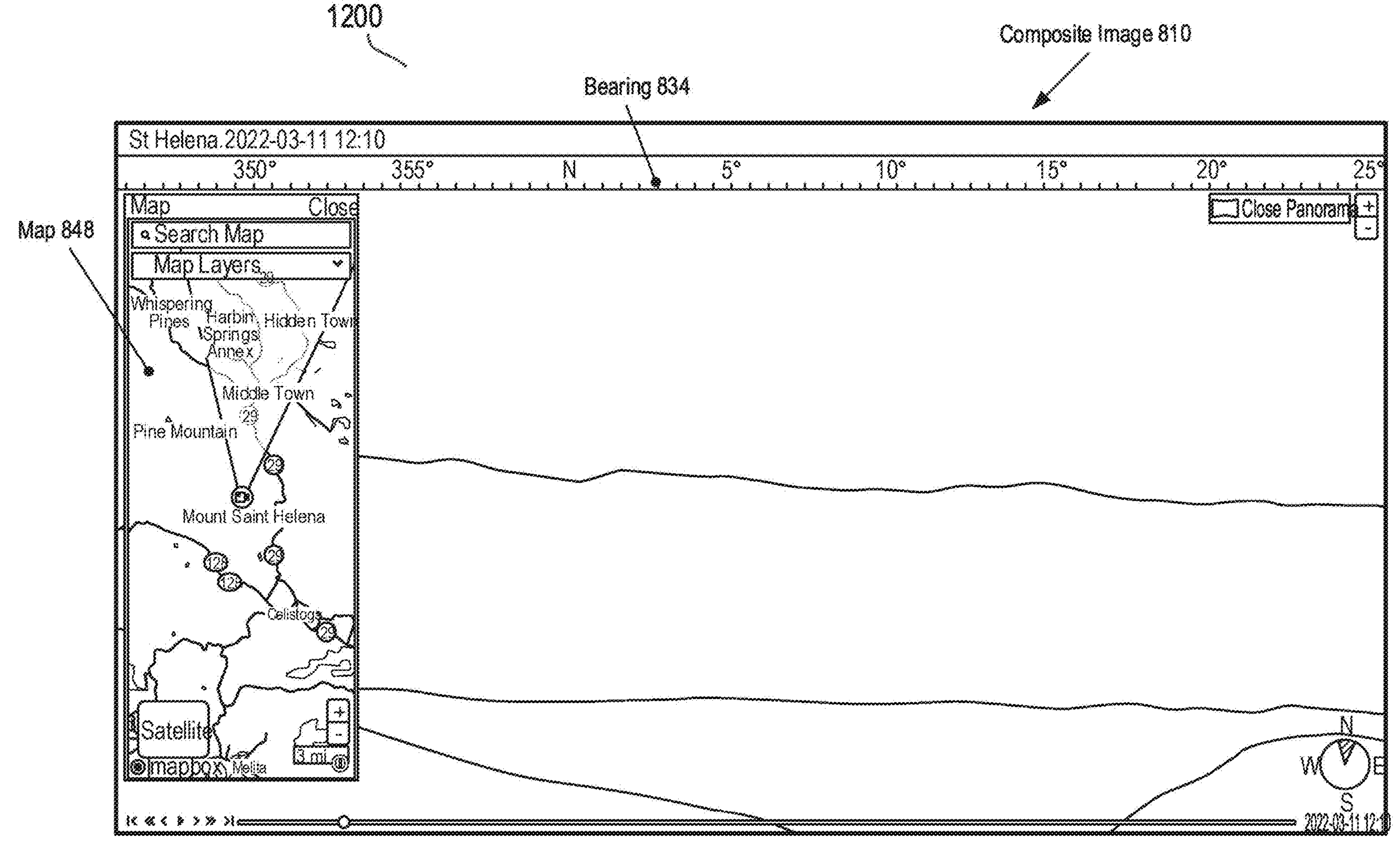
FIG. 12 is another example of a display view of an example composite image displayed with a map indicator.

FIG. 12 illustrates an example of a display view 1200 that could be displayed on a client device's display. In display view 1200, a composite image 810 is displayed. The displayed composite image 810 can include multiple constituent images 804 that span angles from about 345 degrees to about 25 degrees, along with a bearing 834 across the top of the composite image 810 covering the same range of angles. The display view 1200 includes features in the image, but also a map 848 identifying various geographic locations and features, such as towns, roads, rivers and so on. Map 848 also provides an indicator, in the shape of a triangle, illustrating the angular range corresponding to the display view 1200. The triangle shaped indicator can include a starting point of the triangle can be at the location of the image capture system 114 on the map 848 and can widen as the distance from the image capture system 114 increases. The widening of the angle can be in accordance with the angular range corresponding to the displayed view 1200. At the bottom of the composite image 810 player functions 832 are displayed, including a play button, a forward and backward buttons, a fast forward and a fast rewind buttons and buttons for going back to the beginning or the end of the sequence of composite images 804 being displayed.

The present disclosure can also relate to a system that can include a server comprising one or more processors, coupled to memory. The server can identify a composite image corresponding to a range of angles about an axis of rotation of an image capture system. The server can store, in one or more data structures, an association between the composite image and a bearing indicator indicating the range of angles along a width of the composite image. Each respective angle of the range of angles can correspond to a respective portion of the width of the composite image. The server can present, on a display, a first portion of the composite image corresponding to a first set of angles of the range of angles and a first portion of the bearing indicator including the first set of angles. The server can also display at least one of a first compass indicator indicating, on a compass, with the first set of angles relative to the range of angles, or a first map indicator indicating a first geographic region on a map, where the first geographic region corresponds to the first set of angles and a location of the image capture system. The server can determine, responsive to a user action that causes a second portion of the composite image to be displayed, a second set of angles of the range of angles corresponding to the second portion of the composite image. The server can present, on the display, responsive to determining the second range of angles, a second portion of the composite image corresponding to the second range of angles and a second portion of the bearing indicator including the second set of angles. The server can present, on the display, at least one of a second compass indicator, on the compass, indicating the second set of angles relative to the range of angles, where the second compass indicator can be generated based on the second set of angles, or a second map indicator indicating a second geographic region on the map, where the second geographic region can correspond to the second set of angles and the location of the image capture system.

The system can include the composite image that can correspond to the range of angles relative to a reference direction about the axis of rotation, the reference direction corresponding to a reference angle of the range of angles. The bearing indicator can indicate at least one of four cardinal directions, including: north, east, south or west. The composite image can be generated from a sequence of constituent images. Each constituent image of the sequence can correspond to a respective subset of the range of angles. The range of angles of the composite image can extend from zero to at least 180 degrees around the axis of rotation. The range of angles of the composite image can extend from zero to 360 degrees about the axis of rotation and wherein the server stores an association between the composite image and the bearing indicator indicating the range of angles spanning 360 degrees.

The system can include the server to present, on the display, both of the first map indicator and the first compass indicator. The server can present, on the display both of the second map indicator and the compass indicator. The system can be configured such that the user action causes the first portion of the composite image to pan or scroll to the second portion of the composite image and the first map indicator and the second map indicator each can have a first shape and a first size, or the first compass indicator and the second compass indicator each can have a second shape and a second size.

The system can be configured such that the user action causes a zoom setting for displaying the first portion of the composite image to be changed and the first map indicator has a first shape and a first size and the second map indicator has a second shape and a second size, or the first compass indicator has a third shape and a third size and the second compass indicator has a fourth shape and a fourth size.

The system can include the composite image being a first composite image captured at a first time and the server can be configured to identify a plurality of second composite images captured by the image capture system corresponding to the first set of angles subsequent to the first composite image being captured by the image capture system. The plurality of second composite images can be arranged in chronological order. The server can sequentially present in the chronological order respective first portions of the plurality of second composite images subsequent to presenting the first portion of the first composite image.

The server can present the composite image corresponding to the range of angles from zero to 360 degrees about the axis of rotation of the image capture system and captured by the image capture system during a first time period. The server can present a second composite image corresponding to the range of angles from zero to 360 degrees about the axis of rotation of the image capture system and captured by the image capture system during a second time period, the second time period following the first time period.

The server can identify a first sequence of composite images. Each composite image of the first sequence captured by the image capture system can be based on a first time interval. The server can receive a selection of a viewing setting that can correspond to a time duration and determine a subset of the first sequence of composite images. Each composite image of the subset can be selected based on a second time interval. The second time interval greater than the first time interval and computed based on the time duration. The server can sequentially present for display, each composite image of the subset in chronological order.

The server can receive a request to mark an incident at a first position within the composite image and provide an indicator identifying the first position. The server can determine, based on the first position and a stored association between the composite image and the range of angles, an angle of interest of the range of angles corresponding to the first position. The server can present, for display, a map showing the map indicator identifying a geographical region based on the angle of interest corresponding to the first position.

The server can identify, on a first composite image captured by the first image capture system, a first position within the first composite image corresponding to an incident. The server can determine a first angle of interest based on the first position. The server can identify, on a second composite image captured by the second image capture system, a second position within the second composite image corresponding to the incident. The server can determine a second angle of interest based on the second position. The server can present, for display, on a map: (i) a first map indicator based on the first angle of interest and a geographic location of the first image capture system, (ii) a second map indicator based on the second angle of interest and a second geographic location of the second image capture system, and (iii) a third map indicator identifying a location of the incident at a region where the first map indicator intersects the second map indicator.

The server can receive a request to triangulate a location of the incident using one or more second composite images captured from a second image capture system at a second geographic location. The server can identify the location of the incident determined based on an angle of interest of the range of angles corresponding to the location of the incident. The server can display, on the map, the location of the fire and the map indicator indicating an intersection of the first map indicator and the second map indicator.

Figure 13:
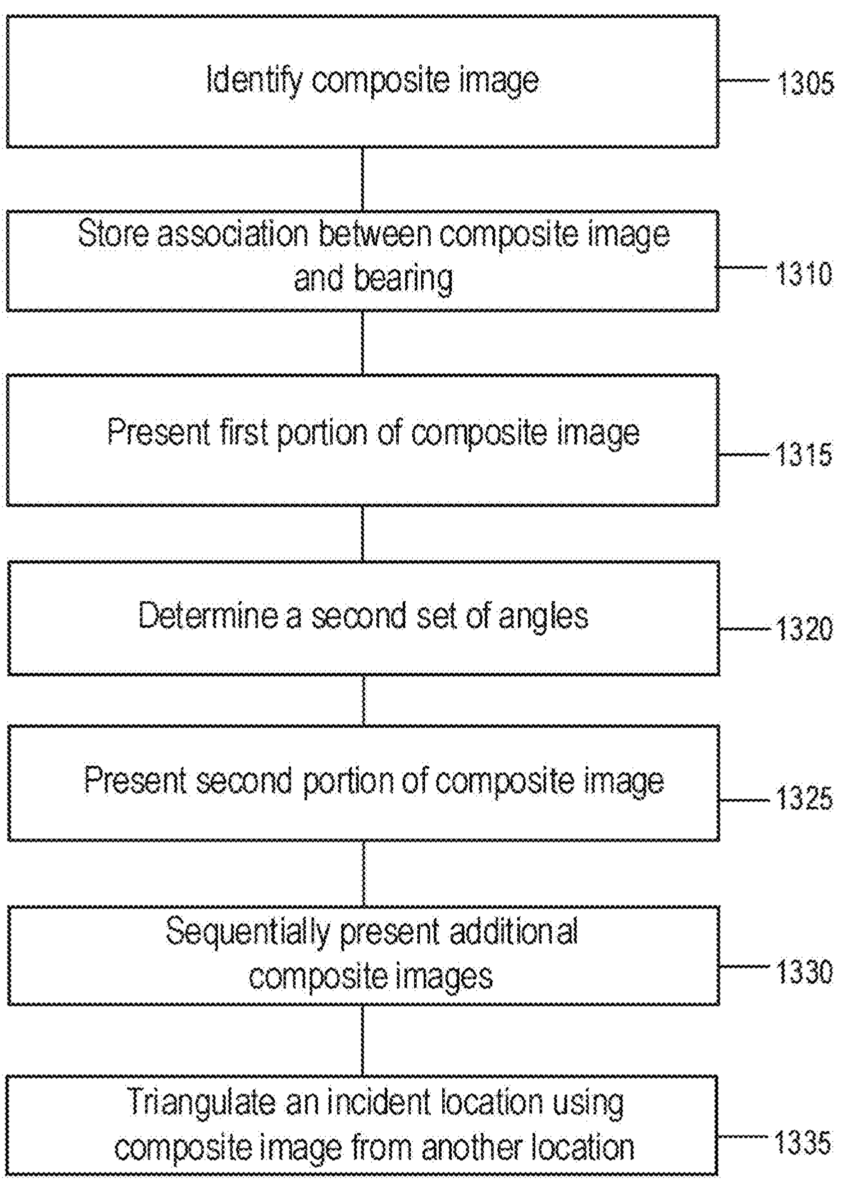
FIG. 13 is an example of a flow diagram illustrating an example method for providing angular an view indications based on displayed images in accordance with the system features of the present disclosure.

FIG. 13 illustrates a method 1300 for utilizing a system 800 to generate and display composite images generated by constituent images generated about an image capture system. Method 1300 can include acts 1305 to 1335. At act 1305, a composite image is identified. At act 1310, an association between composite image and bearing is stored. At act 1315, the first portion of composite image is presented. At act 1320 a second set of angles is determined. At act 1325, a second portion of composite image is presented. At act 1330, additional composite images are sequentially presented. At act 1335, an incident location is triangulated using composite image from another location.

At act 1305, a composite image is identified. A client device can identify a composite image corresponding to a range of angles about an axis of rotation of an image capture system. The composite image can include a panoramic image corresponding to a range of at least 180 degrees about an axis of an image capture system. The composite image can include a panoramic image corresponding to a range of 360 degrees about the axis of the image capture system.

At act 1310, an association between composite image and bearing is stored. The client device can store, in one or more data structures, an association between the composite image and a bearing indicator. The bearing indicator can indicate the range of angles along a width of the composite image. Each respective angle of the range of angles corresponding to a respective portion of the width of the composite image.

At act 1315, the first portion of composite image is presented. The client device can present, on a display, a first portion of the composite image. The first portion of the composite image can correspond to a first set of angles of the range of angles. The client device can present a first portion of the bearing indicator including the first set of angles. The client device can present at least one of a first compass indicator indicating, on a compass, the first set of angles relative to the range of angles, or a first map indicator indicating a first geographic region on a map, the first geographic region corresponding to the first set of angles and a location of the image capture system.

At act 1320 a second set of angles is determined. The client device can determine, responsive to a user action that causes a second portion of the composite image to be displayed, a second set of angles of the range of angles corresponding to the second portion of the composite image.

At act 1325, a second portion of composite image is presented. The client device can present, on the display, responsive to determining the second range of angles, a second portion of the composite image corresponding to the second range of angles. The client device can present a second portion of the bearing indicator including the second set of angles. The client device can present at least one of a second compass indicator, on the compass, indicating the second set of angles relative to the range of angles, the second compass indicator generated based on the second set of angles, or a second map indicator indicating a second geographic region on the map, the second geographic region corresponding to the second set of angles and the location of the image capture system.

At act 1330, additional composite images are sequentially presented. The client device can identify a first sequence of composite images. Each composite image of the first sequence can be captured by the image capture system based on a first time interval. The client device can receive a selection of a viewing setting corresponding to a time duration and determine a subset of the first sequence of composite images. Each composite image of the subset can be selected based on a second time interval. The second time interval can be greater than the first time interval and computed based on the time duration. The client device can sequentially present, for display, each composite image of the subset in chronological order.

At act 1335, an incident location is triangulated using composite image from another location. The client device can receive a request to mark an incident at a first position within the composite image and provide an indicator identifying the first position. The client device can determine, based on the first position and a stored association between the composite image and the range of angles, an angle of interest of the range of angles corresponding to the first position. The client device can present, for display, a map showing the map indicator identifying a geographical region based on the angle of interest corresponding to the first position. The client device can identify, on a first composite image captured by the first image capture system, a first position within the first composite image corresponding to an incident. The client device can determine a first angle of interest based on the first position. The client device can identify, on a second composite image captured by the second image capture system, a second position within the second composite image corresponding to the incident. The client device can determine a second angle of interest based on the second position. The client device can present, for display, on a map, a first map indicator based on the first angle of interest and a geographic location of the first image capture system, a second map indicator based on the second angle of interest and a second geographic location of the second image capture system, and a third map indicator identifying a location of the incident at a region where the first map indicator intersects the second map indicator.

The one or more processors can transmit to the client device, such as the computing system, each partial image of the first composite image and the respective first bearing indicator and each partial image of the second composite image and the respective second bearing indicator. The player can include an actionable object. When the actionable object is interacted with, it can cause the player to navigate between the first composite image derived from the first plurality of constituent images captured over the first time period and the second composite image derived from the second plurality of constituent images captured over the second time period. The player can be configured to include a pan function. Panning the first composite image of the player to display a first portion of the first composite image can correspond to a first set of angles and cause the player to display a portion of the second composite image corresponding to the first set of angles.

D. Systems and Methods for Providing a Single Station Incident Location Range (SSILR) and a Multi-Mode Image Capture Aspects of the technical solutions are directed to systems and methods of providing a range of an incident location using a single image capture system of a single observation station. Remote sensing systems can be used to monitor geographical areas for the presence of incidents such as wildfires or other emergency events using image capture devices positioned at observation stations. As the image capture devices can acquire visual data of an environment, the acquired data can include a sequence of images that represent the surrounding terrain from a fixed vantage point. While some solutions can utilize observation station triangulation to determine a range or a distance to an incident location, such approaches can encounter technical challenges when ranging a distance to an incident location using only a single observation point. In situations in which only a single image capture system can observe an incident, it can be challenging for a monitoring system to provide an estimate of the range or distance to the incident location, much less a determination of the location of the incident area.

The techniques described herein can overcome these challenges by providing a process for determining both the direction and the range to an incident using a single image capture device. The techniques described herein can identify a direction to an incident location based on bearing and elevation angles determined from an image captured from the image capture device at the observation station. The system can use the resulting bearings in conjunction with a digital elevation model to estimate a range of possible locations for the incident. For instance, a marker can be placed at a location of interest in the panoramic image, such as the base of a fire. The system can convert the marker location from image coordinates to polar coordinates, including azimuth and elevation bearings. The system can use the bearing and elevation angles to project rays from the location of the image capture device through a three-dimensional digital elevation model of the surrounding terrain to identify the location of the incident. The system can also utilize multi-mode images that include multi-modal characteristics (e.g., of visible range, infrared, thermal or other image modes) for improved feature recognition and incident identification.

By virtue of the implementation of the techniques described herein, a system configured for single station incident location ranging can reduce computing processor and memory consumption during incident localization operations. For example, the system can receive a plurality of images captured by an image capture device about an axis of rotation, identify a region of interest within at least one image, and determine a bearing angle and elevation angle corresponding to a direction from the image capture device toward a location of the incident, all without the need for computationally intensive triangulation or multi-station data fusion. By leveraging a digital elevation model in conjunction with direction information from a single observation point, the system can avoid redundant processing associated with synchronizing and analyzing data from multiple devices, thereby conserving processor cycles and memory resources. As a result, the system can provide efficient incident range estimation with reduced computational overhead compared to conventional multi-station approaches.

In some examples, a system configured for single station incident location ranging can reduce network communication demands during incident detection and localization. For example, the system can determine a range of distances to a portion of a geographical area using locally available images and a digital elevation model, without transmitting large volumes of raw sensor data or requiring real-time coordination with other observation stations. By processing images and generating indicators of incident range at the local or server level, the system can limit network traffic to concise indicators or summary data for presentation, rather than streaming high-bandwidth image feeds or multi-station datasets. As a result, the system can support scalable deployment in bandwidth-constrained environments and reduce reliance on persistent high-throughput network connections.

In at least some examples, a system implementing single station incident location ranging can improve accuracy in incident localization compared to other systems relying solely on direction or multi-station triangulation. For example, the system can convert a marker location in a panoramic image to polar coordinates, apply calibration values for tilt, roll, and mounting offsets, and use a digital elevation model to determine a range of possible incident locations by projecting rays and accounting for environmental and installation imprecision. By perturbing angles and leveraging three-dimensional terrain information, the system can more precisely bound the possible incident location, controlling or reducing uncertainty and error introduced by uncalibrated or single-mode approaches. As a result, the system can provide more reliable and accurate incident range estimates from a single observation station.

Figure 14:
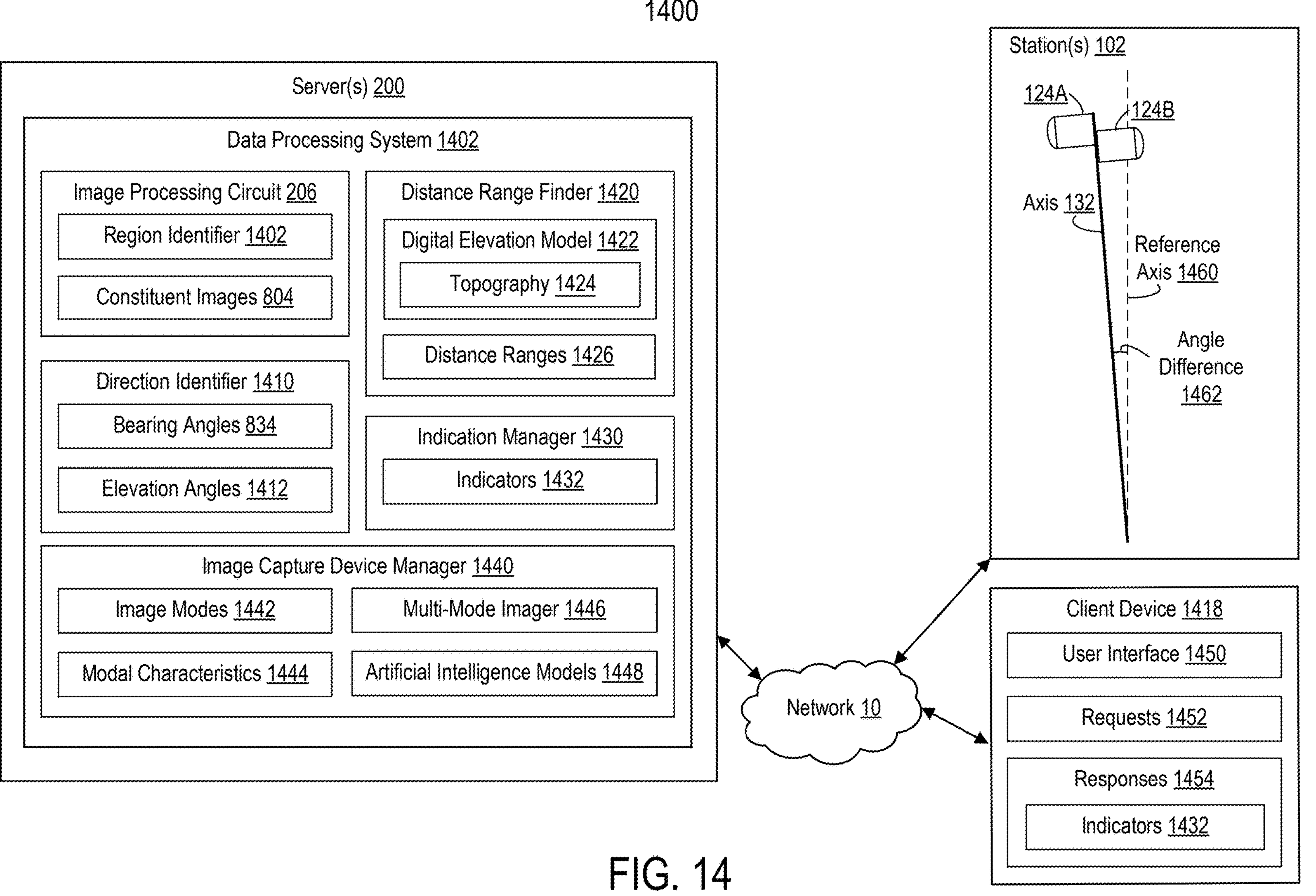
FIG. 14 is a block diagram of an example system for determining incident location range and facilitating or managing multi-mode image generation, in accordance with one or more implementations.

Referring now to FIG. 14, illustrated is a block diagram of an example system architecture 1400 for determining incident location range from a single image capture device and managing multimodal image capture, in accordance with one or more implementations. The system architecture 1400 can include at least one observation station 102, a first image capture device (e.g., a first camera) 124A, a second image capture device (e.g., a second camera) 124B, and at least one axis 132 about which the image capture devices may rotate while capturing images of a surrounding area. The system architecture 1400 can include at least one reference axis 1460, which may be an axis that is vertical with respect to the ground plane, thereby having at least one angle difference 1462 with respect to the axis 132. The system architecture 1400 can include at least one client device 1418, that can include at least one user interface 1450 to generate or display one or more requests 1452 and one or more responses 1454, which can be communicated between the client device and the data processing system via at least one network 10. The system architecture 1400 can include at least one server 200 or a computing device providing, executing, including or processing at least one data processing system 1402.

The data processing system 1402 can include at least one image processing circuit 206 that may include, utilize, execute or operate at least one region identifier 1408 that can include or use one or more constituent images 804 to identify a region of interest corresponding to an incident within a geographical area surrounding the image capture device location. The data processing system 1402 can include, utilize, execute or operate at least one direction identifier 1410 that may determine or compute at least one bearing angle (e.g., a bearing) 834 and at least one elevation angle (e.g., an elevation) 1412 which can correspond or identify a direction from the image capture device location toward a location of the incident. The data processing system 1402 can include, utilize, execute or operate at least one distance range finder 1420 that can use or operate at least one digital elevation model 1422 having or providing at least one topography 1424 of an area of interest to determine or establish one or more distance ranges 1426 from the location of the image capture device to the incident location.

The data processing system 1402 can include, utilize, execute or operate at least one indication manager 1430 to receive and process one or more indicators 1432 of a location of an incident in a geographical area surrounding an observation station. The data processing system 1402 can include, utilize, execute or operate at least one image capture device manager 1440 that can cause or control one or more image capture devices to rotate about the axis and capture, within a time interval, one or more images in a first image mode 1442 having modal characteristics 1444 of the first mode (e.g., visible or infrared mode) and one or more images in a second image mode 1442 having a second modal characteristic 1444 of a second mode (e.g., visible or infrared mode). The image capture device manager 1440 can utilize the multi-mode imager 1446 to generate, based on the images with characteristics of multiple modes input into artificial intelligence or machine learning models 1448, multi-mode images comprising multiple modal characteristics 1444 from multiple image modes.

The system 1400 can include at least one station 102. The station 102, which can also be referred to as an observation station 102, can provide a physical installation site for one or more image capture devices used for monitoring a geographical area. The station 102 can be located at an elevated position, such as a mountaintop observation post, and can include one or more cameras for detecting incidents such as fires. The station 102 can provide a fixed location for capturing images and collecting data for incident detection or localization. In some implementations, the station 102 can house and support cameras oriented to capture panoramic images or targeted images of the surrounding environment. The cameras can be mounted on poles at the station 102 and can capture images at intervals or in response to detection triggers. Each station 102 and each camera can be individually calibrated for tilt, roll, or mounting offsets to provide accurate angle determination.

The station 102 can include at least one first image capture device (e.g., camera 124A) and at least one second image capture device or camera 124B. The camera 124A and the camera 124B can include each be directed to their own respected bearing range, such that camera 124A covers a first portion of bearing range (e.g., 0-180 degrees about the axis 132), while camera 124B covers a second portion of the bearing range (e.g., 180-360 degrees about the axis 132), such that the cameras 124A-B collectively cover the entire 360 view about the axis 132. While only two cameras are illustrated in the example system 1400, it is understood that a configuration of three cameras or four cameras or any other number of cameras 124 can be deployed to cover any range, such as 0-360 degrees about the axis.

In the illustrated example 1400, cameras 124A and 124B can include, for example, cameras operating in any particular image modes 1442 capturing any modal characteristics 1444 of their modes. For example, cameras 124 can include high-resolution visible spectrum cameras operating in visible spectrum image mode 1442 and configured to capture visible spectrum modal characteristics 1444 (e.g., smoke from wildfires contrasted against sky background in visible spectrum images). For example, cameras 124 can include high-resolution infrared or thermal cameras operating in an infrared spectrum image mode 1442 and configured to capture infrared spectrum modal characteristics 1444 (e.g., fires or heat from flames contrasted against cooler background in infrared images). In some implementations, the camera 124A and the camera 124B can operate in multiple imaging modes, such as a visible spectrum mode or an infrared mode.

Cameras 124A and 124B can include devices configured to capture images in any number of image modes 1442. For example, cameras 124 can be configured to operate in any type of image modes 1442 and capture multispectral modal characteristics 1444, such as reflectance or absorption features across multiple discrete wavelength bands. For instance, cameras 124 can include hyperspectral cameras configured to operate in a hyperspectral image mode 1442 and capture hyperspectral modal characteristics 1444, such as fine-grained spectral signatures of vegetation, soil, or atmospheric particulates. Cameras 124 can include ultraviolet cameras configured to operate in an ultraviolet image mode 1442 and capture ultraviolet modal characteristics 1444, such as fluorescence or reflectance in ultraviolet wavelengths. In some implementations, cameras 124A and 124B can include polarization-sensitive cameras configured to operate in a polarization image mode 1442 and capture polarization modal characteristics 1444, such as polarization state changes caused by smoke, water vapor, or reflective surfaces. In some implementations, each of the image modes 1442 can be used independently or in combination to generate a multi-modal image that incorporates modal characteristics 1444 from two or more image modes 1442.

In some implementations, a single image capture device can be configured to operate in multiple imaging modes, such as visible, infrared, ultraviolet, thermal or other spectral or wavelength ranges. Such a single image capture device can acquire images in different ranges or modes by electronically switching between different settings, optical or sensor configurations or filters. For example, a single camera may sequentially capture a visible spectrum image and an infrared image from the same viewpoint within a defined time interval. In some implementations, the observation station can comprise a plurality of image capture devices, with each device configured for or dedicated to a particular mode. For instance, a first camera can be configured for visible imaging and a second camera can be configured for infrared imaging. Both cameras can be controlled or oriented to focus or zoom toward the same incident location direction and capture images of the same incident location. The system may be configured such that image capture is accomplished using either a single multi-modal device or multiple mode-specific devices, or any combination thereof, and may further include logic to coordinate the acquisition and processing of multi-mode data regardless of configuration. The solutions can include system architectures in which one or more image capture devices can be employed serially or in parallel, each selectable or programmable for any available imaging mode.

The camera 124A and the camera 124B can capture images in various modes and orientations for incident detection, localization, or multi-mode analysis. For instance, image capture device manager 1440 can control, manage or direct the camera 124A and the camera 124B to rotate about the axis 132 to particular designated bearing 834 locations to capture images at specified bearing ranges and specified time intervals. The camera 124A and the camera 124B can operate at or switch between imaging modes 1442 within a predetermined time interval (e.g., within 1, 2, 5 or 10 seconds). For example, the camera 124A or the camera 124B can be instructed to capture a visible spectrum image in a visible spectrum image mode 1442 and then also operate at an infrared image mode 1442 to capture an infrared image within a set interval, such as within five seconds. For example, the camera 124A covering a first portion of bearing range (e.g., angle range of 0-180 degrees) can be a visible image mode camera operating at a visible image spectral range. The camera 124A can also have another module or a separate camera (e.g., another camera 124) also covering the same bearing range as the camera 124A, but operating at a different mode (e.g., infrared spectral range). This can allow for a pair of cameras to operate at each of the bearing ranges, such that camera 124A is paired with another camera of a different image mode, and also that camera 124B is paired with another camera of a different image mode. This configuration can allow multi modal image capture across the entire spectral range 0-360. While illustrated example shows only two cameras, it is understood that any number of cameras 124 can be used to cover any range about the axes 130 or 132.

The visible spectral range characteristic of an incident can include, for example, the detection and visualization of features such as the color, shape, density, and movement pattern of smoke, flames, or landscape in the portion of the image captured in visible light wavelengths (e.g., approximately 400 nm to 700 nm). The infrared spectral range characteristic can include features such as thermal hotspots, flame intensity, detection of elevated surface temperatures, or the presence of fires or hotspots not apparent in the visible spectrum, as captured in the corresponding infrared wavelengths (e.g., above 800 nm, such as 800 nm-2 um). For example, in a wildfire scenario, the visible spectral range characteristic may comprise a gray or white smoke plume rising above vegetation, while the infrared spectral range characteristic may comprise a high-intensity flame region or a hotspot detectable through vegetation or at night. The multi-mode image can include, combine or integrate these characteristics so that both color-and-shape information (from the visible spectrum) and intensity-or-location information of fires or hotspots (from the infrared spectrum) are visualized concurrently in the multi-mode image. The multi-mode image can be generated using machine learning, including for example ML or AI models trained to combine multi-modal characteristics or features, element by element or pixel by pixel, into a single multi-mode image.

The images captured by the camera 124A or the camera 124B (and any other associated cameras of different image modes that may be paired with cameras 124A-B) can be used for generating panoramic composite images in any image modes or in any combination of image modes. For instance, an image capture device manager 1440 can direct cameras 124 to capture constituent images 804 in any image modes 1442 (e.g., visible, infrared or any other wavelength range) to use for incident localization. For example, the image capture device manager 1440 can provide captured constituent images 804 as input to artificial intelligence models 1448 to implement a multi-mode image analysis and generate multi-mode images that combine the modal characteristics 1444 from multiple image modes 1442. For example, a multi-mode imager 1446 can utilize the artificial intelligence model 1448 to combine a visible spectrum modal characteristic 1444 (e.g., a visible spectrum image of a smoke in a clear daytime sky) from a constituent image 804 in a first image mode 1442 (e.g., visible spectrum image) with an infrared spectrum modal characteristic 1444 (e.g., infrared image of a fire flame) from a different constituent image 804 in a second image mode 1442 (e.g., infrared spectrum image) to combine these modal characteristics and form a single, enhanced, multi-modal image that includes both the clear image feature of the flame from the infrared mode and the clear image feature of the smoke from the visible mode. The resulting multi-mode image can provide an improved representation of the relevant incident (e.g., a wildfire) that has an improved visibility of both the flames (e.g., more visible in infrared) and the smoke (e.g., more visible in visible spectrum) inside of a single enhanced image.

The system 1400 can include at least one axis 132, at least one reference axis 1460, and at least one angle difference 1462 between the axis 132 and reference axis 1460. The axis 132 can represent an axis of rotation for a camera 124A or a camera 124B, or an axis about which the cameras 124 are rotated while constituent images 804 are captured. The reference axis 1460 can provide a baseline for measuring angles relative to the axis 132, such as for example an angle that is vertical or perpendicular with respect to the ground plane at the station 102. The reference axis 1460 can be a center axis 130. The reference axis 1460 can include, for example, an axis of any predetermined angle with respect to a horizontal plane of the ground. The angle difference 1462 between the axis 132 and reference axis 1460 can include any predetermined or measured offset between the axis 132 and the reference axis 1460. The offset can be an angular offset. In some implementations, the axis 132 can correspond to the axis of rotation of a panoramic camera, and the reference axis 1460 can correspond to a reference direction for azimuth determination.

The system 1400 can use the axis 132 and the reference axis 1460 to determine the orientation of the camera 124A or the camera 124B relative to an incident or a surrounding environment. The system 1400 can perform a marker to angle process in which a marker is placed at a location in a panoramic image, such as the base of a fire, and the system 1400 can convert the particular location of the marker into polar coordinates, including an azimuth bearing 834 and an elevation angle 1412 or an elevation bearing. The system 1400 can compute or determine angles (e.g., bearing 834 and elevation 1412) from the location of the observation station 102 by comparing the current orientation of the camera 124A or the camera 124B to the reference axis 1460 and determining the angle difference 1462. In some implementations, the system 1400 can use the calculated azimuth and elevation bearings in an angle to geographic location process (e.g., with respect to the geometric longitude, latitude and altitude coordinates of the observation station 102). The system 1400 can use the azimuth and elevation bearings, together with a digital elevation model 1422, to determine a range of possible locations for an incident. The digital elevation model 1422 can include a model of a topography 1424 of a geographical area or a region comprising the station 102 and the surrounding areas, including for example particular geographical features of the area (e.g., mountains, valleys, cliffs, rivers, buildings or structures) along with their modeled locations and dimensions. The system 1400 can utilize the image processing circuit 206 to modify, adjust, offset laterally or longitudinally or both, or otherwise perturb the angles or relative locations of constituent images 804 to each other by one or more predetermined offsets to account for imprecision in camera mounting or environmental effects. The image processing circuit 206 can operate with the distance range finder 1420 to use ray tracing in a three-dimensional digital elevation model, locating the estimated location area with respect to the topography 1424, in order to determine intersection points with terrain features and identified regions within which the incident (e.g., fire) exists.

The system 1400 can include at least one network 10. The network 10 can provide a communication infrastructure that connects one or more stations 102, one or more servers 200, and one or more client devices 1418. The network 10 can include a public network, a private network, a wireless network, a wired network, or any combination thereof. The network 10 can transmit image data, requests, responses, or indicators between the station 102, the server 200, and the client device 1418. The network 10 can receive a request from the client device 1418, where the request can include information about an incident or a region of interest. The network 10 can provide, responsive to the request, an indicator for presentation via a graphical user interface of the client device 1418. The network 10 can facilitate data exchange using one or more standard communication protocols. For example, the network 10 can transmit images from the station 102 to the server 200, or transmit indicators from the server 200 to the client device 1418.

The system 1400 can include at least one client device 1418 that may operate at least one user interface 1450 configured to receive one or more requests 1452 to be transmitted to the data processing system 1402 and display one or more responses 1454 that can include one or more indicators 1432. The client device 1418 can be a user-operated computing device. The user interface 1450 can be a graphical interface configured to present information to a user and receive user input. The requests 1452 and the responses 1454 can be data exchanges between the client device 1418 and a server 200 over a network 10. The indicators 1432 can be visual or data outputs generated by the server 200 or the client device 1418. In some implementations, the client device 1418 can communicate with the server 200 over the network 10 by transmitting the requests 1452 generated at the client device 1418 and receiving the responses 1454 from the data processing system 1402 to be displayed on the client device 1418. The user interface 1450 can be configured to display the indicators 1432 to a user. The client device 1418 can be configured to allow a user to select a region of interest within a graphical display. The client device 1418 can transmit a request 1452 that can include information (e.g., location, geographical coordinates or description) of the region of interest to the server 200. The region of interest can be a region within which the image capture device manager 1440 is to turn or direct the image capture devices 124 to take images in any number of image modes 1442. These images can then be combined, using the multi-mode imager 1446 to produce an enhanced multi-mode image with modal characteristics 1444 from various modes (e.g., spectral or signals ranges or types). The server 200 can process the request 1452 and utilize the indication manager 1430 to generate a response 1454 including an indicator 1432 indicative of a range of distances to an incident location (e.g., an indicator to be displayed on an image of a map). The indicator 1432 can also include a multi-mode image with enhanced graphics combining modal characteristics 1444 from various image modes 1442 into single representation of the location or the incident. The user interface 1450 can display the indicator 1432 to the user via a display on the client device 1418. In some implementations, the indicator 1432 can be overlaid on a panoramic composite image or a map presented by the user interface 1450.

The system 1400 can include at least one server 200 and at least one data processing system 1402. The server 200 and the data processing system 1402 can provide computing resources for processing image data, managing system operations, or executing algorithms. The server 200 or the data processing system 1402 can be implemented as cloud-based servers or as on-premises computing devices. The server 200 or the data processing system 1402 can execute processes for image analysis, incident localization, multi-mode imaging, or indicator generation. In some implementations, the server 200 or the data processing system 1402 can receive data from one or more stations 102, process images using one or more modules, or communicate results to one or more client devices 1418. The server 200 or the data processing system 1402 can execute ray tracing in a three-dimensional model (e.g., digital elevation model 1422 with a three-dimensional topography 1424) by projecting rays or directions from the one or more cameras (e.g., cameras 124A or 124B) via a digital elevation model 1422 to determine intersection points and compute or determine one or more areas or ranges corresponding to an incident location on the topographical or geographical map. The server 200 or the data processing system 1402 can execute artificial intelligence models 1448 for incident detection or classification based on incoming images.

The system 1400 can include at least one image processing circuit 1406 that can process at least one region identifier 1408 to identify regions based on one or more constituent images 804 and at least one direction identifier 1410 that can determine one or more bearing angles 834 and one or more elevation angles 1412 for determining the region of the incident. The image processing circuit 1406 can process raw image data received from one or more image capture devices. The region identifier 1408 can detect a region of interest within at least one of the constituent images 804. The constituent images 804 can include a plurality of input images acquired by an image capture device about an axis of rotation. The direction identifier 1410 can determine an orientation of the region of interest relative to a reference axis. The bearing angles 834 and the elevation angles 1412 can be calculated parameters that correspond to the direction from the image capture device toward a location of an incident. In some implementations, the image processing circuit 1406 can perform a marker to angle process in which a marker is placed at a location in a panoramic image, and the image processing circuit 1406 can convert the particular location of the marker into polar coordinates, including an azimuth bearing and an elevation bearing. In some implementations, the image processing circuit 1406 can analyze the constituent images 804 to locate incidents, compute angles using marker positions, and output data for further localization processing. The calibration values associated with each image capture device can be stored and used in subsequent calculations by the image processing circuit 1406 to improve precision in angle determination.

The system 1400 can include at least one distance range finder 1420, at least one digital elevation model 1422, at least one topography 1424, and one or more distance ranges 1426. The distance range finder 1420 can compute possible locations of an incident by processing directional information derived from image data. The digital elevation model 1422 can represent a topography 1424 of a geographical area surrounding a station 102, including for example a three-dimensional representation of the geographical area (e.g., such as a predetermined radius around the station 102, including for example a radius of 5, 10, 20, 50, or more than 50 miles). The topography 1424 can include terrain features or elevation data corresponding to the digital elevation model 1422. The distance ranges 1426 can include calculated outputs representing estimated distances from a camera 124A or a camera 124B to a portion of the geographical area.

Topography 1424 can include any representation of physical surface features and elevation characteristics of a geographical area. Topography 1424 can include a representation of geographical terrain or surface features as provided by or derived from a topographical or a geographical model, such as a Digital Elevation Model (DEM), a Digital Surface Model (DSM), or a Digital Terrain Model (DTM). The topography 1424 can include, for example, terrain contours, gradients, slopes, peaks, valleys, and other variations in elevation. Topographical data can be used in the system to perform operations including, but not limited to, determining line-of-sight distance, range or visibility, determining where terrain may occlude an incident location, identifying a point along a projected path where visual features such as smoke or flames can first become observable, or supporting range estimation to features of interest.

Related spatial relationship information, such as topology data, can be used in combination with the topography 1424. For example, a topology can include a network of visibility connections showing which observation stations have unobstructed views of certain terrain features, or relationships among multiple incident areas and monitoring sites. The topography 1424 can be leveraged alone or together with topology data to enhance accuracy of range finding, visibility prediction, and incident location analysis.

The distance range finder 1420 can determine a range of a location of an incident with respect to a location of the station 102. The distance range finder 1420 can use an angle to geographic location process, identifying the region with respect to a distance along a direction corresponding to the angle (e.g., bearing 834) along which the incident is determined to be located. The distance range finder 1420 can establish a cross-sectional range with respect to the direction to identify a width of the estimated location of the incident along a range of a length of the direction (e.g., along the angle or bearing 834). This width (e.g., cross-sectional or perpendicular to the direction along the bearing or the angle) along with a portion of the length of the direction to which the incident location pertains, can form an area within which incident is determined to be located.

The distance range finder 1420 can use azimuth and elevation bearings derived from a marker placed in a panoramic image and can project one or more rays from the camera 124A or the camera 124B through the digital elevation model 1422. The distance range finder 1420 can determine intersection points between the projected rays and the terrain represented by the digital elevation model 1422. In some implementations, the distance range finder 1420 can perturb the azimuth or elevation bearings by a predetermined offset, such as ±0.4°, to account for imprecision in camera mounting or environmental factors. The distance range finder 1420 can repeat the ray tracing process for each perturbed angle and can aggregate the resulting intersection points to determine the distance ranges 1426. The distance ranges 1426 can be stored or provided for further processing by other components of the system 1400.

The system 1400 can include at least one indication manager 1430 and one or more indicators 1432. The indicators 1432 can include, for example, indications or representations of the geographical area of the location of the incident to be displayed on a map of the client device 1418. The indication manager 1430 can generate or manage visual or data indicators or information about locations of incidents. The indicators 1432 can include outputs that represent an incident location, a range to an incident, or a confidence metric associated with incident localization. In some implementations, the indication manager 1430 can process results from one or more localization modules or imaging modules. The indication manager 1430 can format the indicators 1432 for presentation or further processing. The indication manager 1430 can transmit the indicators 1432 to a user interface 1450 of a client device 1418. In some implementations, the indicators 1432 can include visual overlays on a panoramic composite image or a map. The indicators 1432 can include, for example, a graphical element that visually represents an estimated incident location or a range of distances to an incident. In some implementations, the indicators 1432 can include data values that correspond to a lower boundary or an upper boundary of a range of distances. The indication manager 1430 can generate the indicators 1432 based on outputs from the distance range finder 1420, the image processing circuit 1406, or other components of the data processing system 1402. The indication manager 1430 can overlay the indicators 1432 on a panoramic composite image generated from constituent images 804. The indication manager 1430 can provide the indicators 1432 for presentation via the user interface 1450 of the client device 1418.

The indicators 1432 can include one or more data elements that represent geographical locations. The indicators 1432 can be received from the client device 1418 as part of a request 1452. The request 1452 can specify a direction of interest. The indicators 1432 can be used to cause the cameras 124 to be directed toward the specified direction of interest. The cameras 124 can capture one or more images of a potential incident based on the direction specified by the indicators 1432. In some implementations, the indicators 1432 can include coordinate data, region identifiers, or other location information provided by the client device 1418. In some implementations, the indicators 1432 can be associated with a time interval or other metadata to further specify the context of the request 1452.

The system 1400 can include at least one image capture device manager 1440 that can direct one or more cameras 124 to capture images in accordance with one or more image modes 1442. The image capture device manager 1440 can instruct the cameras 124 to operate in a visible spectrum mode or an infrared mode. In some implementations, the image capture device manager 1440 can instruct the cameras 124 to capture a visible spectrum image and an infrared image within a defined time interval, such as within five seconds. The images captured in different image modes 1442 can include or identify one or more modal characteristics 1444. The modal characteristics 1444 can include features that are visible in the particular image mode 1442, such as visible spectrum images of smoke in the sky or infrared spectrum images of flames or fires. The visible spectrum images can include features that are more apparent in the visible spectral range than in the infrared spectral range. The infrared spectrum images can include features that are more apparent in the infrared spectral range than in the visible spectral range.

The image capture device manager 1440 can operate at least one multi-mode imager 1446 to generate multi-mode images. The multi-mode imager 1446 can receive the images captured in different image modes 1442 and can combine the modal characteristics 1444 from the visible spectrum images and the infrared spectrum images. In some implementations, the multi-mode imager 1446 can use one or more artificial intelligence models 1448 to generate a combined multi-mode image. The artificial intelligence models 1448 can receive the visible spectrum image and the infrared image as input and can generate a fused image that includes pixel information from both images. The combined multi-mode image can include features from both the visible spectrum and infrared spectrum images, such as smoke and flames, in a single image for further analysis or presentation.

Fusing or generating a multi-mode image can include, for example, aligning the visible spectral range image and the infrared spectral range image such that corresponding pixel coordinates represent the same real-world location. This process can include combining the pixel information, such as intensity values, color values, or derived features, at each pixel coordinate using a combination method (for example, alpha blending, overlay, pixel-by-pixel selection based on thresholding, masking, or applying a color mapping or lookup function), so that the resulting composite image visually integrates features characteristic of both modes. For example, pixels associated with smoke may be displayed from the visible image while pixels of flames or elevated temperatures from the infrared or thermal image can be overlaid using a bright color palette. This combination of features, element by element or pixel by pixel, can allow for the flame from one imaging mode and smoke from another imaging mode to be combined into a single multi-mode image, to be viewed together in a single, spatially coherent visualization for enhanced incident awareness and analysis.

The image capture device manager 1440 can, in some implementations, utilize indicators 1432 (e.g., information or data on location incident) received from a request 1452 to direct the cameras 124 (e.g., zoom into) particular bearings range and elevation range to capture zoomed in images of the location incident location from the indicator 1432. In some implementations, the image capture device manager 1440 can determine a zoom amount for the cameras 124 based on a spatial extent of the region specified by the indicators 1432. For example, the image capture device manager 1440 can calculate a field of view required to encompass the area identified by the indicators 1432 and can instruct the cameras 124 to adjust an optical zoom or a digital zoom to achieve the calculated field of view. In some implementations, the image capture device manager 1440 can select a zoom level such that the region of interest occupies a predetermined proportion of an image frame.

The image capture device manager 1440 can cause the cameras 124 to capture images in a single imaging mode, such as a visible spectrum mode or an infrared mode, according to a mode parameter associated with the request 1452 or the indicators 1432. In some implementations, the image capture device manager 1440 can cause the cameras 124 to capture a first image in a visible spectrum mode and a second image in an infrared mode within a predetermined time interval, such as within five seconds. The image capture device manager 1440 can provide the first image and the second image to the multi-mode imager 1446, which can generate a multi-mode image of the region specified by the indicators 1432. The multi-mode imager 1446 can combine visible spectrum characteristics and infrared spectrum characteristics of the incident region location to generate a fused digital image. In some implementations, the multi-mode imager 1446 can use an artificial intelligence model 1448 to process the first image and the second image and generate a multi-mode image that includes features from both imaging modes, such as smoke visible in the visible spectrum and flames visible in the infrared spectrum. The image capture device manager 1440 can associate metadata with each image or multi-mode image, including a modality, a timestamp, an identifier of the cameras 124, or a field of view. In some implementations, the image capture device manager 1440 can transmit the multi-mode image to a remote computing device for further analysis or presentation.

The image capture device manager 1440 can coordinate operation of one or more cameras 124 to capture images in different image modes 1442. The image modes 1442 can include, for example, a visible spectrum mode or an infrared mode. The modal characteristics 1444 can define properties of each imaging mode, such as spectral sensitivity or exposure parameters. The multi-mode imager 1446 can combine images captured in different image modes to generate a multi-mode image. In some implementations, the image capture device manager 1440 can instruct a camera to capture a visible spectrum image and an infrared image within a defined time interval, such as within five seconds. The multi-mode imager 1446 can receive the visible spectrum image and the infrared image and can generate a fused image that combines pixel information from both images. The artificial intelligence model 1448 can receive the fused image or the individual images and can analyze the image data to detect or classify incidents, such as fires. In some implementations, the artificial intelligence model 1448 can be trained to process multi-mode images that include both visible spectral range characteristics and infrared spectral range characteristics. The artificial intelligence model 1448 can generate an output indicative of incident presence, location, or classification based on the analysis of the multi-mode image.

Figure 15:
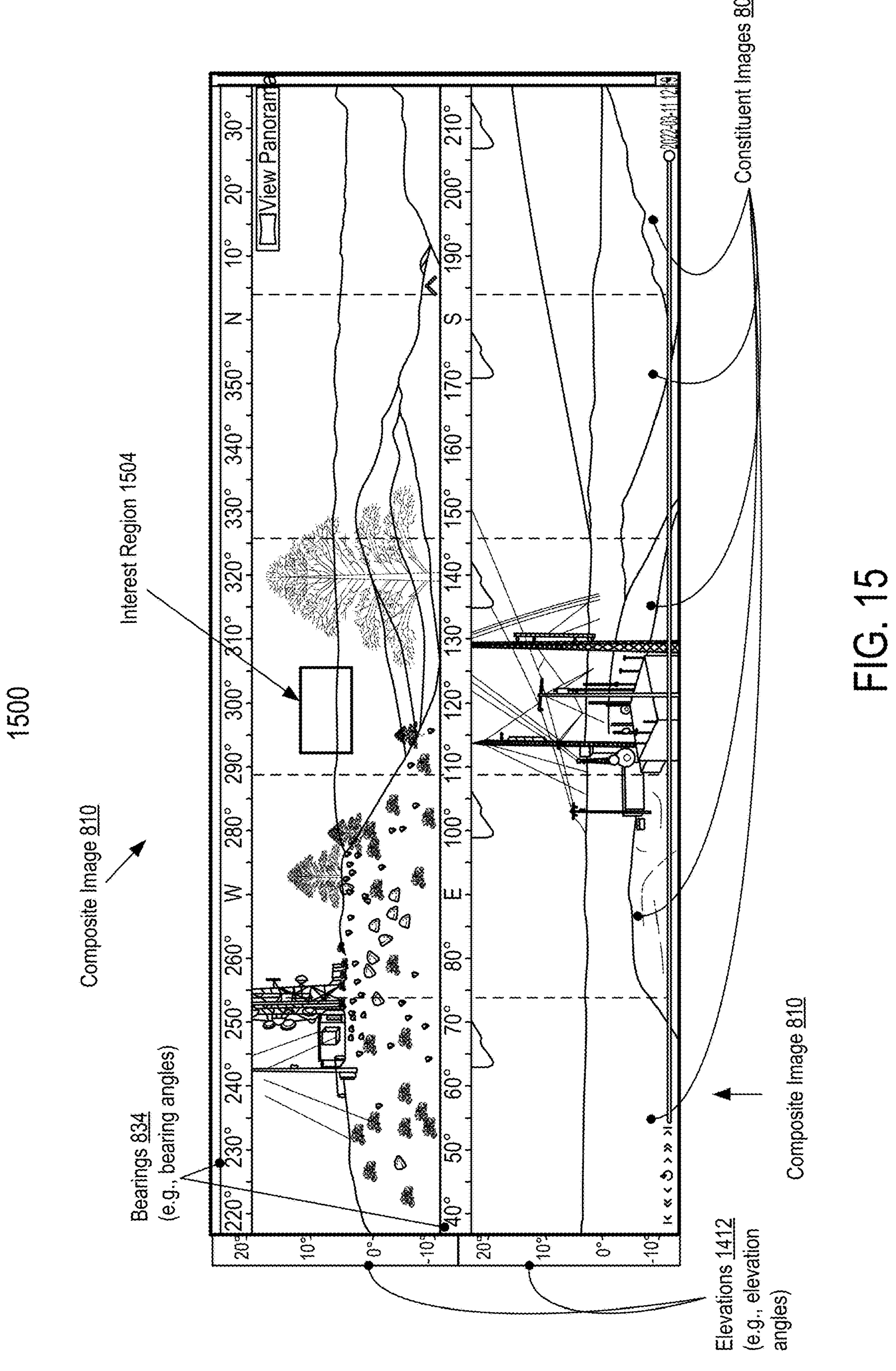
FIG. 15 is a diagram illustrating a panoramic composite image generated from constituent images, showing bearings, elevations, and an identified region of interest, in accordance with one or more implementations.

Referring now to FIG. 15, illustrated is a diagram of a panoramic image display 1500 showing a composite image 810 that is generated from constituent images 804 and including bearings 834, elevation angles 1412, and an interest region 1504. The panoramic image display 1500 can include a composite image 810 (e.g., a panorama) that can be displayed on a graphical user interface of a client device and can be formed from one or more constituent images 804. The panoramic image display 1500 can include a plurality of composite image 810 that are generated by stitching together the constituent images 804. The images can be stitched by tilting, adjusting, realigning or otherwise moving constituent images 804 laterally, longitudinally or angularly according to one or more offsets determined based on the angle difference 1462 between the axis 132 and reference axis 1460, in order to align, set, fix or otherwise position the constituent images 804 in proper positions or orientations to be stitched and formed into a panoramic image. The panoramic image display 1500 can include one or more bearings 834 that represent azimuth or bearing angles mapped along a horizontal axis of the composite image 810. The panoramic image display 1500 can include one or more elevation angles 1412 that represent elevation angles mapped along a vertical axis of the composite image 810. The panoramic image display 1500 can include at least one interest region 1504 that corresponds to a region of significance, such as a region in which a fire incident is identified or suspected, within the composite image 810. The panoramic image display 1500 can receive a marker placed at a location of interest in the composite image 810. The panoramic image display 1500 can convert a location of the marker in the constituent image 804 into polar coordinates, including an azimuth bearing and an elevation bearing, for subsequent processing.

The panoramic image display 1500 can include one or more constituent images 804. The constituent images 804 can be individual images captured by an image capture device at different orientations about an axis of rotation. The constituent images 804 can be used as input for generating a panoramic composite image. The image capture device can acquire the constituent images 804 by rotating about the axis of rotation and capturing images at predefined angular intervals. For example, the image capture device can capture images at regular increments, such as every 10 degrees, around a fixed observation station. The constituent images 804 can provide the raw visual data used for constructing a panoramic view of the surrounding area. The constituent images can include images captured in any image modes 1442 or multi-mode images generated by combining images from multiple image modes 1442. The constituent images 804 can be digitally combined to generate a panoramic composite image. In some implementations, the image capture device can be instructed to capture images in different modes, such as a visible spectrum mode and an infrared mode, within a short interval, such as within five seconds. The constituent images 804 can include images captured in one or more modes and can be used for further processing, such as incident detection or panoramic image generation.

The image processing circuit 206 can determine and store offsets that can be determined individually for each constituent image 804 used for generating composite or panoramic images. The offsets can include angular corrections for tilt, roll, or mounting misalignment of each camera used to capture the constituent images 804. In some implementations, the image processing circuit 206 can calculate the offsets by based on the angle difference 1462, which can vary in the azimuthal directions about the axis 130 or axis 132, with respect to the reference axis 1460. The offset values can also be processed, adjusted or verified by comparing features in the constituent images 804 to physical landmarks or reference points, such as to match features at the outer edges of the stitched constituent images 804 forming a composite or panoramic image. The image processing circuit 206 can store the offsets in a database or a data storage, in association with each constituent image 804 for subsequent use in digital alignment of future constituent images 804 of the same type. For example, the offsets may be stored such that a first set of offsets for a first constituent image 804 covering a first bearings range is stored for future first constituent images 804, while a second set of offsets can be stored for a second constituent image 804 covering a second bearings range to use for future second constituent images of future constituent image sets. The image processing circuit 206 can apply the stored offsets to digitally correct the position or orientation of each constituent image 804 during the generation of a composite image 810. In some implementations, the image processing circuit 206 can update the offsets based on periodic manual calibration or automated detection of mounting changes. The image processing circuit 206 can use the offsets to maintain consistent alignment of composite or panoramic images over time.

The panoramic image display 1500 can include at least one composite image 810. The composite image 810 can be generated by stitching together the constituent images 804 to form a panoramic image. The composite image 810 can represent a panoramic view of the monitored area, such as a 360-degree image corresponding to the full field of view from an observation station. The composite image 810 can enable visualization of the monitored area in a single continuous image. The composite image 810 can be generated by applying digital corrections or offsets, including any angle calibrations to align the constituent images 804 to compensate for any misalignments or errors caused by an angle difference 1462 between axis 132 or axis 130 and reference axis 1460. The digital corrections can include the application of stored offset values for each angle around a rotation, such that the constituent images 804 are digitally aligned to correct for physical misalignment or sensor drift. In some implementations, the angle calibrations can be performed by calculating and storing offsets for each angle to account for physical misalignment or camera mounting issues. The composite image 810 can be reconstructed from the plurality of constituent images 804 for presentation via a graphical user interface. In some implementations, the composite image 810 can be used to generate a map corresponding to at least a portion of the geographical area, and an indicator can be overlaid on the map.

The panoramic image display 1500 can include one or more bearings 834. The bearings 834 can represent azimuthal angles associated with different portions of the panoramic image display 1500. The bearings 834 can indicate the direction that each segment of the composite image 810 corresponds to in a real-world coordinate system. In some implementations, the bearings 834 can be labeled in degrees, such as from North at 0 degrees, East at 90 degrees, South at 180 degrees, or West at 270 degrees. The bearings 834 can be determined using a marker to angle process in which a marker is placed at a location of interest, such as the base of a fire, within the composite image 810. The marker can be converted from a particular area or location in the composite image 810 into polar coordinates, including an azimuth bearing and an elevation bearing. The bearings 834 can enable the panoramic image display 1500 to indicate the direction of features or incidents within the composite image 810. In some implementations, the bearings 834 can be calculated based on the known orientation of a camera at the time each constituent image 804 is captured. The bearings 834 can be preserved through the stitching process used to generate the composite image 810. In some implementations, the panoramic image display 1500 can record the azimuth angle for each constituent image 804 and map the azimuth angle onto the composite image 810. The projection method used to generate the composite image 810 can provide that the bearings 834 and elevation angles 1412 are preserved for use in subsequent location calculations.

The panoramic image display 1500 can include one or more elevation angles 1412. The elevation angles 1412 can represent the vertical orientation associated with different portions of the panoramic image display 1500. In some implementations, the elevation angles 1412 can be labeled in degrees relative to the horizon, such as 0 degrees for the horizon, positive values for positions above the horizon, or negative values for positions below the horizon. The elevation angles 1412 can be determined using a marker to angle process, in which a marker is placed at a location in the panoramic image display 1500, such as the base of a fire, and the marker location is converted from coordinates in the image to polar coordinates including an azimuth bearing and an elevation bearing. The elevation angles 1412 can enable determination of the vertical direction to features or incidents within the panoramic image display 1500, which can support accurate localization of such features or incidents in three-dimensional space. The elevation angles 1412 can be computed by mapping the vertical position of features in the constituent images 804 to real-world elevation bearings. The computation can use calibration data to correct for tilt or roll of each camera. In some implementations, the calibration data can be determined by manual calibration using physical landmarks to establish the tilt or roll of each camera or offsets for adjusting the camera azimuth or elevation. The calibration values can be stored and used in subsequent calculations to improve the precision of the bearing angles 834 or elevation angles 1412.

The panoramic image display 1500 can include at least one interest region 1504. The interest region 1504 can be a marked area within the panoramic image display 1500 that corresponds to a detected or user-identified region of interest, such as the base of a fire. In some implementations, the interest region 1504 can be presented as a rectangular or highlighted area overlaid on the composite image 810 to indicate the location of an incident. In some implementations, the interest region 1504 can be generated by user input or by automated detection algorithms. For example, a user can select a location within the panoramic image display 1500, and the system can record the XY location of the selected point. The panoramic image display 1500 can include a marker to angle process in which a marker is placed at the base of a fire in the panoramic image display 1500, and the location of the marker is converted into polar coordinates, including an azimuth bearing and an elevation bearing. In some implementations, the system can convert the location of the interest region 1504 from image coordinates to real-world bearings and elevations for further processing. The interest region 1504 can enable the system or a user to focus analysis and localization processes on a specific area within the panoramic image display 1500.

Figure 16:
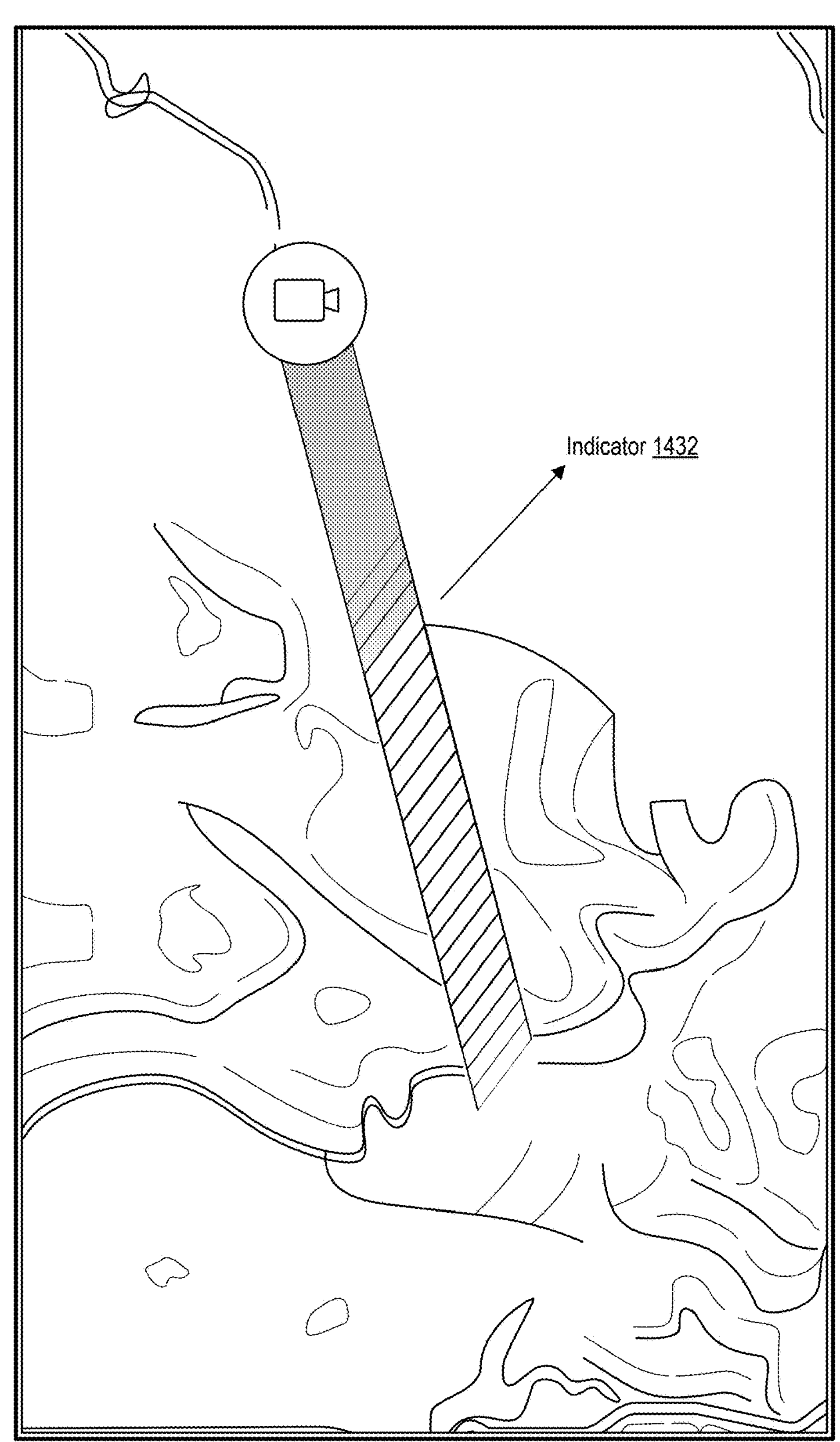
FIG. 16 is a diagram illustrating an example display of a user interface showing a map with a camera station and a visual indicator of an incident location on a topographic map with reference to the observation station, in accordance with one or more implementations.

Referring now to FIG. 16, illustrated is a diagram of a topographic map display 1600. The topographic map display 1600 can include one or more indicators 1432. The indicators 1432 can visually represent a field of view or a detection range of a camera station on the topographic map display 1600. The topographic map display 1600 can provide a graphical representation of a mapped terrain in a vicinity of the camera station. The indicators 1432 can depict a coverage area or a detection range of a camera associated with the camera station. In some implementations, the indicators 1432 can include a shaded region, a wedge, or a polygon that corresponds to an area of terrain monitored by the camera station. The shaded area can be defined by a ribbed, colored, shaded or otherwise marked area defined by a portion of a length along a direction (e.g., from the station 102) and a portion of a width of the indicator 1432 along the identified length portion. This area (e.g., marked length and width on the map) can correspond to a potential or determined location of the incident. In some implementations, the indicators 1432 can be generated based on calibration data, bearing data, or elevation data associated with the camera station, including for example angular, longitudinal or latitudinal offsets for each of the individual constituent images 804. The indicators 1432 can be rendered as an overlay on the topographic map display 1600. In some implementations, the indicators 1432 can be used to indicate a spatial extent of coverage or a detection range for situational awareness or incident localization.

The topographic map display 1600 can be a graphical representation of a geographical area that includes terrain features and elevation contours. The topographic map display 1600 can be generated as a digital or graphical rendering of a geographical region. The topographic map display 1600 can incorporate elevation data and terrain features to provide spatial context for incident detection or camera coverage. In some implementations, the topographic map display 1600 can be generated as a computer-generated map that includes elevation lines, hills, valleys, or other terrain features relevant to the location of a camera station 102. In some implementations, the topographic map display 1600 can use a digital elevation model 1422 to simulate the view from a camera station 102 and calculate distances based on the terrain. The topographic map display 1600 can provide a visual context for the placement or orientation of camera stations 102 and the visualization of incident detection ranges. In some implementations, the topographic map display 1600 can render digital elevation data and overlay indicators 1432 that represent the field of view or detection range of a camera station 102. The topographic map display 1600 can be generated from digital elevation model data, and the field of view of a camera station 102 can be rendered as an overlay on the topographic map display 1600. In some implementations, the topographic map display 1600 can be presented via a graphical user interface, and the indicators 1432 can be overlaid on the topographic map display 1600 to indicate the spatial extent of camera coverage or incident detection.

The indicators 1432 can include one or more graphical elements that visually represent a field of view or a detection range of a camera station on the topographic map display 1600. The indicators 1432 can include visual overlays or graphical elements, such as shaded regions, wedges, or polygons, that denote an area of terrain covered or monitored by a camera station. In some implementations, the indicators 1432 can include a shaded wedge extending from a camera station icon to indicate an angular coverage and a range of the field of view of a camera station. The indicators 1432 can visually communicate a spatial extent of coverage of a camera station, including a direction, a range, or boundaries. In some implementations, the indicators 1432 can be generated by computing a field of view or a detection range of a camera station based on calibration data, bearing data, or elevation data, and rendering a resulting region as an overlay on the topographic map display 1600. The system 1400 can calculate azimuth angles and elevation angles, determine a corresponding region on a digital elevation model 1422, and display a shaded area representing the detection range. In some implementations, the system 1400 can perform ray tracing in a three-dimensional model by projecting rays from a camera station through the digital elevation model 1422 to determine intersection points and possible ranges. The indicators 1432 can be provided for presentation to indicate a range of distances from a location of an image capture device to a portion of a geographical area, or to indicate a lower boundary and an upper boundary of the range of distances. In some implementations, the indicators 1432 can be overlaid on the topographic map display 1600 for presentation via a graphical user interface.

The indicators 1432 can be received as input from a client device 1418 via a request 1452. The request 1452 can include information specifying a region of interest, such as a location or an area within the topographic map display 1600. The system 1400 can use the information from the indicators 1432 to determine a bearing angle and an elevation angle range corresponding to the specified region. In such instances, the image capture device manager 1440 can use the information from the indicator 1432 to direct one or more cameras 124A or 124B to rotate about an axis 132 and capture images along the bearing angle and elevation angle range identified based on the indication information in the region. In some implementations, the indicators 1432 received from the client device 1418 can be used to initiate image capture in one or more image modes 1442, or to generate a multi-mode image using the multi-mode imager 1446. The indicators 1432 can thereby provide a mechanism for the client device 1418 to specify a direction or area of interest, which the system 1400 can use to control image capture operations and subsequent analysis.

Figure 17:
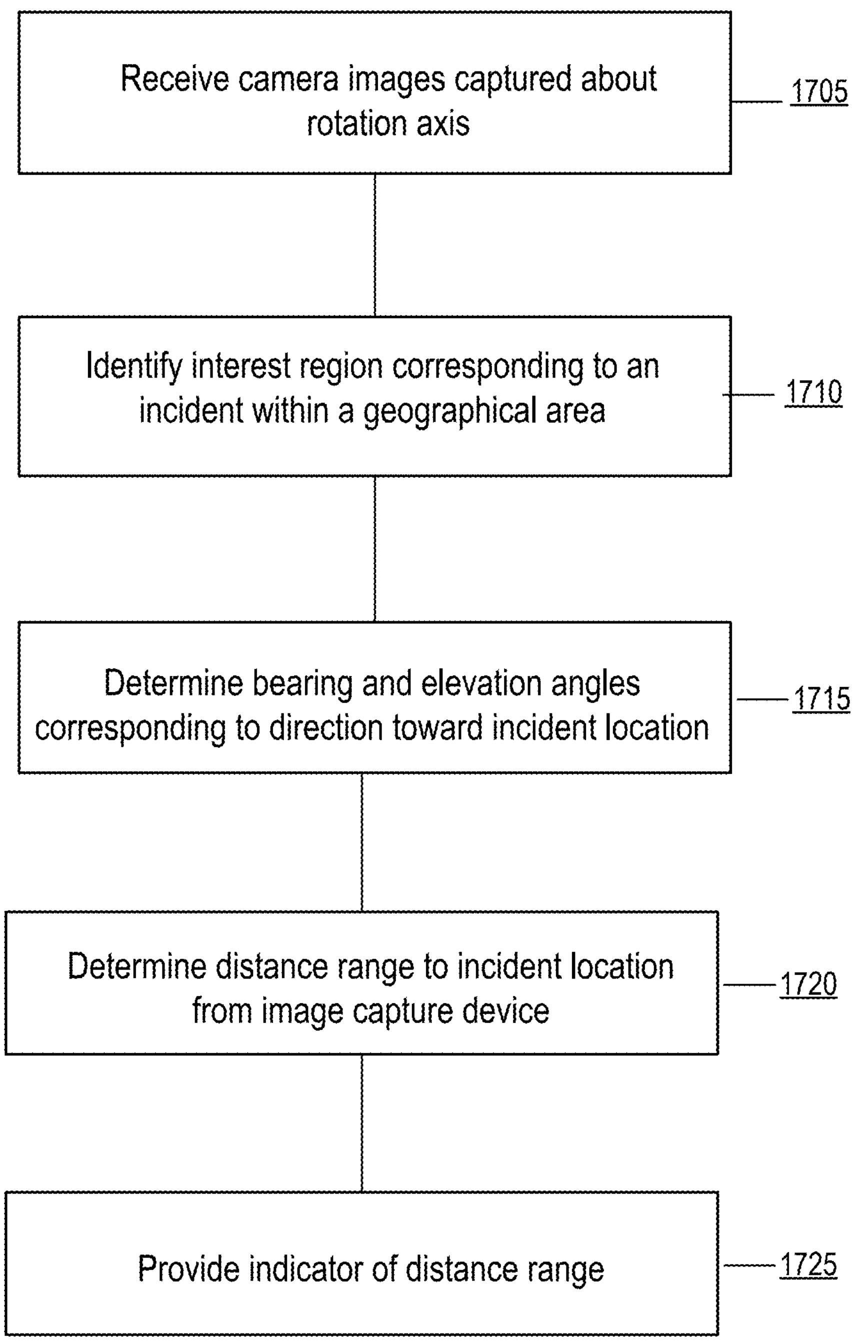
FIG. 17 is a flow chart illustrating a method for determining a distance range to an incident location using images captured about a rotation axis, in accordance with one or more implementations.

Referring now to FIG. 17, depicted is a flow chart illustrating a method 1700 for determining a distance range to an incident location using images captured about a rotation axis. The method 1700 can be executed, performed, or otherwise carried out by any of the computing systems or devices described herein. In brief overview of the method 1700, the method 1700 can include receiving camera images captured about a rotation axis (STEP 1705), identifying an interest region corresponding to an incident within a geographical area (STEP 1710), determining bearing and elevation angles corresponding to a direction toward the incident location (STEP 1715), determining a distance range to the incident location from the image capture device (STEP 1720), and providing an indicator of the distance range (STEP 1725).

The method 1700 can include receiving camera images captured about rotation axis (STEP 1705). The method 1700 can include receiving a plurality of images captured by an image capture device about an axis of rotation of the image capture device, such as a central axis of an image capture system comprising a plurality of cameras or an axis of a camera of the image capture system. The image capture device can be positioned at a station and can include one or more image capture devices (e.g., cameras). The axis of rotation can define the path along which the image capture device acquires the plurality of images. The plurality of images can be captured at discrete angular intervals as the image capture device rotates about the axis of rotation. The image capture device can capture constituent images 804 at predefined positions about the axis of rotation to provide coverage of a surrounding geographical area. The plurality of images can be stored for subsequent processing by a data processing system 1402. In some implementations, the plurality of images can include images captured in different image modes, such as visible spectrum or infrared modes. The plurality of images can be used to generate a panoramic composite image or can be analyzed to identify a region of interest corresponding to an incident.

The method 1700 can include identifying interest region corresponding to incident within geographical area (STEP 1710). The method can include identifying, within at least an image of the plurality of images, a region of interest that corresponds to an incident within a geographical area surrounding a location of the image capture device. For example, the method can include receiving, from a user interface of a client device, a user selection of a marker placed at a location in a panoramic composite image, where the marker indicates the base of a fire or another incident. The method can include automatically detecting, by an image processing circuit, a region of interest in at least one constituent image based on feature analysis, such as identifying a region exhibiting characteristics of smoke or flame. In some implementations, the method can include determining the region of interest by analyzing a sequence of images to detect changes in pixel intensity or color that correspond to the onset of an incident. In some implementations, the method can include receiving a request specifying a time interval and a location, and identifying, within the corresponding images, a region of interest based on the relation between the location of the image capture device and the specified direction or coordinates.

The method can include determining a range of bearing angles about the axis of rotation. The range of bearing angles can include the bearing angle of the direction towards the incident and a range of angles surrounding this direction. For example, the range of bearing angles can include a range of bearing angles corresponding to a width of the portion of the geographical area corresponding to the region of interest. The method can include determining the region of interest based on the range of bearing angles in relation to the location of the image capture device. In some implementations, the range of bearing angles can be selected to encompass a suspected fire location as marked by a user on a panoramic image. The range of bearing angles can be defined to include an angular span that covers both the direct line to the incident and adjacent areas where the incident may be located due to uncertainty in marker placement or camera calibration. In some implementations, the range of bearing angles can be set to include a margin of error or a tolerance, such as plus or minus a predetermined number of degrees from the detected bearing, to account for possible imprecision in the orientation of the image capture device or environmental factors.

The method can include receiving a request comprising information about the incident. The request can be indicative of the region of interest and a time interval. The method can identify, based on the time interval, the plurality of images stored in a data repository; and determine, within at least a portion of the image, the region of interest based on a relation between the location of the image capture device and the region of interest according to the bearing angle. In some implementations, the request can specify a particular time window, such as a one-hour interval, and the method can select all images captured by the image capture device during that window for analysis. In some implementations, the request can identify a region of interest by providing coordinates or a graphical selection, and the method can determine which images contain the specified region by comparing the bearing angle of the image capture device at the time of capture to the direction of the region of interest.

The method 1700 can include determining bearing and elevation angles corresponding to direction toward incident location (STEP 1715). The method can include determining, for the region of interest, a bearing angle about the axis of rotation and an elevation angle relative to a plane perpendicular to the axis of rotation. The bearing angle and the elevation angle can correspond to, or indicate, a direction from the image capture device at the observation station toward a location of the incident. For example, the method can include receiving a marker placed at a location in a panoramic image and converting the marker location from image coordinates to polar coordinates, such as azimuth and elevation bearings. In some implementations, the method can include determining the bearing angle as an angular displacement from a reference direction, such as north, and determining the elevation angle as an angular displacement from a horizontal plane passing through the image capture device.

The method can include determining the range of bearing angles using the digital elevation model and generating the indicator indicative of the width of the region of interest. In some implementations, the method can include calculating a set of bearing angles that span the region of interest and mapping the corresponding angular width onto a panoramic image. In some implementations, the method can include generating an indicator that visually represents the width of the region of interest on a graphical user interface. For example, the method can include displaying a shaded area on a map that corresponds to the calculated width. For example, the method can include outputting a numerical value representing the angular width of the region of interest for further analysis.

A method can include determining, based on a digital elevation model, a range of elevation values that correspond to a plurality of geographic coordinates within a geographical area. The method can further include selecting, from the range of elevation values and based on a topography of the digital elevation model along a direction, a subset of the elevation values that correspond to a range of distances to a portion of the geographical area that includes a location of an incident. The method can further include determining, using the digital elevation model, a ray that corresponds to the direction from a location of an image capture device toward the location of the incident. The method can further include determining, based on a topography of the geographical area in the digital elevation model, an intersection of the ray with a surface that corresponds to the subset of elevation values.

A method can include identifying, in a data repository, a calibration value for an image capture device. The calibration value can correspond to an angular offset for the image capture device. The method can further include adjusting at least one of a bearing angle or an elevation angle using the calibration value. The method can also include determining a range of distances using at least one of the adjusted bearing angle or the adjusted elevation angle. The method can include retrieving a calibration value that represents a tilt correction for a camera mounted on a pole and applying the tilt correction to the elevation angle before calculating the distance to a detected incident. In some implementations, the method can include identifying a roll offset for a camera, adjusting the bearing angle by the roll offset, and determining the possible locations of an incident based on the adjusted bearing angle.

The method 1700 can include determining distance range to incident location from image capture device (STEP 1720). The method can include determining, using the direction and a digital elevation model of the geographical area, a range of distances from the image capture device to a portion of the geographical area comprising the location of the incident. In some implementations, the method can include projecting one or more rays from the image capture device along the determined direction through the digital elevation model to identify intersection points with the terrain. In some implementations, the method can include perturbing the direction by a predetermined angular offset and repeating the ray projection to account for imprecision in camera mounting or environmental factors. In some implementations, the method can include aggregating the intersection points from multiple perturbed directions to define a lower boundary and an upper boundary of the range of distances. For example, the method can include determining that a first ray intersects a hill at a distance of three kilometers and a second ray, offset by a small angle, intersects a valley at a distance of ten kilometers, such that the range of distances is defined as three to ten kilometers. For example, the method can include using the digital elevation model to simulate the view from the image capture device and calculate the distance to a region of interest by tracing rays at both the original and perturbed angles.

A method can include identifying topography data of a geographical area for use in a digital elevation model. The topography data can include a plurality of elevation values associated with a plurality of geographical coordinates within the geographical area. The method can further include generating the digital elevation model based on the topography data. For example, the method can include retrieving elevation data from a public dataset, such as a government-provided digital elevation map, and constructing a three-dimensional representation of the terrain surrounding an observation station.

The method can include perturbing at least one of a bearing angle or an elevation angle by a predetermined set of offsets to determine a portion of the geographical area. The method can further include determining a range of distances from an image capture device to the portion of the geographical area using the digital elevation model. For example, the method can include offsetting the bearing angle by plus or minus 1 or 2 degrees to account for mounting imprecision and then projecting rays from the image capture device through the digital elevation model at each offset angle to identify intersection points with the terrain, thereby establishing a range of possible incident locations.

The method can include determining, using the topography of the digital elevation model, a lower boundary and an upper boundary of the range of distances from the location of the image capture device to the portion of the geographical area comprising the location of the incident. The method can further include generating a probability region for the range of distances based on an uncertainty in at least one of: coordinate values of the digital elevation model, measurement of the bearing angle, or an offset to the image capture device, and generating, for presentation via a graphical user interface, an indicator indicative of the probability region. The method can also include generating a confidence metric based on at least one of: a resolution of the digital elevation model, a resolution of the bearing angle, or a resolution of an elevation angle. For example, the method can include calculating a confidence score that reflects the likelihood that the actual incident location falls within the determined range, where the score is based on the granularity of the elevation data and the precision of the angle measurements.

The method 1700 can include providing indicator of distance range (STEP 1725). The method can include providing, for presentation, an indicator indicative of the range of distances from the location of the image capture device to the portion of the geographical area. In some implementations, the indicator can be presented as a shaded, colored, dashed or otherwise marked region on a map that visually represents the estimated area in which the incident is located. In some implementations, the indicator can be displayed as a numerical range of distances, such as a lower boundary and an upper boundary, or a direction along which the incident can be found. In some implementations, the indicator can include a particular width of an area (e.g., perpendicular to a direction from the observation station) to communicate the width or extent and area of the incident location, relative to the image capture device location.

The method can include receiving the request from a remote device. The method can include providing, responsive to the request the indicator for presentation via a graphical user interface of the remote device. In some implementations, the request can include a specification of a region of interest or a time interval for which incident data is desired. In some implementations, the indicator can be presented as a graphical overlay on a panoramic image or as a highlighted region on a map display. For example, the graphical user interface can display a shaded area indicating a calculated distance range to an incident location. For example, the graphical user interface can present a numerical value representing the lower and upper boundaries of the estimated distance range.

The method can include generating a panoramic composite image reconstructed from the plurality of images for presentation via a graphical user interface; and overlay the indicator on the panoramic composite image. For instance, the method can include generating a map corresponding to at least the portion of the geographical area for presentation via a graphical user interface and overlay the indicator on the map. The method can include displaying the indicator as a shaded region on the panoramic composite image to visually represent a calculated distance range to an incident. The method can include rendering the indicator as a polygonal area on the map to denote a field of view or a potential incident area as referenced with respect to the location of the camera station. The method can include providing, for presentation via a graphical user interface, the indicator indicative of the width. For example, the method can generate, for presentation via a graphical user interface, an indicator indicative of the lower boundary of the range of distances and the upper boundary of the range of distances (e.g., along the length of the direction from the station) and an indicator of the width along the range between the lower and upper boundaries.

The method can include generating a data structure comprising at least one of: the indicator, the range of distances, the bearing angle, the elevation angle, and an identifier for the image capture device. The method can include storing, in a data repository, the data structure corresponding to a timestamp. The method can include generating a confidence metric based on at least one of: a resolution of the digital elevation model, a resolution of the bearing angle, or a resolution of an elevation angle; and present the confidence metric together with the indicator for presentation via a graphical user interface.

Referring back to FIG. 14, the technical solutions described herein can use image capture devices to collect visual data of geographical areas for incident detection and monitoring. While the system can utilize a single-mode imaging, such as visible spectrum or infrared, to observe environmental conditions or detect incidents, such as fires, sometimes it can be technically challenging to detect or classify an incident using only one imaging mode, as certain incident features may be more apparent in one spectral range than another. For example, smoke may be more visible in a visible spectrum image, while flames may be more apparent in an infrared image. In such scenarios, a single camera station may be required to provide incident detection and classification without the benefit of multiple imaging devices or real-time triangulation from multiple stations. Lacking the ability to generate a comprehensive representation of an incident using multi-modal data captured at the same location and within a short time interval, can limit the accuracy of incident detection and classification.

The techniques described herein can address such challenges by providing a system and method for incident detection at an observation station using multi-mode image capture. In some implementations, the techniques described herein can include receiving an indicator of a location of an incident in a geographical area surrounding an observation station. In some implementations, the techniques described herein can cause, responsive to the indicator, one or more image capture devices located at the observation station to rotate about an axis and capture, within a predetermined time interval, a first image of the location of the incident in accordance with a visible mode of operation and a second image of the location of the incident in accordance with an infrared mode of operation. In some implementations, the first image can include a visible spectral range characteristic of the incident, and the second image can include an infrared spectral range characteristic of the incident. In some implementations, the techniques described herein can generate, based on inputting the first image and the second image into an artificial intelligence model trained on incident image enhancement using images captured according to the visible mode of operation and the infrared mode of operation, a multi-mode image of the location of the incident. In some implementations, the multi-mode image can include the visible spectral range characteristic combined with the infrared spectral range characteristic of the incident, such that both smoke and flame features can be represented in a single image for further analysis or presentation.

By virtue of the implementation of the techniques described herein, a system configured for incident detection at an observation station utilizing multi-mode image capture can reduce computing processor and memory consumption. For example, the system can receive an indicator of a location of an incident, cause one or more image capture devices to capture a first image in a visible mode and a second image in an infrared mode within a predetermined time interval, and generate a multi-mode image using an artificial intelligence model trained on incident image enhancement. By processing only two temporally proximate images per incident location and fusing them into a single multi-mode image for downstream analysis, the system can avoid the need for storing and processing large volumes of redundant or continuous image data across multiple modes. As a result, processor cycles and memory allocations can be conserved, allowing the system to operate efficiently while supporting enhanced incident detection capabilities.

In some examples, a system implementing multi-mode image capture at an observation station can reduce network communication demands during incident detection and response. For example, the system can generate a multi-mode image by combining a visible mode image and an infrared mode image locally at the observation station and transmit only the resulting fused image or a summary indicator to a remote computing device for further analysis or presentation. By transmitting a single enhanced image or a concise indicator rather than streaming separate high-bandwidth visible and infrared image feeds, the system can limit network traffic and reduce bandwidth consumption. As a result, the system can support scalable deployment in bandwidth-constrained environments and allow reliable incident monitoring with minimal network overhead.

In at least some examples, a system configured for multi-mode image capture can improve accuracy in incident detection and classification compared to systems relying on single-mode imaging. For example, the system can generate a multi-mode image by inputting both a visible mode image and an infrared mode image into an artificial intelligence model trained to enhance incident features, such as smoke and flames, using both spectral ranges. By combining visible spectral range characteristics and infrared spectral range characteristics in a single fused image, the system can allow detection of incident features that are not apparent in only one mode, reducing missed detections and false positives. As a result, the system can provide more reliable and accurate incident identification and classification from a single observation station.

Figure 18:
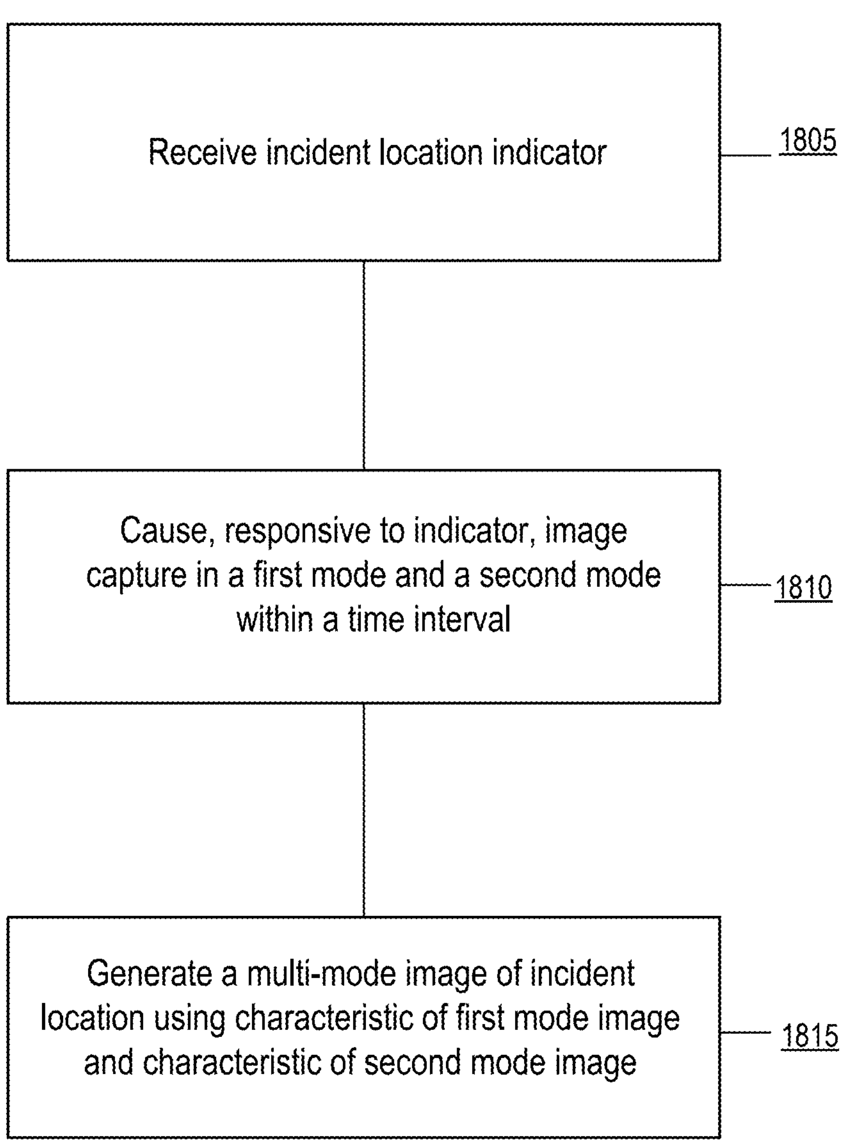
FIG. 18 is a flow chart illustrating a method for generating a multi-mode image of an incident location using image capture in different modes within a time interval, in accordance with one or more implementations.

Referring now to FIG. 18, depicted is a flow chart illustrating a method 1800 for generating a multi-mode image of an incident location using image capture in different modes within a time interval. The method 1800 can be executed, performed, or otherwise carried out by any of the computing systems or devices described herein. In brief overview of the method 1800, the method 1800 can include receiving an incident location indicator (STEP 1805), causing, responsive to the indicator, image capture in a first mode and a second mode within a time interval (STEP 1810), and generating a multi-mode image of the incident location using characteristics of the first mode image and characteristics of the second mode image (STEP 1815).

The method 1800 can include receiving an incident location indicator (STEP 1805). The method can include receiving an indicator of a location of an incident in a geographical area surrounding an observation station. In some implementations, the indicator can be received from a user interface of a remote computing device or can be generated automatically by an incident detection module based on image analysis. The indicator can specify a location of interest by providing coordinates, a region selection within a panoramic image, or a marker placed at a suspected incident site. In some implementations, the indicator can be associated with a timestamp or a time interval to specify when the incident was observed or detected. The method can include receiving the indicator as part of a request from an operator, an automated alerting system, or a data processing pipeline that monitors incoming sensor data. In some implementations, the indicator can be used to initiate further image capture, analysis, or response actions within the observation station or at a remote processing center.

The data processing system 1402 can use a multi-mode image generated by the multi-mode imager 1446 to initiate an incident response action. The incident response action can include at least one of: generating an alert for transmission to a remote device, generating a notification for presentation in a graphical user interface of the client device 1418, or generating a message for an external emergency response system to provide data on the incident. In some implementations, the data processing system 1402 can transmit an alert to a remote device in response to detection of an incident in the multi-mode image. In some implementations, the data processing system 1402 can present a notification in the user interface 1450 of the client device 1418 to indicate the presence of an incident. In some implementations, the data processing system 1402 can generate and transmit a message to an external emergency response system, where the message can include data derived from the multi-mode image, such as a location of the incident or a confidence score associated with the detection.

The method 1800 can include causing, responsive to the indicator, image capture in a first mode and a second mode within a time interval (STEP 1810). For example, the method can include the image capture device manager causing, responsive to the indicator, one or more image capture devices located at the observation station to rotate about an axis and capture within a predetermined time interval, a first image of the location of the incident in accordance with a visible mode of operation and a second image of the location of the incident in accordance with an infrared mode of operation. The first image can include a visible spectral range characteristic of the incident and the second image can include an infrared spectral range characteristic of the incident. In some implementations, the method can include transmitting a command from the image capture device manager to the image capture devices to initiate image acquisition in both modes.

The method can include selecting the predetermined time interval to be less than 1, 2, 3, 5, 10, 15 or 30 seconds within which to capture or provide the first image and the second image of the substantially the same scene (e.g., by directing the cameras for both the image modes to the same direction). For instance, the method can include configuring the image capture devices to operate in a first mode (e.g., a visible mode) by adjusting sensor parameters or filter settings and then subsequently switching to a second mode (e.g., the infrared mode) by modifying the operational mode of the same image capture devices (e.g., applying or adjusting a setting, selecting a different camera or a different filter setting to use). The method can include associating metadata with each captured image, where the metadata can include a timestamp, a mode identifier, or a location identifier.

The method can include storing the first image and the second image in a data repository for subsequent processing or analysis. In some implementations, the method can include providing the first image and the second image as input to a machine learning model configured to process multi-modal image data. The method can include generating a composite image or a fused representation that combines information from both the visible spectral range characteristic and the infrared spectral range characteristic. The method can include presenting the first image, the second image, or the composite image to a user via a graphical user interface for incident review or further action.

The method 1800 can include generating a multi-mode image of the incident location using characteristics of the first mode image and characteristics of the second mode image (STEP 1815). The method can include generating a multi-mode image of the location of the incident. The multi-mode image can be generated based on inputting the first image and the second image into an artificial intelligence model trained on incident image enhancement using images captured according to the visible mode of operation and the infrared mode of operation. The artificial intelligence model utilized in generating the multi-modal image can include a neural network trained using paired visible mode and infrared mode images of incidents labeled with ground truth incident data from one or more geographical areas surrounding one or more observation stations. The multi-mode image can include the visible spectral range characteristic combined with the infrared spectral range characteristic of the incident. The multi-mode image can include a fused digital image combining pixel information of all modal characteristics from all image modes utilized, including for example pixel information of the visible spectral range characteristic corresponding to a smoke at the location of the incident and pixel information of the infrared spectral range characteristic of a flame at the location of the incident. In some implementations, the method can include receiving the first image and the second image from an image capture device that is configured to operate in both visible and infrared modes. The method can include associating metadata with each of the first image and the second image, where the metadata can identify a modality, a timestamp, a field of view, or a geo-location coordinate of the incident or the observation station.

The method can include adjusting a weighting of the visible spectral range characteristic and the infrared spectral range characteristic in the multi-mode image according to ambient lighting conditions. For instance, the method can include the selectively adjusting a weighting of the visible spectral range characteristic and the infrared spectral range characteristic in the multi-mode image according to ambient lighting impacting the observation station. The method can include generating a fused digital image that combines pixel information of the visible spectral range characteristic corresponding to a smoke at the location of the incident with pixel information of the infrared spectral range characteristic of a flame at the location of the incident. In some implementations, the method can include generating a confidence score that reflects a likelihood that the multi-mode image depicts an incident, where the confidence score can be determined based on analysis of both the visible spectral range characteristic and the infrared spectral range characteristic. The method can include storing the multi-mode image in association with geo-location data of the incident and a timestamp. In some implementations, the method can include transmitting the multi-mode image to a remote computing device configured to perform automated incident classification or to initiate an incident response action, such as generating an alert, a notification, or a message for an external emergency response system.

The method can include generating, for each of the first image and the second image, a metadata identifying at least one of: a modality of the respective image, a timestamp, an identifier of an image capture device of the one or more image capture devices, and a field of view, the metadata further identifies one or more geo-location coordinates of one or more of: a location of the incident or a location of observation station. The method can include generating a confidence score reflecting a likelihood that the multi-mode image depicts an incident, the confidence score determined based on analysis of both the visible spectral range characteristic and the infrared spectral range characteristic. The method can include storing the multi-mode image in association with geo-location data of the incident and a timestamp associated with the multi-mode image. The method can include transmitting the multi-mode image to a remote computing device configured to perform automated incident classification.

F. Systems and Methods for Providing Angular Calibration for Panoramic Composite Image Generation and Geographic Information Based Zoomed Images Monitoring and assessment of real-world environments using image data from fixed observation stations can present technical challenges related to spatial accuracy and consistency. In some implementations, observation stations can include one or more cameras configured to capture a series of constituent images at different angles, such that the constituent images can be used to generate panoramic composite images of the surrounding terrain. In some implementations, the cameras can be mounted in fixed orientations and can acquire images at regular intervals. Geographic information systems and digital elevation models can be used in conjunction with the captured images to provide spatial context for the observed scenes. Conventional approaches can rely on physical alignment of cameras or feature matching algorithms to combine constituent images, but such approaches can be limited by persistent misalignments, environmental factors, and unreliable feature detection, particularly under low-light conditions or in scenes lacking distinct features. In some implementations, these limitations can introduce errors in the mapping between image coordinates and real-world locations, such that the resulting composite images can lack consistent angular references and spatial fidelity.

The techniques described herein can address the alignment and consistency challenges in constituent image-based composite image generation by introducing angle calibrations and digital corrections to account for differences between the axis of rotation of an image capture device and a reference axis. In some implementations, the techniques described herein can store calibration offsets for each angle around a full rotational loop, such that physical misalignments, including tilt and roll, can be digitally corrected during the image stitching process. In some implementations, the techniques described herein can avoid reliance on feature matching algorithms for routine stitching, such that angular accuracy and temporal consistency can be preserved in the generated composite images. In some implementations, the techniques described herein can include storing calibration data and offsets in a data repository, applying transformation matrices to constituent images based on the corresponding offsets, and generating composite images using the digitally corrected constituent images. In some implementations, the techniques described herein can support independent alignment of multi-spectral image data and can provide composite images for presentation in a graphical user interface or for storage in a data structure.

By virtue of the implementation of the techniques described herein, a system for generating a panoramic composite image can reduce computing processor and memory consumption. For example, the system can identify a plurality of constituent images captured by an image capture device rotated about an axis of rotation, determine offsets for each constituent image based on a difference between the axis of rotation and a reference axis, and align the constituent images using the respective offsets to generate a composite image. By storing calibration offsets and applying digital corrections during the alignment process, the system can avoid repeated computationally intensive feature matching operations and minimize redundant recalibration, thereby reducing processor cycles and memory allocations. As a result, the system can achieve efficient panoramic image generation with lower resource utilization compared to conventional systems that rely on continuous feature analysis and manual adjustments.

In some examples, a system configured as described can reduce network communication between components involved in panoramic image generation and storage. For example, the system can store calibration data and offsets locally in a data repository and use these stored values to align constituent images, rather than transmitting large volumes of raw image data or recalibration instructions across a network for each composite image generation event. By leveraging precomputed and stored calibration information, the system can minimize the frequency and volume of data exchanged between the image capture device, processing server, and storage infrastructure. As a result, network bandwidth consumption can be reduced, allowing for more scalable and responsive image processing operations.

In at least some examples, a system implementing the described techniques can improve accuracy in panoramic image generation when compared to other systems. For example, the system can determine and apply specific offsets for each constituent image based on the physical mounting and orientation of the image capture device, including roll and tilt, and use these offsets to digitally correct misalignments during the stitching process. By relying on stored calibration data rather than feature matching algorithms, the system can maintain consistent angular references and spatial alignment across composite images, regardless of environmental conditions or lighting. As a result, the system can generate panoramic images with higher spatial fidelity and temporal consistency, supporting more reliable incident location and monitoring applications.

Figure 19:
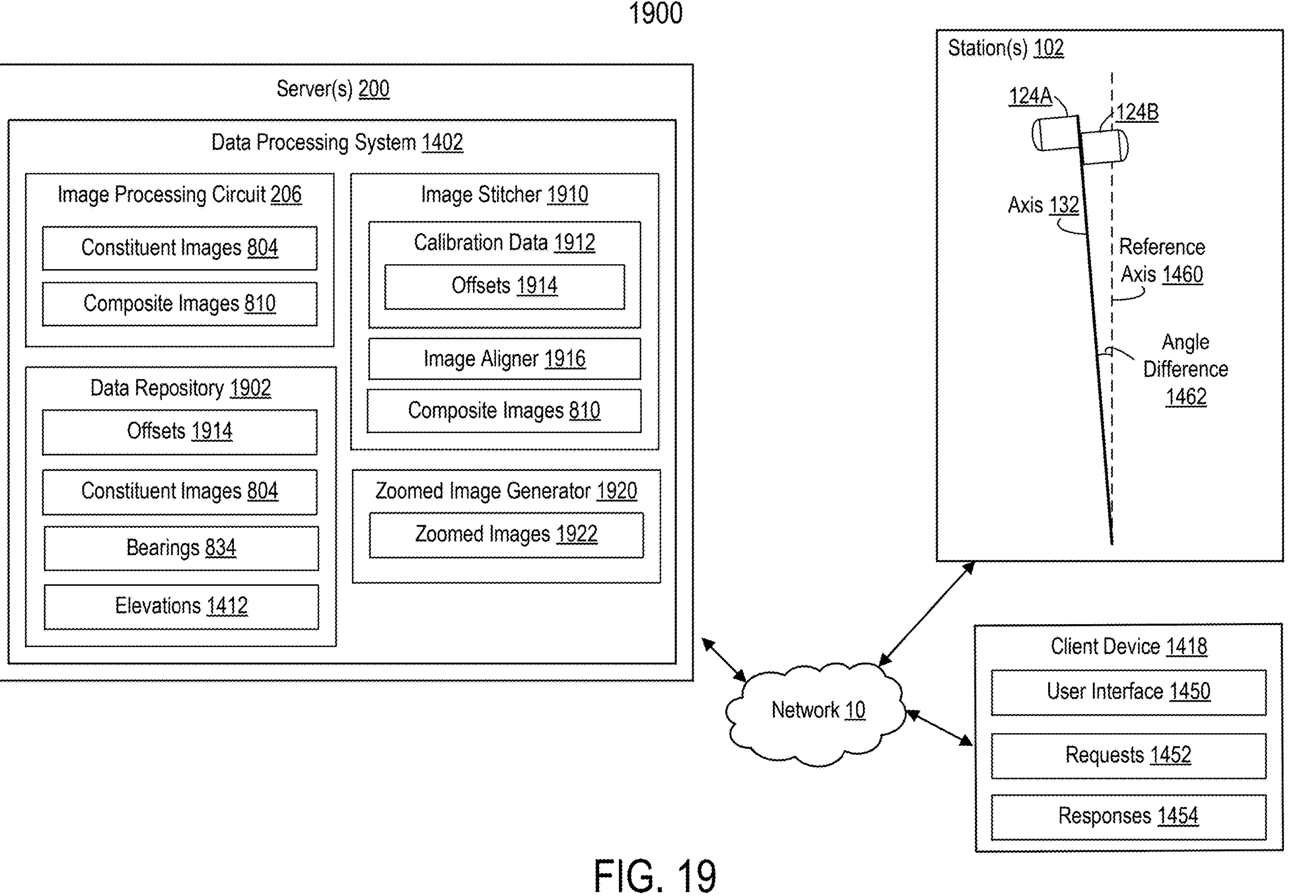
FIG. 19 is a block diagram of an example system for generating composite images using angular offset calibrations of constituent images and facilitating or generating zoomed images using angular offset calibrations, in accordance with one or more implementations.

Referring now to FIG. 19, illustrated is a block diagram of an example system 1900 for generating composite images using angular offset calibrations of constituent images and for generating zoomed images using angular offset calibrations, in accordance with one or more implementations. The system 1900 can include at least one station 102 that can include one or more image capture devices (e.g., cameras) 124A, 124B that can be mounted so as to rotate about at least one axis 132 or axis 130, which can be offset from a reference angle 1460 by an angle difference 1462. The example system 1900 can include at least one client device 1418 and at least one server 200 communicating with the station 102 via at least one network 10. The client device 1418 can include at least one user interface 1450 for communicating requests 1452 to a data processing system 1402 of the server 200 and receiving responses 1454 from the server 200. The data processing system 1402 can include at least one image processing circuit 206, at least one data repository 1902, at least one image stitcher 1910 and at least one zoomed image generator 1920. The image processing circuit 206 of the data processing system 1402 can include, access, process or manage constituent images 804 for generating composite (e.g., panoramic) images 810. The data repository 1902 of the data processing system 1402 can store and provide access to one or more constituent images 810 and their corresponding bearings 834 and elevations 1412. The data repository 1902 can store and provide access to one or more offsets 1914 (e.g., angular offsets or constituent image offsets for more accurate generation of composite images). The image stitcher 1910 of the data processing system 1402 can include, operate or store one or more calibration data 1912 that can include, utilize or be based on offsets 1914, as well as at least one image aligner 1916 that can align or adjust composite images 810 based on calibration data 1912. The zoomed image generator 1920 of the data processing system 1402 can generate or process zoomed images 1922 utilizing calibration data 1912 or offsets 1914, to provide responses 1454 to client device requests 1452.

In some implementations, the system can perform calibration of axis 132 independently from its calibration to reference axis 1460. Axis 132 can include a rotation axis of a mounting assembly used to capture a sequence of constituent images for panoramic stitching. Axis 132 can have its own alignment characteristics and can be subject to mechanical tolerances, tilt, or other deviations that differ from those of a camera's optical axis. Independent calibration of axis 132 can include measuring or estimating any angular offsets, lateral offsets, or longitudinal offsets of axis 132 relative to a desired geometric positioning, and storing these values for subsequent use. Such calibration can be used when multiple image capture devices are mounted relative to axis 132, as corrections applied at the axis level can improve consistency for all devices without relying on corresponding changes to each camera's individual optical axis calibration. For instance, offsets determined for axis 132 can be combined with offsets between axis 132 and reference axis 1460 during composite image alignment, or applied separately depending on stitching requirements.

The station 102 can be configured as a fixed observation station, physically installed at a location and including one or more cameras mounted to capture images of a surrounding area or environment. The station 102 can be arranged to capture images at various angles. The station 102 can include mounting hardware for orienting the one or more cameras to predetermined positions. The station 102 can be configured to capture panoramic images of surrounding terrain. The station 102 can be used for panoramic image capture or incident monitoring. The station 102 can be calibrated manually for each camera, or for multiple cameras at the same station, to account for individual mounting differences. The station 102 can be used to identify a plurality of constituent images captured by an image capture device rotated about an axis of rotation of the image capture device, where each constituent image corresponds to a respective range of angles about the axis.

Image capture devices or cameras 124A or 124B can be image capture devices mounted at the station 102. The cameras 124A or 124B can be configured to acquire constituent images. In some implementations, the cameras 124A or 124B can include visible spectrum cameras, infrared cameras, or cameras that can operate in both visible and infrared spectral modes. The cameras 124A or 124B can be controlled to capture constituent images at different angles or in different spectral modes. In some implementations, the cameras 124A or 124B can be triggered to capture images at specified intervals or at specific angular increments, for example, every 36 degrees around a 360 degree rotation. In some implementations, the cameras 124A or 124B can be configured to switch between spectral modes, such that an image in a first spectral range, for example, an RGB image, and an image in a second spectral range, for example, an infrared image, can be captured in rapid succession using the same camera hardware. The constituent images acquired by the cameras 124A or 124B can be used for subsequent processing, including the generation of composite images or the analysis of multi-mode image data.

The system 1900 can include at least one axis 132 about which individual cameras 124A or 124B can rotate, or an axis 130 about which multiple cameras 124A and 124B can rotate. The axis 132 can be a physical or virtual axis about which the cameras 124A or 124B are rotated or oriented for image capture. For example, the axis 132 can correspond to a vertical axis of a camera pole. The axis 132 can define a reference for capturing images at different angles and for aligning images during image stitching. In some implementations, the axis 132 can be used as a basis for calculating angular offsets and for calibrating camera orientation. The axis 132 can be compared to a reference axis 1460 to determine misalignment. In some implementations, a calibration process can adjust the angles for each camera 124A or 124B based on physical mounting and orientation, including roll and tilt, to provide accurate distance determination.

The reference axis 1460 can be a theoretical or a physical axis used for calibration, alignment or adjustment of constituent images. The reference axis 1460 can be perpendicular to the ground plane at a deployment site (e.g., a perpendicular axis from a horizontal plane at the location of the image capture system). The reference axis 1460 can serve as a baseline for determining angular differences and calibration offsets for an axis of rotation of an individual image capture device (e.g., axis 132) or a plurality of image capture devices (e.g., 130). The system 1900 can compare the axis of rotation of a camera to the reference axis 1460 to compute corrections. The difference between the axis of rotation and the reference axis 1460 can be used to generate calibration data for digital alignment. In some implementations, calibration can include adjusting angles based on the physical mounting and orientation of cameras, such as roll or tilt, to provide precise measurements for fire location tracking or other spatial determinations.

The angle difference 1462 can represent a measured angular offset between an axis of a camera 124A or a camera 124B and a reference axis 1460. The angle difference 1462 can correspond to a tilt or roll offset measured in degrees. The system 1900 can use the angle difference 1462 to generate calibration offsets for image alignment or image stitching. In some implementations, the system 1900 can calculate the angle difference 1462 using sensor data, manual calibration, or image analysis. For example, in some implementations, the system 1900 can perform a manual review of the orientation of a camera 124A or a camera 124B with respect to known physical landmarks to determine roll or tilt. The system 1900 can use the angle difference 1462 to adjust the angles for each camera 124A or camera 124B based on physical mounting or orientation, including roll or tilt, to provide accurate distance determination.

The network 10 can be a communication network configured to transmit data between at least one station 102, at least one server 200, and at least one client device 1418. The network 10 can include the Internet, a cellular network, a private wireless network, or any combination thereof. The network 10 can enable transmission of image data, calibration information, requests, or responses between the station 102, the server 200, and the client device 1418. In some implementations, the network 10 can transmit a request from the client device 1418 for a zoomed image to the server 200.

For instance, the request can be for a zoomed image based on geographic information system (GIS) data. In some implementations, the network 10 can transmit calibration data or image data between the station 102 and the server 200. In some implementations, the network 10 can transmit a response from the server 200 to the client device 1418, where the response can include a zoomed image for presentation via a graphical user interface 1450 of the client device 1418.

The system 1900 can include at least one client device 1418. The client device 1418 can be a user-operated computing device configured to interact with the system 1900 through a user interface 1450. The client device 1418 can include, for example, a desktop computer, a tablet, or a mobile phone. The client device 1418 can send requests 1452 to the server 200 over the network 10. The client device 1418 can receive responses 1454 from the server 200, where the responses 1454 can include composite images 810 or zoomed images 1922. In some implementations, the client device 1418 can display the composite images 810 or the zoomed images 1922 for presentation in the user interface 1450. In some implementations, the client device 1418 can display a zoomed image 1922 of a reported incident location based on a request 1452. The client device 1418 can communicate with the server 200 over the network 10 and can present images or information to a user.

The system 1900 can include at least one user interface 1450. The user interface 1450 can be a graphical user interface component configured to present images or receive user input. The user interface 1450 can provide a display of composite images or zoomed images generated by the system 1900. The zoomed image can be generated based on, or using, geographic information system (GIS) data. For instance, the GIS data can include latitudinal information (e.g., latitude coordinates), longitudinal information (e.g., longitude coordinates) and elevation data, which can be translated (e.g., via look up table and/or using calibration data) into angles (e.g., bearing angles and elevation) of the camera (e.g., image capture device), given the location of the camera (e.g. location of the observation station).

In some implementations, the user interface 1450 can present a web-based dashboard for incident monitoring. The user interface 1450 can enable a user to interact with the system 1900, view images, or submit requests for image retrieval or analysis. In some implementations, the user interface 1450 can provide a mechanism for a user to place a marker or specify coordinates within a displayed panorama. The user interface 1450 can receive a user-placed or artificial intelligence-placed marker at the base of a fire in a panorama and convert the marker location into polar coordinates, such as azimuth and elevation bearings, using a marker to angle process. The user interface 1450 can provide the composite image or the zoomed image for presentation in response to a user request.

The user interface 1450 at the client device 1418 can be used to generate one or more requests 1452. The requests 1452 can include a request for a zoomed image or a request for incident location data. The requests 1452 can include a time indication and a location within a view range of an observation station 102. The requests 1452 can be transmitted from the client device 1418 to the server 200 over the network 10. The requests 1452 can cause the data processing system 1402 to perform image retrieval operations. The data processing system 1402 can use any offsets or calibration data to regenerate requested images or to perform any analysis to generate a response 1454 to the request 1452. In some implementations, the requests 1452 can be zoom requests that cause the zoomed image generator 1920 to generate a zoomed image of a particular incident location based on location information, such as a geographic coordinate, included in or referenced by the request 1452. In some implementations, the server 200 can receive the request 1452 from a remote device, such as the client device 1418, via the network 10.

The data processing system 1402 can generate responses 1454 by using the zoomed image generator 1920 to generate one or more zoomed images 1922 in response to requests 1452 received from the client device 1418. The responses 1454 can include one or more zoomed images 1922 or one or more composite images 810 that are transmitted to the client device 1418. The data processing system 1402 can package and transmit the responses 1454 over the network 10 to the client device 1418. In some implementations, the responses 1454 can include a digitally zoomed image 1922 corresponding to a specified coordinate or location provided in the request 1452. In some implementations, the data processing system 1402 can provide the zoomed image 1922 for presentation via the user interface 1450 of the client device 1418.

As discussed earlier, the server 200 can be a computing device or a computing system configured to process image data, manage calibration data, or generate responses to requests. The server 200 can execute one or more software modules for image alignment, calibration, or data management. The server 200 can perform image stitching operations by aligning constituent images based on stored calibration offsets. The server 200 can generate composite images using angular offset calibrations of constituent images. In some implementations, the server 200 can generate a zoomed image of a portion of a constituent image based on a bearing angle and an elevation angle. The server 200 can store calibration files and can apply stored calibration offsets to images captured at any time, including during day or night, such that consistency is maintained in image alignment and processing.

The data processing system 1402 can execute image processing tasks, data management operations, or calibration procedures. The data processing system 1402 can include one or more processors coupled with memory. The data processing system 1402 can manage the flow of image data between the image processing circuit 1406, the data repository 1902, and functional modules such as the image stitcher 1910, the image aligner 1916, or the zoomed image generator 1920. The data processing system 1402 can invoke the image stitcher 1910 to generate composite images 810 from constituent images 804. The data processing system 1402 can apply calibration data 1912 or offsets 1914 during the alignment of constituent images 804. In some implementations, the data processing system 1402 can store calibration offsets in the data repository 1902 and can apply digital corrections during the alignment process. The data processing system 1402 can avoid repeated feature matching operations by using stored calibration data 1912. The data processing system 1402 can coordinate user interaction by receiving requests 1452 from the client device 1418 and providing responses 1454, which can include composite images 810 or zoomed images 1922.

The image processing circuit 1406 can be implemented as hardware, software, or a combination of hardware and software. The image processing circuit 1406 can process constituent images 804 and composite images 810. The image processing circuit 1406 can perform operations to align, combine, or otherwise process constituent images 804 to generate composite images 810 for panoramic or zoomed views. In some implementations, the image processing circuit 1406 can apply transformation matrices to constituent images 804. The image processing circuit 1406 can use calibration offsets stored in a data repository 1902 to digitally correct misalignments in the constituent images 804. In some implementations, the image processing circuit 1406 can generate a composite image 810 by aligning each constituent image 804 using a respective offset corresponding to a difference between an axis of rotation and a reference axis. The image processing circuit 1406 can store the generated composite image 810 in one or more data structures. In some implementations, the image processing circuit 1406 can be implemented as a GPU-accelerated module for image alignment and stitching.

The constituent images 804 can be individual images captured by the cameras 124A or the cameras 124B at different angles or at different times. In some implementations, the constituent images 804 can be captured at regular angular intervals, for example, every 36 degrees around a 360 degree rotation of the cameras 124A or the cameras 124B about the axis 132. The constituent images 804 can serve as source data for generating composite images 810. The constituent images 804 can be captured, stored, or processed by the system 1900 for alignment or stitching. In some implementations, the constituent images 804 can be stored in the data repository 1902. The image stitcher 1910 can access the constituent images 804 from the data repository 1902 for use in generating the composite images 810.

The composite images 810 can be panoramic images generated by stitching together constituent images 804. In some implementations, the composite images 810 can include a panoramic image representing a 360 degree view of a monitored environment. The composite images 810 can be generated by the image stitcher 1910 or the image aligner 1916 using calibration data 1912 and offsets 1914. The image aligner 1916 can apply angular corrections to the constituent images 804 before stitching. The calibration data 1912 can include offsets for each angle around a rotational loop, such that the image aligner 1916 can correct for physical misalignments of the cameras 124A or 124B. The image stitcher 1910 can align, using the respective offset for each respective constituent image 804, the plurality of constituent images 804 to generate a composite image 810. The composite image 810 can be stored in one or more data structures, for example, in the data repository 1902. In some implementations, the composite images 810 can be used for incident detection or monitoring.

The system 1900 can include at least one data repository 1902. The data repository 1902 can store image data, calibration data, or offsets. In some implementations, the data repository 1902 can include a database or a file system that can store image files or calibration files. The data repository 1902 can store, for each respective range of angles corresponding to each constituent image, an offset. The data repository 1902 can manage access to image data or calibration data for processing or retrieval by other components of the system 1900. In some implementations, the data repository 1902 can organize offsets or calibration files by camera or by angle. The data repository 1902 can store calibration offsets that can be applied to images captured at any time, including during day or night, such that consistency can be maintained in image alignment or processing.

The system 1900 can include at least one image stitcher 1910. The image stitcher 1910 can generate a composite image (e.g., a panorama) 810 by combining a plurality of constituent images. The image stitcher 1910 can include any features or functionalities of the image processing circuit 206 and vice versa. The image stitcher 1910 can identify a plurality of constituent images 804 captured by an image capture device 124 rotated about an axis of rotation (e.g., 130 or 132), where each constituent image 804 corresponds to a respective range of bearing angles 834 about the rotational axis. The image stitcher 1910 can identify, for each constituent image 804, an offset 1914 caused by a difference between the axis of rotation and a reference axis (e.g., the angle difference 1462). The image stitcher 1910 can utilize the image aligner 1916 to align, using the respective offset 1914 for each respective constituent image 804 corresponding to a respective range of angles, the plurality of constituent images 804 to generate the composite image 810 (e.g., a panorama).

The image stitcher 1910 can determine, for each constituent image 804, the offset based on the respective difference between the axis of rotation and the reference axis for the respective range of angles corresponding to the constituent image. The image stitcher 1910 can store, in a data repository, the offset 1914 for each respective bearing range of angles (e.g., 834 angles) corresponding to each constituent image 804. In some implementations, the image stitcher 1910 can determine that the plurality of constituent images 804 are to be used to generate the composite image 810 and can obtain, responsive to the determination, the respective offsets 1914 for each constituent image. The offsets 1914 can include at least one of an angular adjustment corresponding to an angular rotation of the respective constituent image 804, a lateral adjustment corresponding to a lateral shift of the respective constituent image 804, or a longitudinal adjustment corresponding to a longitudinal shift of the respective constituent image 804. The image stitcher 1910 can align, reposition, or adjust any constituent image according to at least one of the angular adjustment, the lateral adjustment, or the longitudinal adjustment for the constituent image to be used to generate the composite image 810.

The image stitcher 1910 can combine each constituent image 804 with at least one other constituent image to generate the composite image 810 that includes a combined range of angles covering at least a portion of each respective range of angles of the respective composite image 810 about the axis of rotation (e.g., 130 or 132). The combined range of angles of the composite image 810 can correspond to at least 180 degrees about the axis of rotation. Each constituent image 804 can be associated with metadata including at least one of: an identifier of the image capture device, an angular adjustment of the offset, a lateral adjustment of the offset, a longitudinal adjustment of the offset, a timestamp of constituent image capture, or a calibration status indicator. The image stitcher 1910 can adjust the offset 1914 of a constituent image 804 based on a comparison of an alignment of one or more physical features within the respective constituent image within the generated composite image with a known landmark. The image stitcher 1910 can determine that an update to calibration for one or more offsets 1914 is due and can generate, responsive to the determination, at least one updated or modified offset 1914 for at least one constituent image 804 based on the respective difference between the axis of rotation and the reference axis 1462 for the respective range of angles for the constituent image 804.

The image stitcher 1910 can utilize the image aligner 1916 to apply, to each constituent image based on the corresponding offset 1914 for the respective constituent image, a transformation matrix to align the respective constituent image. The composite image 810 can include a first spectral mode image data captured in a first spectral range and a second spectral mode image data captured in a second spectral range, and alignment of the plurality of constituent images can be performed independently for the first spectral mode image data and for the second spectral mode image data. The image stitcher 1910 can provide, for presentation in a graphical user interface, the composite image that includes different modal characteristics 1444 of different image modes 1442 composed, formed or included in a multi-mode image generated using the multi-mode imager 1446.

The image aligner 1916 can apply calibration offsets to constituent images 804 for the image stitcher 1910 to form or construct composite images 810. The image aligner 1916 can align the constituent images 804 by applying a transformation matrix to each constituent image 804 based on a corresponding offset for the respective constituent image 804. The transformation matrix can include one or more operations to rotate or shift the constituent image 804. The image aligner 1916 can use calibration data 1912 and offsets 1914 to digitally correct for tilt, roll, or mounting differences of cameras 124A or 124B or image sensors. The image aligner 1916 can process each constituent image 804 independently to align the constituent images 804 for subsequent image stitching by the image stitcher 1910. The image aligner 1916 can operate in conjunction with the image processing circuit 1406 to apply the transformation matrix to each constituent image 804 prior to generating a composite image 810.

The system 1900 can include at least one calibration data 1912 and a module for generating, storing, updating or managing calibration data. The calibration data 1912 can include calibration information (e.g., offsets 1914), angular, spatial, rotational, longitudinal or latitudinal adjustments for one or more cameras or images. The calibration data 1912 can be stored in a database or other data structure for recording tilt, roll, or axis offsets for each camera or its constituent images. The calibration data 1912 can include calibration files generated during a manual calibration process or an automated calibration process. The calibration data 1912 can include parameters or values for correcting physical misalignments, including differences in camera mounting or orientation. The calibration data 1912 can include offsets caused by a difference between an axis of rotation and a reference axis for each camera. In some implementations, the calibration data 1912 can include calibration parameters generated by a calibration data module, based on periodic reviews or sensor feedback. The calibration data 1912 can include values maintained for each camera at a station, including for multiple cameras at the same station, to account for individual mounting differences.

The offsets 1914 can include stored or processed angular, lateral, or longitudinal offsets associated with one or more image capture devices. The offsets 1914 can include data organized in a table of offsets indexed by camera and angle. In some implementations, the offsets 1914 can include values or parameters of offsets corresponding to angles that account for imprecision in camera mounting or environmental factors. The offsets 1914 can include corrections for image alignment or incident location determination. In some implementations, the offsets 1914 can include an angular adjustment corresponding to an angular rotation of a constituent image, a lateral adjustment corresponding to a lateral shift of a constituent image, or a longitudinal adjustment corresponding to a longitudinal shift of a constituent image. The offsets 1914 can include offsets to the image aligner 1916 or the image stitcher 1910 for digital correction of images used to generate a panoramic (e.g., composite) image. In some implementations, the offsets 1914 can include offsets to be used during a calibration process and store the offsets for each angle. The offsets 1914 can include values for each angle around a rotational loop, including correction values corresponding to a correction angle amount and a direction (e.g., from the camera location) towards which to make the angular correction, which can be used to correct for physical misalignments and to provide accurate stitching of constituent images over all bearing angles.

The zoomed image generator 1920 can generate a zoomed image 1922 responsive to a request 1452. The generated zoomed image 1922 can be an image of a location or area specified in the request 1452. The zoomed image generator 1920 can generate the zoomed image 1922 using one or more composite images 810 or constituent images 804. The zoomed image generator 1920 can receive a request 1452 specifying a location, for example, including a latitude and longitude coordinates, a name of a mountain or a hill, a street or a neighborhood, a structure or a landmark or any other information defining or identifying an area, region or a location. The zoomed image generator 1920 can determine, based on geographical location of the incident location, a bearing angle and an elevation angle corresponding to the specified location from the standpoint of the station 102. In some instances, the zoomed image generator 1920 determines a range of bearing angles and a range of elevation angles, thereby defining an area within a constituent image 804 or composite image 810 (e.g., a rectangle portion within the image 804). The zoomed image generator 1920 can identify a region or a portion of a constituent image of interest, based on the bearing angle and the elevation angle or the bearing and elevation angle ranges.

The zoomed image generator 1920 can utilize the image capture device manager 1440 to capture a new zoomed in image of the requested location of potential incident. A zoomed in image generated by optically or digitally magnifying an image, such as digitally magnifying and cropping a portion of a larger original image or scene to provide a closer, more detailed view of a specific area or feature, or directing a camera towards a particular direction with an optical or digital zoom to capture a closer view of a location. For instance, the zoomed image generator 1920 can retrieve calibration data 1912 and use it to correct or account for one or more offsets 1914 associated with the constituent images 804 of particular camera locations (e.g., bearing angles directed to particular constituent images 804). The zoomed image generator 1920 and the image capture device manager 1440 can capture one or more images according to a predetermined zoom corresponding to the size of the zoomed in portion of the image determined from the bearing angle ranges and elevation angle ranges. The zoomed image 1922 generated by the zoomed image generator 1920 or by image capture device manager 1440 can be prepared as, or inserted into, a response 1454 to be transmitted to the requesting client device 1418.

In the instances in which the zoomed image generator 1920 generates the zoomed in image using digital zoom functionalities from previously captured images 804 or 810, the zoomed image generator 1920 can crop and scale the identified region of the constituent image to generate the zoomed image. The zoomed image generator 1920 can perform a digital zoom operation on a panoramic image 810 or a constituent image 804. In some implementations, the zoomed image generator 1920 can task an image capture device to acquire a new image at the specified coordinates to provide an optical zoom. The zoomed image generator 1920 can provide the generated zoomed image for presentation in a graphical user interface or for transmission to a client device.

The zoomed images 1922 can include digitally zoomed image portions that correspond to locations of interest determined from the request 1452. The zoomed images 1922 can include, for example, a digitally zoomed in portion of a constituent image 804 that was previously captured during a time interval identified by the request 1452. The digitally zoomed in portion can correspond to a particular direction from the station 102 that is associated with a region of interest identified in the constituent image 804. The zoomed image 1922 can include a zoomed in image of a region that was captured by directing a camera to a particular location or direction, such as a particular bearing and elevation range, and can account for calibration data 1912 and offsets 1914.

The zoomed image 1922 can be optically, digitally, or optically and digitally zoomed images that are generated by focusing the camera 124 on a specific region of a panorama or constituent image 804. For example, the zoomed image 1922 can include a close-up view of a reported fire location, which can be identified based on information in a received request 1452. The system 1900 can generate, from the constituent image 804 and based on the bearing angle and the elevation angle, a zoomed image 1922 of the portion of the constituent image 804 that corresponds to the location. The zoomed image 1922 can provide detailed visual information for incident response or infrastructure inspection. The system 1900 can generate and transmit the zoomed image 1922 to the client device 1418 for user review. The zoomed image 1922 can be displayed in the user interface 1450 for immediate assessment. The system 1900 can provide images of the specified coordinates for immediate assessment, either from stored panoramas or by directing the camera.

The bearings 834 can be angular measurements that indicate an azimuth direction relative to the station 102, which can be used to determine the direction of a location with respect to the station 102. The bearings 834 can be determined by the data processing system 1402 based on the placement of a marker in a composite image 810 or a constituent image 804, where the marker can be positioned by a user or by an artificial intelligence process. For instance, artificial intelligence models 1448 can be trained on the constituent images to identify locations or areas of interest based on information describing locations with respect to particular station 102 locations, such as information from various requests 1452. The artificial intelligence model 1448 can provide or output a range of bearing angles 834 and a range of elevation angles 1412 based on information on a desired location to image. The data processing system 1402 can convert the marker position into polar coordinates that include the bearings 834 and an elevation angle. The bearings 834 can be used to select a constituent image 804 that corresponds to a particular direction for further processing, such as generating a zoomed image 1922. The bearings 834 can be stored in the data repository 1902 and can be referenced when calculating offsets 1914 or when retrieving calibration data 1912. The bearings 834 can be determined using a marker to angle method, and the bearings 834 can also be used in reverse to calculate the angles from the station 102 to specified geographic coordinates. The bearings 834 can be used in the calculation of incident locations or in the identification of image regions for zooming or analysis.

Elevations 1412, also referred to as the elevation angles 1412, can be angular measurements that indicate an elevation angle corresponding to the vertical position of a location relative to the station 102, which can be calculated as part of a marker to angle process. The marker to angle process can convert a marker placed at a location in a panorama, such as the base of a fire, into polar coordinates that include an azimuth bearing and an elevation angle. The elevation angle can represent, for example, an angle of 3 degrees below the horizon. The elevations 1412 can be used in conjunction with bearings 834 to determine the position of an incident or feature within the field of view of the station 102. The system 1900 can retrieve, from calibration data in the data repository 1902, an offset for a constituent image 804 corresponding to a bearing angle about the axis 132 and an elevation angle indicative of a portion of the constituent image 804 corresponding to a location. The elevations 1412 can be calculated from a marker position or from geographic coordinates and can be used to identify a relevant image region. For example, the elevation angle can be used to determine a vertical crop for a zoomed image 1922. The system 1900 can use an angle to geo process that uses the azimuth and elevation bearings along with a digital elevation map to determine a range of possible locations for an incident.

Figure 20:
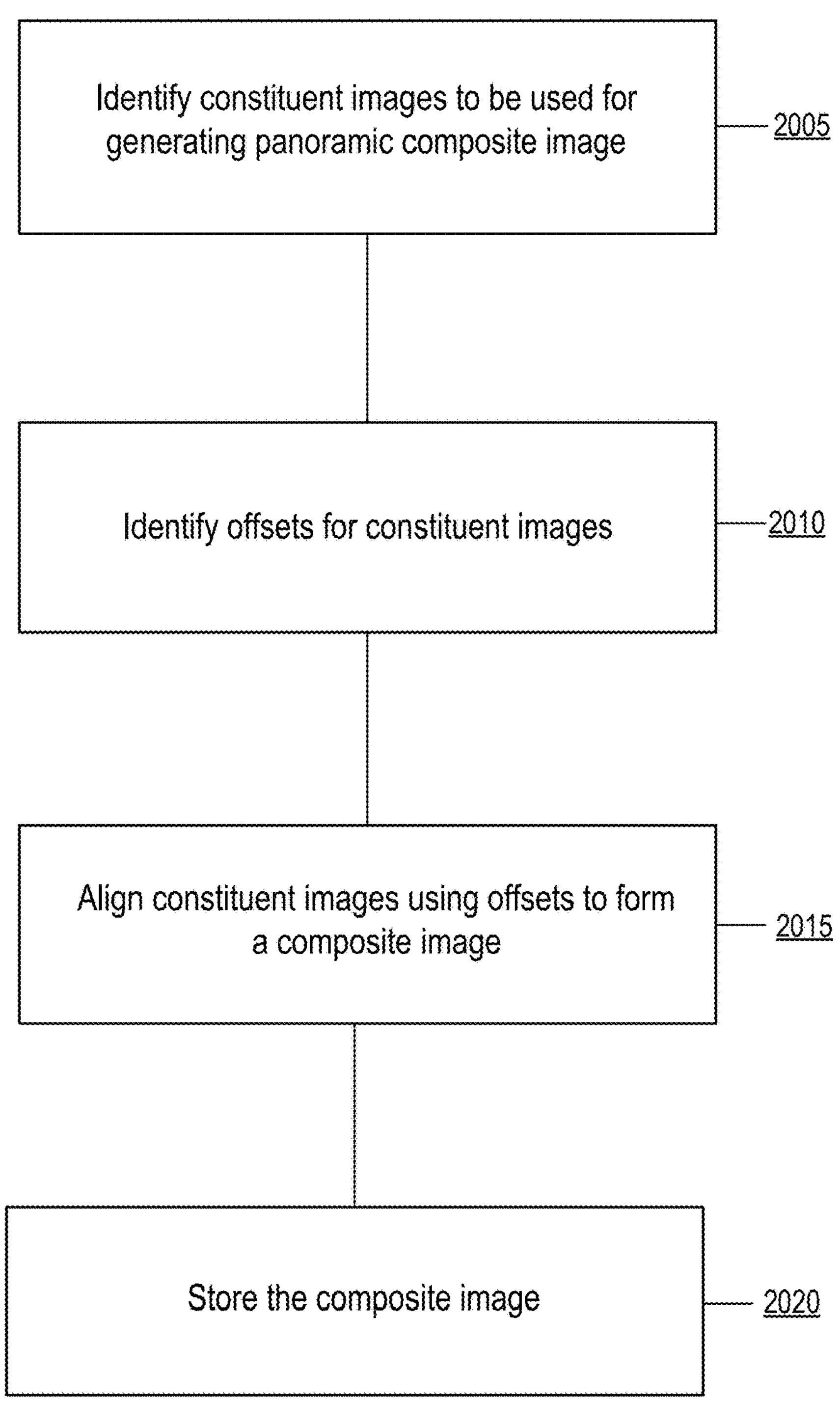
FIG. 20 is a flow chart illustrating a method for generating and storing of composite images from constituent images using angular offset calibrations, in accordance with one or more implementations.

Referring now to FIG. 20, depicted is a flow chart of a method 2000 for generating and storing a panoramic composite image from constituent images using angular offset adjustments. The method 2000 can be executed, performed, or otherwise carried out by any of the computing systems or devices described herein. In brief overview of the method 2000, the method 2000 can include identifying constituent images to be used for generating a panoramic composite image (STEP 2005), identifying offsets for constituent images (STEP 2010), aligning constituent images using offsets to form a composite image (STEP 2015), and storing the composite image (STEP 2020).

The method 2000 can include identifying constituent images to be used for generating a panoramic composite image (STEP 2005). The method can include the one or more processors identifying a plurality of constituent images captured by an image capture device rotated about an axis of rotation of the image capture device. Each constituent image of the plurality of constituent images can correspond to a respective range of angles about the axis. The method can include capturing constituent images at predetermined angular increments as the image capture device is rotated about the axis. The method can include associating each constituent image with metadata that indicates the angular position or timestamp of acquisition. The method can include selecting constituent images based on a desired coverage area or based on a temporal criterion. The method can include filtering or discarding constituent images that do not meet a quality threshold or that are outside a specified angular range. The method can include storing the identified constituent images in a data structure for subsequent processing.

The axis of rotation of the image capture system or the image capturing devices can be offset, tilted or otherwise not in alignment with a reference axis. The reference axis may be an axis that is perpendicular to a horizontal plane of the image capture system or the image capture device. For example, the reference axis can be an axis or a ray that is 90 degrees vertical (e.g., from all directions) with respect to a ground, floor or a horizontal plane at the location of image capture system, image capture device or an observation station. The reference axis can be an ideal axis for positioning rotating cameras aiming to capture images of areas surrounding the observation station, such that offsets or adjustments in aligning the images when constructing a composite image, are minimized.

The method 2000 can include identifying offsets for constituent images (STEP 2010). The method can include the one or more processors identifying, for each constituent image of the plurality of constituent images, an offset caused by a difference between the axis of rotation and a reference axis. The offset can include at least one of an angular adjustment corresponding to an angular rotation of the respective constituent image, a lateral adjustment corresponding to a lateral shift of the respective constituent image, and a longitudinal adjustment corresponding to a longitudinal shift of the respective constituent image. At least one offset of a plurality of offsets for the plurality of constituent images can include no adjustment for the respective constituent image corresponding to the at least one offset.

The method can include determining the offset by comparing the physical orientation of the image capture device to a reference orientation, such as by measuring tilt or roll with respect to a ground plane. The method can include performing a manual calibration process in which a user reviews the alignment of each image with respect to known landmarks and records any required angular, lateral, or longitudinal corrections. In some implementations, the method can include applying automated calibration techniques, such as using sensor data or image analysis, to detect and record misalignments for each constituent image. The method can include storing the identified offsets in a data structure indexed by angle or image identifier for subsequent use in image alignment or stitching processes. In some implementations, the method can include periodically updating the offsets based on changes in environmental conditions or physical mounting.

Each constituent image of the plurality of constituent images can be associated with a metadata comprising at least one of: an identifier of the image capture device, an angular adjustment of the offset, a lateral adjustment of the offset, a longitudinal adjustment of the offset, a timestamp of constituent image capture, and a calibration status indicator. The method can include determining, for each constituent image of the plurality of constituent images, the offset of the constituent image based on the respective difference between the axis of rotation and the reference axis for the respective range of angles corresponding to the respective constituent image. The method can include storing, in a data repository, the offset for each respective range of angles corresponding to each constituent image.

The method can include one or more processors adjusting the offset of a constituent image of the plurality of constituent images based on a comparison of an alignment of one or more physical features within the respective constituent image within the generated composite image with a known landmark. The method can include determining that an update to calibration for one or more offsets of the one or more constituent images of the plurality of constituent images is due. The method can include generating, responsive to the determination, at least one offset for at least one constituent image of the plurality of constituent images based on the respective difference between the axis of rotation and the reference axis for the respective range of angles for the constituent image.

The method 2000 can include aligning constituent images using offsets to form a composite image (STEP 2015). The method can include aligning, using the respective offset for each respective constituent image corresponding to a respective range of angles, the plurality of constituent images to generate a composite image. The one or more processors can align at least one constituent image of the plurality of constituent images according to at least one of the angular adjustment, the lateral adjustment or the longitudinal adjustment for the at least one constituent image of the plurality of constituent images to generate the composite image. In some implementations, one or more processors can align each constituent image according to at least one of the angular adjustment, the lateral adjustment or the longitudinal adjustment to generate the composite image.

The composite image can include, for example, a first spectral mode image data captured in a first spectral range and a second spectral mode image data captured in a second spectral range. For instance, the alignment of the plurality of constituent images can be performed independently for the first spectral mode image data and for the second spectral mode image data. The composite image can include multimode images combining modal characteristics of images in different modes, such as an infrared image, a thermal image, a visible spectrum image, an ultraviolet image or any other image captured using any radiation.

The method can include determining that the plurality of constituent images are to be used to generate the composite image. The method can include obtaining, responsive to the determination, the offset for each constituent image of the plurality of constituent images. The method can include combining each constituent image of the plurality of constituent images with at least one another constituent image of the plurality of constituent images. In doing so, the method can generate the composite image that comprises a combined range of angles covering at least a portion of each respective range of angles of each constituent image of the plurality of constituent images about the axis of rotation. The combined range of angles of the composite image can correspond to at least 180 degrees about the axis of rotation. The method can include applying, to each constituent image based on corresponding offset for the respective constituent image, a transformation matrix to align the respective constituent image.

The method 2000 can include storing the composite image (STEP 2020). The method can include the one or more processors storing the composite image in one or more data structures. For instance, the one or more processors can include providing, for presentation in a graphical user interface, the composite image. The method can include associating metadata with the composite image, where the metadata can include a timestamp, an identifier of the image capture device, or calibration status information. The method can include indexing the composite image in a searchable database to allow retrieval based on time, location, or other attributes. In some implementations, the method can include transmitting the composite image to a remote device over a network. In some implementations, the method can include archiving the composite image for later analysis or review. In some implementations, the method can include generating a notification or alert based on the storage of the composite image.

Referring back to FIG. 19, technical solutions described herein can monitor real-world environments using image data from fixed observation stations, which can present technical challenges related to spatial accuracy and temporal consistency in image retrieval. For instance, observation stations can include one or more image capture devices configured to rely on constituent images at different angles, such that the constituent images can be used to generate panoramic composite images of the surrounding area. In some implementations, the image capture devices can be mounted in fixed orientations and can acquire images at regular intervals. Geographic information systems and digital elevation models can be used with the acquired images to provide spatial context for the observed scenes. Approaches depending on physical alignment of image capture devices or feature matching algorithms to combine constituent images can be limited by persistent misalignments, environmental factors, and unreliable feature detection. This can particularly occur under low-light conditions or in scenes lacking distinct features. These limitations can introduce errors in mapping between image coordinates and real-world locations, such that composite images can lack consistent angular references and spatial fidelity, and image retrieval for specific real-world locations can be inaccurate or incomplete.

The techniques described herein can address spatial and temporal image retrieval challenges by introducing a process for geographically targeted image retrieval at an observation station. In some implementations, the techniques described herein can receive a request specifying a time indication and a location within a view range of an observation station that includes one or more image capture devices configured to capture constituent images about an axis of rotation to generate composite images. The techniques described herein can identify, based on the location, a constituent image of a plurality of composite images corresponding to the time indication, and can retrieve, from calibration data in a data repository, an offset for the constituent image corresponding to a bearing angle about the axis and an elevation angle indicative of a portion of the constituent image corresponding to the location. The techniques described herein can generate, from the constituent image and based on the bearing angle and the elevation angle, a zoomed image of the portion of the constituent image corresponding to the location, and can provide, for presentation via a graphical user interface, the zoomed image responsive to the request. The techniques described herein can support retrieval of images from previous times using digital zoom, and can support optical zoom by tasking the camera to acquire a current high-resolution image of the specified coordinates.

In some implementations, when a calculated line of sight from the observation station to an incident location is obstructed by intervening terrain, the technical solutions can use the digital elevation model 1422 and corresponding topography 1424 to determine or compute (e.g., via the topography model) a visibility location at which incident byproducts, such as smoke plumes, can first be observed. The visibility location (e.g., at the source of the incident or of the smoke above the location of the incident) can be found by projecting a ray from the station toward the incident coordinates within the topography model, such as the DEM/DSM/DTM model. The system can determine the location where the projected ray intersects an elevation feature representing the highest obstructing terrain in that path, and then continuing, through the obstructing terrain, to identify the point at which, or above which the incident location or the plume trajectory exists or is visible.

The system can use such topography model computed visibility location to determine the bearing 834 and elevation angle 1412 for zoom operations, allowing for the generated zoomed image to capture the observable plume above the location, rather than a portion of terrain blocking the incident base. For example, the determined visibility location can correspond to a crest of a hill, a ridgeline, or an engineered structure, above which a smoke plume from a fire behind the terrain becomes visible from the observation station. For example, the visibility location can be derived from a calculated intersection of a projected plume trajectory with an unobstructed portion of the sky as represented in the elevation dataset, enabling automatic targeting of zoom to that observable portion of the incident. By virtue of the implementation of the techniques described herein, a system for geographically targeted image retrieval at an observation station can reduce computing processor and memory consumption. For example, the system can receive a request comprising a time indication and a location, identify a constituent image from a plurality of composite images based on the location and time, retrieve an offset from calibration data, and generate a zoomed image of a portion of the constituent image corresponding to the location. By directly retrieving and applying calibration offsets to constituent images, the system can avoid repeated computationally intensive feature matching or alignment operations, and can minimize the need to process or analyze large volumes of image data for each request. As a result, processor cycles and memory allocations can be conserved, allowing efficient and scalable operation of geographically targeted image retrieval functions.

In some examples, the described system can reduce network communication by limiting the amount of data transmitted between the observation station, server, and client device. For example, the system can generate a zoomed image of a specific location from a constituent image using stored calibration data, and transmit only the relevant zoomed image to the client device in response to a request. By avoiding the need to transmit entire panoramic images, raw image data, or large calibration datasets over the network for each request, the system can minimize bandwidth usage and reduce latency. As a result, network resources can be preserved and user experience can be improved through faster delivery of targeted image data.

In at least some examples, the system can improve accuracy when compared to other systems by using calibration data to correct for physical misalignments and environmental factors in the generation of zoomed images. For example, the system can retrieve an offset for a constituent image corresponding to a bearing angle and elevation angle, and generate a zoomed image that accurately reflects the real-world location specified in the request. By applying precise angular, longitudinal, or latitudinal adjustments based on calibration data, the system can ensure that the retrieved images correspond to the correct geographic coordinates and time, reducing the likelihood of spatial errors. As a result, the system can provide more reliable and accurate visual inspection of incident locations or infrastructure compared to systems that do not incorporate such calibrations.

Figure 21:
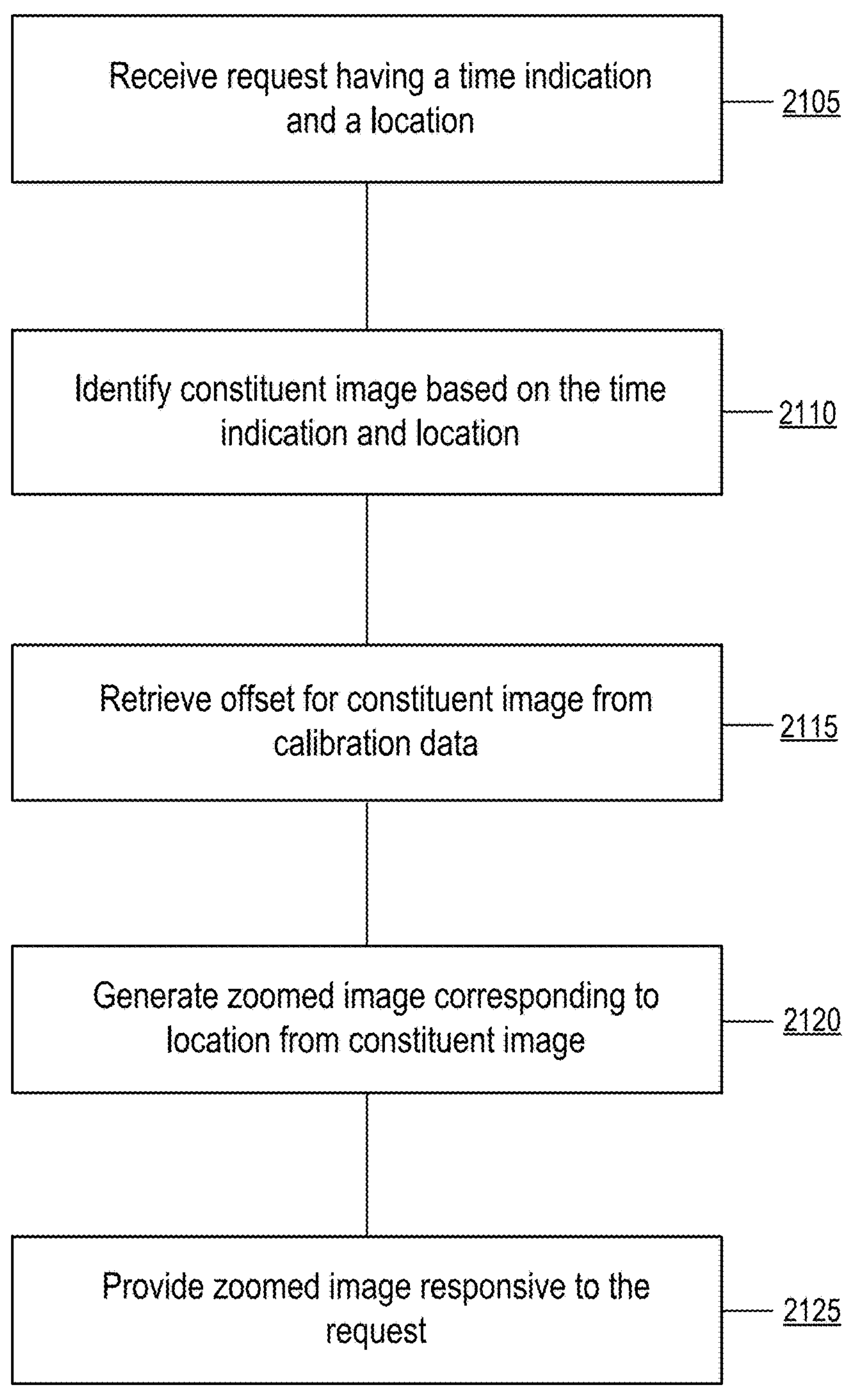
FIG. 21 is a flow chart illustrating a method for generating and providing a zoomed image based on a time indication and a location, utilizing angular offset calibrations, in accordance with one or more implementations.

Referring now to FIG. 21, depicted is a flow chart of a method 2100 for generating and providing a zoomed image based on a time indication and a location. The method 2100 can be executed, performed, or otherwise carried out by any of the computing systems or devices described herein. In brief overview of the method 2100, the method 2100 can include receiving a request having a time indication and a location (STEP 2105), identifying a constituent image based on the time indication and location (STEP 2110), retrieving an offset for the constituent image from calibration data (STEP 2115), generating a zoomed image corresponding to the location from the constituent image (STEP 2120), and providing the zoomed image responsive to the request (STEP 2125).

The method 2100 can include receiving a request having a time indication and a location (STEP 2105). The method can include one or more processors receiving a request comprising a time indication and a location within a view range of an observation station that includes one or more image capture devices configured to capture constituent images about an axis of rotation to generate composite images. The method can include receiving the request from a remote device, via a network. In some implementations, the request can be generated by a user interacting with a graphical user interface on a client device, where the user specifies a particular geographic location and a desired time for image retrieval. In some implementations, the request can be generated automatically by an external monitoring system that detects an incident and transmits the relevant location and time parameters to the observation station. For example, a user can submit a request to view a zoomed image of a wildfire incident at a specified coordinate and timestamp, or a utility operator can request historical imagery of a transmission pole location following a reported fault.

The method 2100 can include identifying a constituent image based on the time indication and location (STEP 2110). The method can include the one or more processors identifying, based on the location, a constituent image of a plurality of composite images for generating a composite image corresponding to the time indication. In some implementations, the one or more processors can determine the time indication from a request received from a remote device or a user interface. The one or more processors can parse the location from the request, which can include a geographic coordinate, a named feature, or a marker placed on a displayed panorama. The one or more processors can access a data repository or memory structure that stores composite images indexed by time and location. The one or more processors can select a constituent image that corresponds to the specified time indication and that includes the region or direction associated with the location. In some implementations, the one or more processors can use metadata associated with each constituent image, such as a timestamp or angular coverage, to identify the constituent image that matches the request. For example, the one or more processors can receive a request specifying a timestamp and a geographic coordinate, determine the corresponding angular direction from the observation station, and select the constituent image captured at the specified time that includes the angular direction of the geographic coordinate. In another example, the one or more processors can receive a request with a user-placed marker on a panoramic image, extract the angular position of the marker, and identify the constituent image that covers the angular position at the relevant time.

The method 2100 can include retrieving an offset for the constituent image from calibration data (STEP 2115). The method can include the one or more processors retrieving, from calibration data in a data repository, an offset for the constituent image corresponding to a bearing angle about the axis and an elevation angle indicative a portion of the constituent image corresponding to the location. The method can include identifying, from the request, one or more geographic coordinates of the location. The method can include determining, based on the one or more geographic coordinates, the bearing angle and elevation angle corresponding to the location. The bearing angle can be comprised within a range of bearing angles corresponding to a region of the location corresponding to a fire incident.

The one or more processors can retrieve calibration data by querying a data repository that stores offsets associated with specific angular positions and elevation values. In some implementations, the one or more processors can parse a request to extract latitude and longitude coordinates and can use a marker to angle process to convert the coordinates into polar angles. In some implementations, the one or more processors can select an offset by matching the calculated bearing and elevation angles to entries in the calibration data. For example, the one or more processors can receive a request specifying a location at a particular latitude and longitude, determine that the corresponding bearing angle is 45 degrees and the elevation angle is 2 degrees below the horizon, and retrieve an offset from the calibration data that is indexed to those angles. In another example, the one or more processors can identify a range of bearing angles associated with a fire incident and can retrieve a set of offsets for all constituent images covering that angular range.

The offset can include at least one of: an angular adjustment, a longitudinal adjustment, or a latitudinal adjustment for the constituent image. The method can include one or more processors generating the zoomed image based on the at least one of the angular adjustment, the longitudinal adjustment or the latitudinal adjustment for the constituent image. The offset can be generated based on an angular difference between the axis and a reference axis. In some implementations, one or more processors can generate a zoomed image by cropping a region of a constituent image that corresponds to a calculated bearing angle and elevation angle. In some implementations, one or more processors can apply the angular adjustment to shift the constituent image horizontally, can apply the longitudinal adjustment to shift the constituent image vertically, or can apply the latitudinal adjustment to correct for mounting misalignment. For example, one or more processors can receive a request specifying a geographic coordinate, can determine the corresponding bearing and elevation angles, can retrieve the offset for the constituent image, and can generate a zoomed image by cropping and scaling the relevant region based on the offset. In another example, one or more processors can generate a zoomed image of a historical incident location by retrieving the calibration data for the relevant time and applying the stored angular, longitudinal, or latitudinal adjustments to the constituent image prior to cropping.

The method 2100 can include generating a zoomed image corresponding to the location from the constituent image (STEP 2120). The method can include the one or more processors generating, from the constituent image and based on the bearing angle and the elevation angle, a zoomed image of the portion of the constituent image corresponding to the location. The one or more processors can crop a region of the constituent image that corresponds to the calculated bearing angle and elevation angle. The one or more processors can scale the cropped region to generate a zoomed image for presentation. The one or more processors can apply calibration data to adjust the crop coordinates based on physical mounting offsets or environmental factors. The one or more processors can generate the zoomed image by combining regions from multiple constituent images if the location spans more than one image. For example, the one or more processors can receive a request specifying a geographic coordinate and a time, calculate the corresponding bearing angle and elevation angle, identify the relevant constituent image, crop the region of interest, and generate a zoomed image for display. In another example, the one or more processors can receive a request for a historical incident location, retrieve calibration data for the relevant time, and generate a zoomed image that accounts for mounting offsets present at that time.

The method can include identifying, based on the time indication and the location, a second constituent image of the plurality of constituent images; retrieve, from the calibration data, a second offset for the second constituent image; and generate, from the constituent image and the second constituent image, the zoomed image. The method can include determining, based on geographical coordinates of the observation station and the geographical coordinates of the location, the bearing angle and the elevation angle corresponding to the location. The method can include identifying, based on the bearing angle and the elevation angle, a portion of one or more constituent images corresponding to the location; and generate the zoomed image from the portion of one or more constituent images.

The method 2100 can include providing the zoomed image responsive to the request (STEP 2125). The method can include providing, by the one or more processors, for presentation via a graphical user interface, the zoomed image responsive to the request. The method can include providing, the zoomed image, for presentation via a graphical user interface of the remote device, responsive to the request. In some implementations, the one or more processors can transmit the zoomed image to a client device over a network connection. In some implementations, the one or more processors can display the zoomed image within a web-based dashboard or a dedicated application interface. In some implementations, the one or more processors can provide the zoomed image as part of an automated alert or notification workflow. For example, the one or more processors can provide a zoomed image of a wildfire incident location in response to a request from an emergency response operator. In another example, the one or more processors can provide a zoomed image of a utility pole at a specified geographic coordinate in response to a request from a utility operator. In some implementations, the one or more processors can provide a historical zoomed image corresponding to a past time indication or a real-time zoomed image by directing an image capture device to acquire a new image.

F. Computer Architecture

Figure 22:
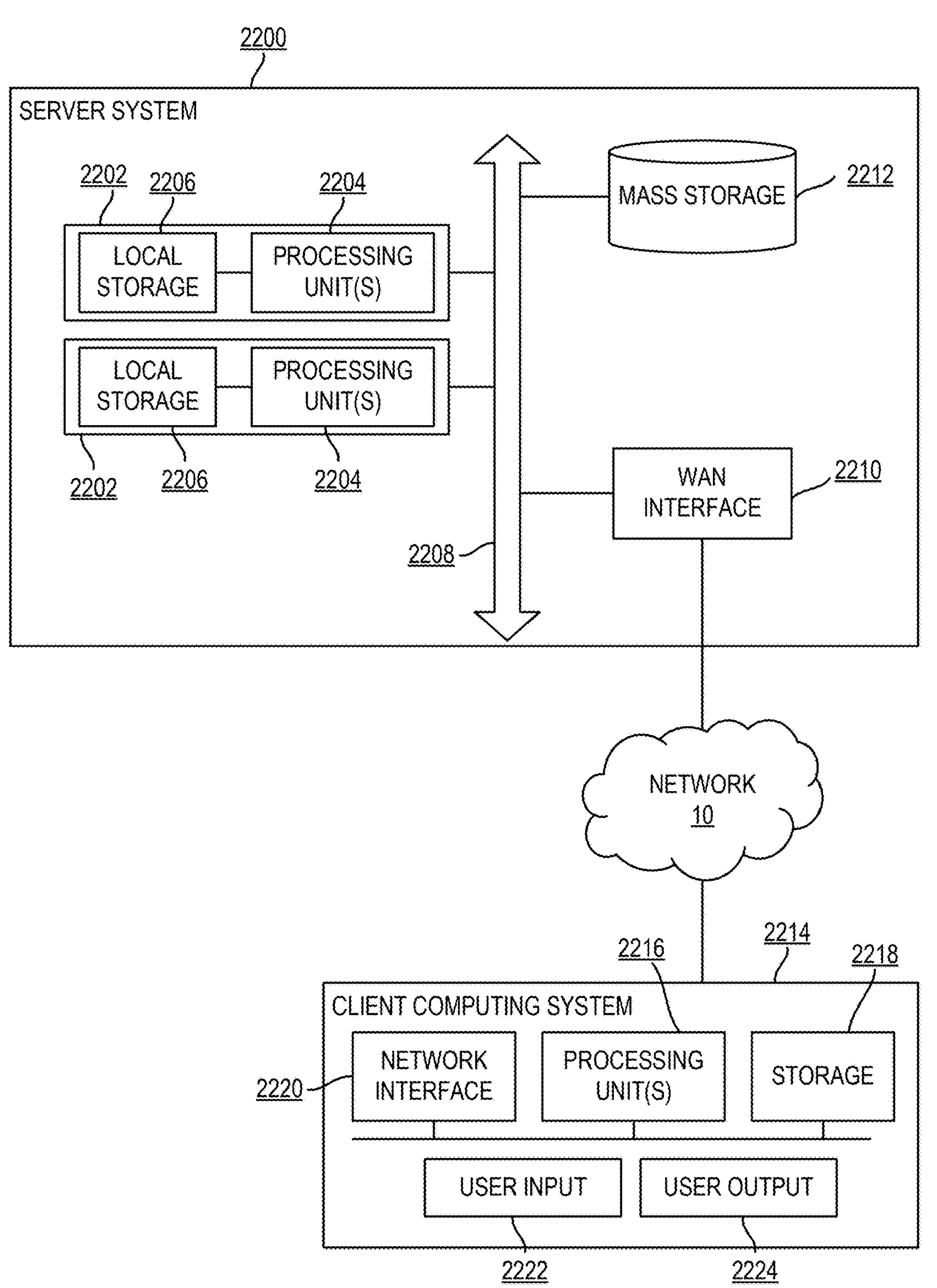
FIG. 22 is a block diagram of an example network and computing environment that may be used to implement various features, techniques and functionalities of the solutions described herein, according to an exemplary embodiment.

Various operations described herein can be implemented on computer systems, which can be of generally conventional design. FIG. 22 shows a simplified block diagram of a representative server system 2200 and client computer system 2214 usable to implement certain embodiments of the present disclosure. In various embodiments, server system 2200 or similar systems can implement services or servers described herein or portions thereof. For example, the server system 2200 may share one or more features as the server(s) 200 described herein. Client computing system 2214 or similar systems can implement clients described herein. For example, the client computing system 2214 may share one or more features as the computing device(s) 304 described herein. The system 100 and others described herein can be similar to the server system 2200.

Server system 2200 can have a modular design that incorporates a number of modules 2802 (e.g., blades in a blade server embodiment); while two modules 2202 are shown, any number can be provided. Each module 2202 can include processing unit(s) 2204 and local storage 2206.

Processing unit(s) 2204 can include a single processor, which can have one or more cores, or multiple processors. In some embodiments, processing unit(s) 2204 can include a general-purpose primary processor as well as one or more special-purpose co-processors such as graphics processors, digital signal processors, or the like. In some embodiments, some or all processing units 2204 can be implemented using customized circuits, such as application specific integrated circuits (ASICs) or field programmable gate arrays (FPGAs). In some embodiments, such integrated circuits execute instructions that are stored on the circuit itself. In other embodiments, processing unit(s) 2204 can execute instructions stored in local storage 2206. Any type of processors in any combination can be included in processing unit(s) 2204.

Local storage 2206 can include volatile storage media (e.g., conventional DRAM, SRAM, SDRAM, or the like) and/or non-volatile storage media (e.g., magnetic or optical disk, flash memory, or the like). Storage media incorporated in local storage 2206 can be fixed, removable or upgradeable as desired. Local storage 2206 can be physically or logically divided into various subunits such as a system memory, a read-only memory (ROM), and a permanent storage device. The system memory can be a read-and-write memory device or a volatile read-and-write memory, such as dynamic random-access memory. The system memory can store some or all of the instructions and data that processing unit(s) 2204 need at runtime. The ROM can store static data and instructions that are needed by processing unit(s) 2204. The permanent storage device can be a non-volatile read-and-write memory device that can store instructions and data even when module 2202 is powered down. The term "storage medium" as used herein includes any medium in which data can be stored indefinitely (subject to overwriting, electrical disturbance, power loss, or the like) and does not include carrier waves and transitory electronic signals propagating wirelessly or over wired connections.

In some embodiments, local storage 2206 can store one or more software programs to be executed by processing unit(s) 2204, such as an operating system and/or programs implementing various server functions such as functions of the server 200 of FIG. 1A, or any other system described herein.

"Software" refers generally to sequences of instructions that, when executed by processing unit(s) 2204 cause server system 2200 (or portions thereof) to perform various operations, thus defining one or more specific machine embodiments that execute and perform the operations of the software programs. The instructions can be stored as firmware residing in read-only memory and/or program code stored in non-volatile storage media that can be read into volatile working memory for execution by processing unit(s) 2204. Software can be implemented as a single program or a collection of separate programs or program modules that interact as desired. From local storage 2206 (or non-local storage described below), processing unit(s) 2204 can retrieve program instructions to execute and data to process in order to execute various operations described above.

In some server systems 2200, multiple modules 2202 can be interconnected via a bus or other interconnect 2208, forming a local area network that supports communication between modules 2202 and other components of server system 2200. Interconnect 2208 can be implemented using various technologies including server racks, hubs, routers, etc.

A wide area network (WAN) interface 2210 can provide data communication capability between the local area network (interconnect 2208) and a larger network (e.g., the network 10), such as the Internet. Conventional or other activities technologies can be used, including wired (e.g., Ethernet, IEEE 802.3 standards) and/or wireless technologies (e.g., Wi-Fi, IEEE 802.11 standards).

In some embodiments, local storage 2206 is intended to provide working memory for processing unit(s) 2204, providing fast access to programs and/or data to be processed while reducing traffic on interconnect 2208. Storage for larger quantities of data can be provided on the local area network by one or more mass storage subsystems 2212 that can be connected to interconnect 2208. Mass storage subsystem 2212 can be based on magnetic, optical, semiconductor, or other data storage media. Direct attached storage, storage area networks, network-attached storage, and the like can be used. Any data stores or other collections of data described herein as being produced, consumed, or maintained by a service or server can be stored in mass storage subsystem 2212. In some embodiments, additional data storage resources may be accessible via WAN interface 2210 (potentially with increased latency).

Server system 2200 can operate in response to requests received via WAN interface 2210. For example, one of modules 2202 can implement a supervisory function and assign discrete tasks to other modules 2202 in response to received requests. Conventional work allocation techniques can be used. As requests are processed, results can be returned to the requester via WAN interface 2210. Such operation can generally be automated. Further, in some embodiments, WAN interface 2210 can connect multiple server systems 2200 to each other, providing scalable systems capable of managing high volumes of activity. Conventional or other techniques for managing server systems and server farms (collections of server systems that cooperate) can be used, including dynamic resource allocation and reallocation.

Server system 2200 can interact with various user-owned or user-operated devices via a wide-area network such as the Internet. An example of a user-operated device is shown in FIG. 22 as client computing system 2214. Client computing system 2214 can be implemented, for example, as an edge computer (e.g., the station computing device(s) 104) and/or a consumer device (e.g., the computing device(s) 304) such as a smartphone, other mobile phone, tablet computer, wearable computing device (e.g., smart watch, eyeglasses), desktop computer, laptop computer, and so on.

For example, client computing system 2214 can communicate via WAN interface 2210. Client computing system 2214 can include conventional computer components such as processing unit(s) 2216, storage device 2218, network interface 2220, user input device 2222, and user output device 2224. Client computing system 2214 can be a computing device implemented in a variety of form factors, such as a desktop computer, laptop computer, tablet computer, smartphone, other mobile computing device, wearable computing device, or the like.

Processor 2216 and storage device 2218 can be similar to processing unit(s) 2204 and local storage 2206 described above. Suitable devices can be selected based on the demands to be placed on client computing system 2214; for example, client computing system 2214 can be implemented as a "thin" client with limited processing capability or as a high-powered computing device. Client computing system 2214 can be provisioned with program code executable by processing unit(s) 2216 to enable various interactions with server system 2200 of a message management service such as accessing messages, performing actions on messages, and other interactions described above. Some client computing systems 2214 can also interact with a messaging service independently of the message management service.

Network interface 2220 can provide a connection to a wide area network (e.g., the Internet) to which WAN interface 2210 of server system 2200 is also connected. In various embodiments, network interface 2220 can include a wired interface (e.g., Ethernet) and/or a wireless interface implementing various RF data communication standards such as Wi-Fi, Bluetooth, or cellular data network standards (e.g., 3G, 4G, LTE, etc.).

User input device 2222 can include any device (or devices) via which a user can provide signals to client computing system 2214; client computing system 2214 can interpret the signals as indicative of particular user requests or information. In various embodiments, user input device 2222 can include any or all of a keyboard, touch pad, touch screen, mouse or other pointing device, scroll wheel, click wheel, dial, button, switch, keypad, microphone, and so on.

User output device 2224 can include any device via which client computing system 2214 can provide information to a user. For example, user output device 2224 can include a display to display images generated by or delivered to client computing system 2214. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). Some embodiments can include a device such as a touchscreen that function as both input and output device. In some embodiments, other user output devices 2224 can be provided in addition to or instead of a display. Examples include indicator lights, speakers, tactile "display" devices, printers, and so on.

Some embodiments include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processing unit(s) 2204 and 2216 can provide various functionality for server system 2200 and client computing system 2214, including any of the functionality described herein as being performed by a server or client, or other functionality associated with message management services.

It will be appreciated that server system 2200 and client computing system 2214 are illustrative and that variations and modifications are possible. Computer systems used in connection with embodiments of the present disclosure can have other capabilities not specifically described here. Further, while server system 2200 and client computing system 2214 are described with reference to particular blocks, it is to be understood that these blocks are defined for convenience of description and are not intended to imply a particular physical arrangement of component parts. For instance, different blocks can be but need not be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present disclosure can be realized in a variety of apparatus including electronic devices implemented using any combination of circuitry and software.

While the disclosure has been described with respect to specific embodiments, one skilled in the art will recognize that numerous modifications are possible. For instance, although specific examples of rules (including triggering conditions and/or resulting actions) and processes for generating suggested rules are described, other rules and processes can be implemented. Embodiments of the disclosure can be realized using a variety of computer systems and communication technologies including but not limited to specific examples described herein.

Embodiments of the present disclosure can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present disclosure may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the disclosure has been described with respect to specific embodiments, it will be appreciated that the disclosure is intended to cover all modifications and equivalents within the scope of the following claims.

The machine learning model may be periodically and/or continuously trained. For instance, as the recommendations (or other predictions and derived information) are presented to the end-user, the system may monitor the end-user's behavior (e.g., whether a recommendation was accepted/rejected or whether a predicted attribute was revised). The monitored data may be fed back into the machine learning model to improve its accuracy. The machine learning model can re-calibrate itself accordingly, such that the results are customized for the end-user.

It should be understood that the disclosed embodiments are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. Thus, it is to be understood that other embodiments can be utilized and functional, logical, operational, organizational, structural and/or topographical modifications may be made without departing from the scope of the disclosure. As such, all examples and/or embodiments are deemed to be non-limiting throughout this disclosure.

Some embodiments described herein relate to methods. It should be understood that such methods can be computer implemented methods (e.g., instructions stored in memory and executed on processors). Where methods described above indicate certain events occurring in a certain order, the ordering of certain events can be modified. Additionally, certain of the events can be performed repeatedly, concurrently in a parallel process when possible, as well as performed sequentially as described above. Furthermore, certain embodiments can omit one or more described events.

All definitions, as defined and used herein, should be understood to control over dictionary definitions, definitions in documents incorporated by reference, and/or ordinary meanings of the defined terms.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a general-purpose processor, a field-programmable gate array (FPGA), and/or an application-specific integrated circuit (ASIC). Software modules (executed on hardware) can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using Python, Java, JavaScript, C++, and/or other programming languages and software development tools. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

The drawings primarily are for illustrative purposes and are not intended to limit the scope of the subject matter described herein. The drawings are not necessarily to scale; in some instances, various aspects of the subject matter disclosed herein can be shown exaggerated or enlarged in the drawings to facilitate an understanding of different features. In the drawings, like reference characters generally refer to like features (e.g., functionally similar and/or structurally similar elements).

The acts performed as part of a disclosed method(s) can be ordered in any suitable way. Accordingly, embodiments can be constructed in which processes or steps are executed in an order different than illustrated, which can include performing some steps or processes simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A system for generating a panoramic composite image, the system comprising:

one or more processors coupled with memory to:

cause an image capture device to rotate about an axis of rotation of the image capture device to capture, for a plurality of range of angles, a plurality of first constituent images, each first constituent image of the plurality of first constituent images corresponding to a respective range of angles about the axis;

determine, during a calibration process, for each respective range of angles of the plurality of range of angles, a respective offset caused by a difference between the axis of rotation and a reference axis using the respective first constituent image;

during a composite image generation process subsequent to the calibration process, identify a plurality of second constituent images captured by the image capture device rotated about the axis of rotation of the image capture device, each second constituent image of the plurality of second constituent images corresponding to a respective range of angles about the axis;

align, using the respective offset for each respective range of angles of the plurality of range of angles determined using the plurality of first constituent images, the plurality of second constituent images to generate a composite image; and store, in one or more data structures, the composite image.

2. The system of claim 1, wherein the one or more processors are further configured to:

determine, during the calibration process, for each respective range of angles of the plurality of range of angles using the respective first constituent image captured at the respective range of angles, wherein the respective offset is based on a difference between the axis of rotation and the reference axis; and store, in a data repository, the offset for each respective range of angles.

3. The system of claim 2, wherein the one or more processors are further configured to:

determine that the plurality of second constituent images are to be used to generate the composite image; and obtain, responsive to the determination, the offset for each constituent image of the plurality of second constituent images.

4. The system of claim 1, wherein the offset comprises at least one of an angular adjustment corresponding to an angular rotation of the respective second constituent image, a lateral adjustment corresponding to a lateral shift of the respective second constituent image, and a longitudinal adjustment corresponding to a longitudinal shift of the respective second constituent image.

5. The system of claim 4, wherein the one or more processors are further configured to align at least one second constituent image of the plurality of second constituent images according to at least one of the angular adjustment, the lateral adjustment or the longitudinal adjustment for the at least one second constituent image of the plurality of second constituent images to generate the composite image.

6. The system of claim 4, wherein the one or more processors are further configured to align each second constituent image of the plurality of second constituent images according to at least one of the angular adjustment, the lateral adjustment or the longitudinal adjustment for each second constituent image of the plurality of constituent images to generate the composite image.

7. The system of claim 6, wherein at least one offset of a plurality of offsets for the plurality of second constituent images comprises no adjustment for the respective second constituent image corresponding to the at least one offset.

8. The system of claim 1, wherein the one or more processors are further configured to combine each second constituent image of the plurality of second constituent images with at least one another second constituent image of the plurality of second constituent images to generate the composite image that comprises a combined range of angles covering at least a portion of each respective range of angles of each second constituent image of the plurality of second constituent images about the axis of rotation.

9. The system of claim 8, wherein the combined range of angles of the composite image corresponds to at least 180 degrees about the axis of rotation.

10. The system of claim 1, wherein each second constituent image of the plurality of second constituent images is associated with a metadata comprising at least one of: an identifier of the image capture device, an angular adjustment of the offset, a lateral adjustment of the offset, a longitudinal adjustment of the offset, a timestamp of constituent image capture, and a calibration status indicator.

11. The system of claim 2, wherein the one or more processors are further configured to adjust the offset of a second constituent image of the plurality of second constituent images based on a comparison of an alignment of one or more physical features within the respective second constituent image within the generated composite image with a known landmark.

12. The system of claim 11, wherein the one or more processors are configured to:

determine that an update to calibration for one or more offsets of the one or more constituent images of the plurality of second constituent images is due; and generate, responsive to the determination, at least one offset for at least one second constituent image of the plurality of second constituent images based on the respective difference between the axis of rotation and the reference axis for the respective range of angles for the second constituent image.

13. The system of claim 11, wherein the one or more processors are further configured to apply, to each second constituent image based on corresponding offset for the respective constituent image, a transformation matrix to align the respective second constituent image.

14. The system of claim 11, wherein the composite image comprises a first spectral mode image data captured in a first spectral range and a second spectral mode image data captured in a second spectral range, and wherein alignment of the plurality of second constituent images is performed independently for the first spectral mode image data and for the second spectral mode image data.

15. The system of claim 11, wherein the one or more processors are further configured to provide, for presentation in a graphical user interface, the composite image.

16. A method comprising:

causing, by one or more processors, an image capture device to rotate about an axis of rotation of the image capture device to capture, for a plurality of range of angles, a plurality of first constituent images, each first constituent image of the plurality of first constituent images corresponding to a respective range of angles about the axis;

determining, by the one or more processors, during a calibration process, for each respective range of angles of the plurality of range of angles, a respective offset caused by a difference between the axis of rotation and a reference axis using the respective first constituent image;

during a composite image generation process subsequent to the calibration process, identifying, by the one or more processors, a plurality of second constituent images captured by the image capture device rotated about the axis of rotation of the image capture device, each second constituent image of the plurality of second constituent images corresponding to a respective range of angles about the axis;

aligning, by the one or more processors, using the respective offset for each identify a plurality of second constituent images captured by the image capture device rotated about the axis of rotation of the image capture device, each second constituent image of the plurality of second constituent images corresponding to a respective range of angles about the axis; and storing, by the one or more processors, in one or more data structures, the composite image.

17. The method of claim 16, comprising:

determining, by the one or more processors, during the calibration process, for each respective range of angles of the plurality of range of angles using the respective first constituent image captured at the respective range of angles, wherein the respective offset is based on a difference between the axis of rotation and the reference axis; and storing, by the one or more processors, in a data repository, the offset for each respective range of angles.

18. The method of claim 16, comprising:

determining, by the one or more processors, that the plurality of second constituent images are to be used to generate the composite image; and obtaining, by the one or more processors, responsive to the determination, the offset for each second constituent image of the plurality of second constituent images.

19. The method of claim 16, comprising:

providing, by the one or more processors, for presentation in a graphical user interface, the composite image.

20. A non-transitory computer readable medium storing instructions, which when executed by one or more processors, cause the one or more processors to:

cause an image capture device to rotate about an axis of rotation of the image capture device to capture, for a plurality of range of angles, a plurality of first constituent images, each first constituent image of the plurality of first constituent images corresponding to a respective range of angles about the axis;

determine, during a calibration process, for each respective range of angles of the plurality of range of angles, a respective offset caused by a difference between the axis of rotation and a reference axis using the respective first constituent image;

during a composite image generation process subsequent to the calibration process, identify a plurality of second constituent images captured by the image capture device rotated about the axis of rotation of the image capture device, each second constituent image of the plurality of second constituent images corresponding to a respective range of angles about the axis;

align, using the respective offset for each respective range of angles of the plurality of range of angles determined using the plurality of first constituent images, the plurality of second constituent images to generate a composite image; and store, in one or more data structures, the composite image.

* * * * *